(12) United States Patent
Yamashima et al.

(10) Patent No.: US 8,095,469 B2
(45) Date of Patent: Jan. 10, 2012

(54) CONTENT MANAGEMENT PROGRAM, METHOD AND DEVICE

(75) Inventors: Masaki Yamashima, Kawasaki (JP); Osamu Kawai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 420 days.

(21) Appl. No.: 11/657,107

(22) Filed: Jan. 24, 2007

(65) Prior Publication Data
US 2007/0124250 A1 May 31, 2007

Related U.S. Application Data

(63) Continuation of application No. PCT/JP2004/012266, filed on Aug. 26, 2004.

(51) Int. Cl.
G06F 21/00 (2006.01)
(52) U.S. Cl. ............ 705/57; 705/908; 705/911
(58) Field of Classification Search ........... 705/51–52, 705/54, 57–59, 908, 911
See application file for complete search history.

(56) References Cited

U.S. PATENT DOCUMENTS

| | | | | |
|---|---|---|---|---|
| 5,841,865 | A * | 11/1998 | Sudia | 380/286 |
| 5,850,451 | A * | 12/1998 | Sudia | 380/286 |
| 6,233,684 | B1 * | 5/2001 | Stefik et al. | 713/176 |
| 6,320,829 | B1 * | 11/2001 | Matsumoto et al. | 369/47.12 |
| 6,372,974 | B1 | 4/2002 | Gross et al. | |
| 7,194,091 | B2 * | 3/2007 | Higashi et al. | 380/202 |
| 7,227,952 | B2 * | 6/2007 | Qawami et al. | 380/201 |
| 2001/0016836 | A1 * | 8/2001 | Boccon-Gibod et al. | 705/51 |
| 2001/0021976 | A1 * | 9/2001 | Shibuya et al. | 713/169 |
| 2002/0015497 | A1 | 2/2002 | Maruyama et al. | |
| 2002/0107806 | A1 * | 8/2002 | Higashi et al. | 705/51 |
| 2003/0041221 | A1 * | 2/2003 | Okada | 711/164 |
| 2003/0131353 | A1 | 7/2003 | Blom et al. | |
| 2004/0030898 | A1 * | 2/2004 | Tsuria et al. | 713/171 |
| 2004/0078338 | A1 * | 4/2004 | Ohta et al. | 705/51 |
| 2004/0162846 | A1 * | 8/2004 | Nakahara et al. | 707/102 |

(Continued)

FOREIGN PATENT DOCUMENTS

JP 11-259964 9/1999

(Continued)

OTHER PUBLICATIONS

Digital Transmission Content Protection Specification vol. 1 (Informational Version) Revision 1.2a, Feb. 25, 2002. [Retrieved on Apr. 7, 2009].*

(Continued)

Primary Examiner — Evens J Augustin
Assistant Examiner — Calvin Cheung
(74) Attorney, Agent, or Firm — Staas & Halsey LLP

(57) ABSTRACT

An encrypted content and its encryption key under a copy right use condition of prohibiting a copy by the device having received a content are stored, and the encrypted content is copy-transferred with another device through the network, and at the same time, the encryption key is transferred through the network, so that it is stored in either one of the devices. Even when a high definition television broadcast signal received with a copy-once taken as a copy right use condition is recorded, an access flag that controls the presence or absence of the reproduction of the broadcast content for each broadcast content is provided. When an original broadcast content is transcoded into a low resolution, and is transfer to another device, its access flag is turned on, thereby making the reproduction possible.

7 Claims, 47 Drawing Sheets

U.S. PATENT DOCUMENTS

2006/0036554 A1* 2/2006 Schrock et al. ............... 705/75

FOREIGN PATENT DOCUMENTS

| JP | 2000-134193 | 5/2000 |
| --- | --- | --- |
| JP | 2000-285028 | 10/2000 |
| JP | 2000-293589 | 10/2000 |
| JP | 2000-357201 | 12/2000 |
| JP | 2001-203678 | 7/2001 |
| JP | 2002-051037 | 2/2002 |
| JP | 2002-51037 | 2/2002 |
| JP | 2002-073045 | 3/2002 |
| JP | 2002-288377 | 10/2002 |

OTHER PUBLICATIONS

"Content Protection for Recordable Media Specification: SD Memory Card Book." Oct. 18, 2000. All pages.*

"CPRM Specification: SD Memory Card Book, Revision 0.95." 2001. All pages.*

"Digital Transmission Content Protection Specification vol. 1 (Informational Version)." Sep. 12, 2003. All pages.*

"High-bandwidth Digital Content Protection System." Feb. 17, 2000. All pages.*

International Search Report mailed Jan. 18, 2005 (2pp) (International Application No. PCT/JP2004/012266).

Computerlexikon.com Document.

German Office Action dated Jul. 6, 2007.

Daniel Lenoski et al., Shared Memory Type Ultra-Parallel Machine Dash, Prototype Completed (First and Second Report), Nikkei Electronic, Nikkei BP Company Aug. 17, 1992 and Aug. 31, 1992, No. 561 and No. 562, pp. 147-161 and pp. 171-188.

Japanese Office Action issued on Jun. 23, 2009 in corresponding Japanese Patent Application 2006-077441.

Japanese Office Action issued May 11, 2010 in corresponding Japanese Patent Application 2006-531169.

* cited by examiner

| DEVICE NAME | POSITION ON NETWORK |
|---|---|
| DEVICE 20 | ADDRESS a |
| DEVICE 22 | ADDRESS b |
| DEVICE 24 | ADDRESS c |

| CONTENT NAME | NAME OF DEVICE FOR KEY STORAGE | ENCRYPTION SYSTEM |
|---|---|---|
| CONTENT A | DEVICE 20 | $\alpha$ |
| CONTENT B | DEVICE 22 | $\alpha$ |
| CONTENT C | DEVICE 24 | $\beta$ |

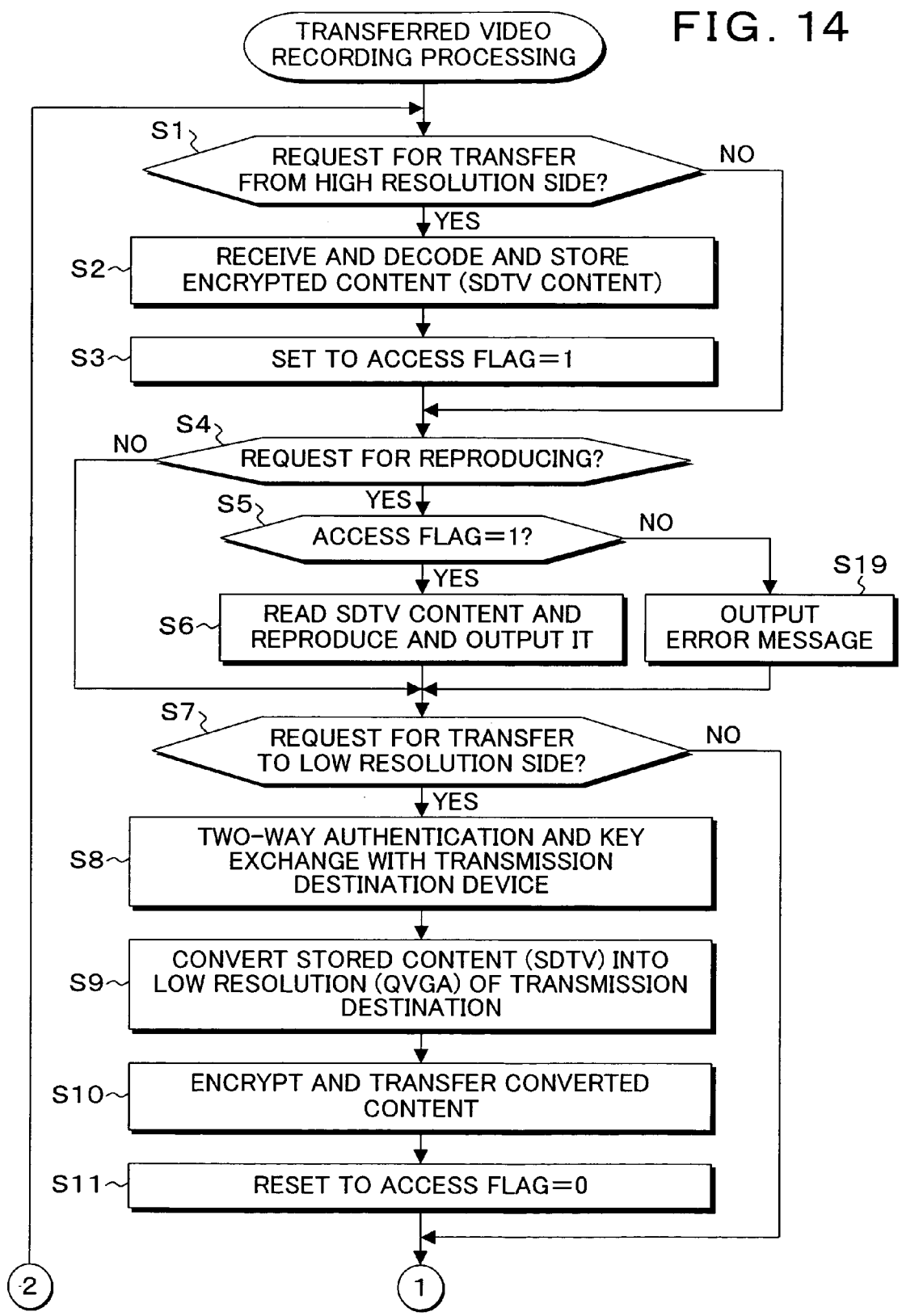

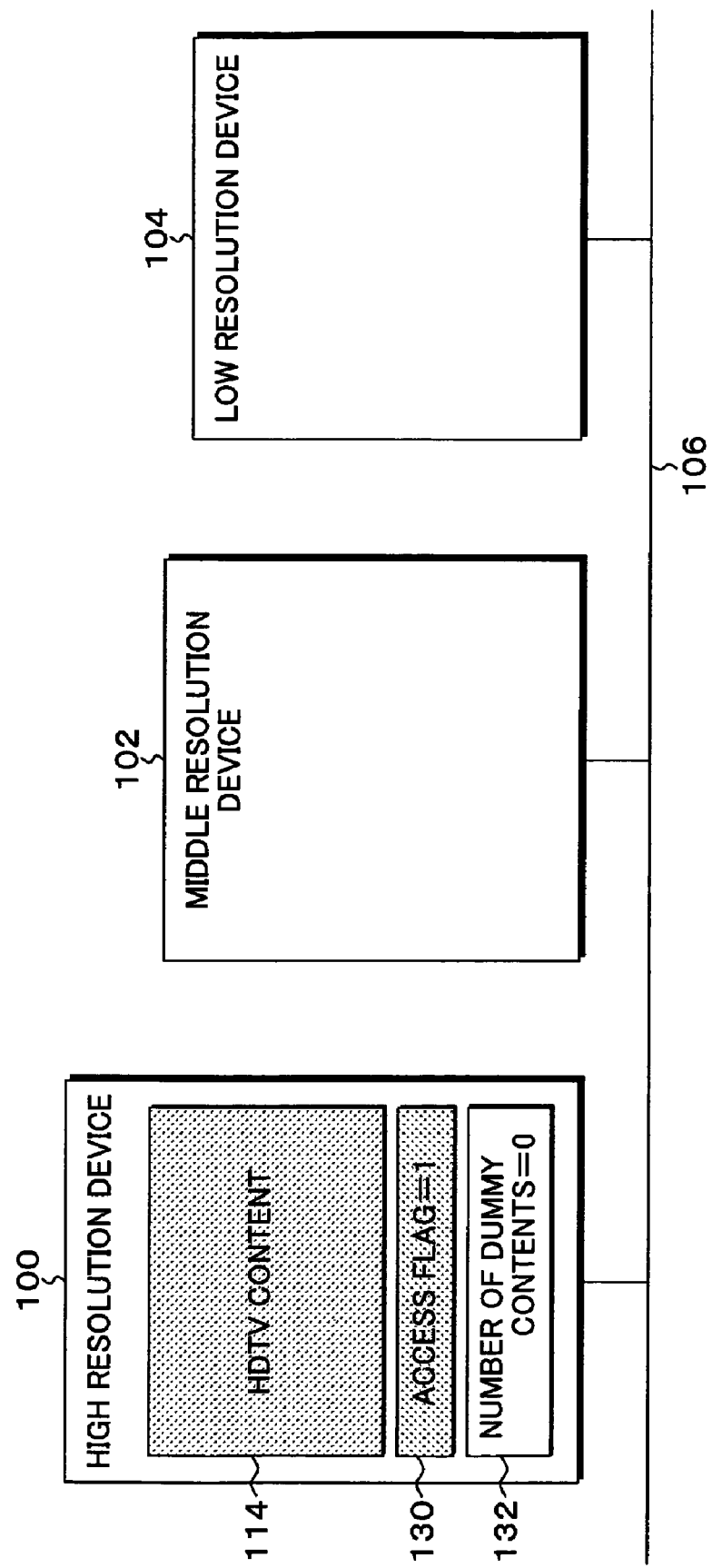

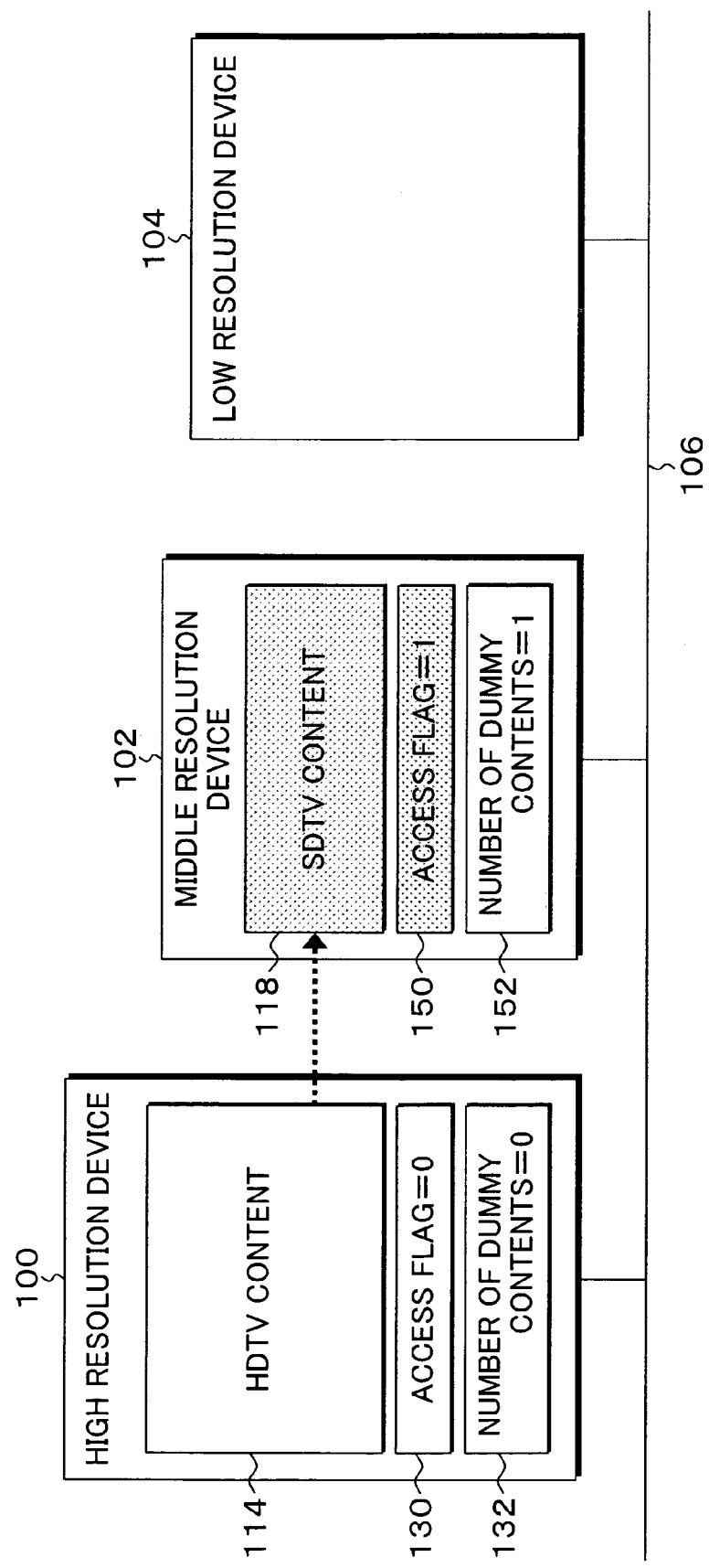

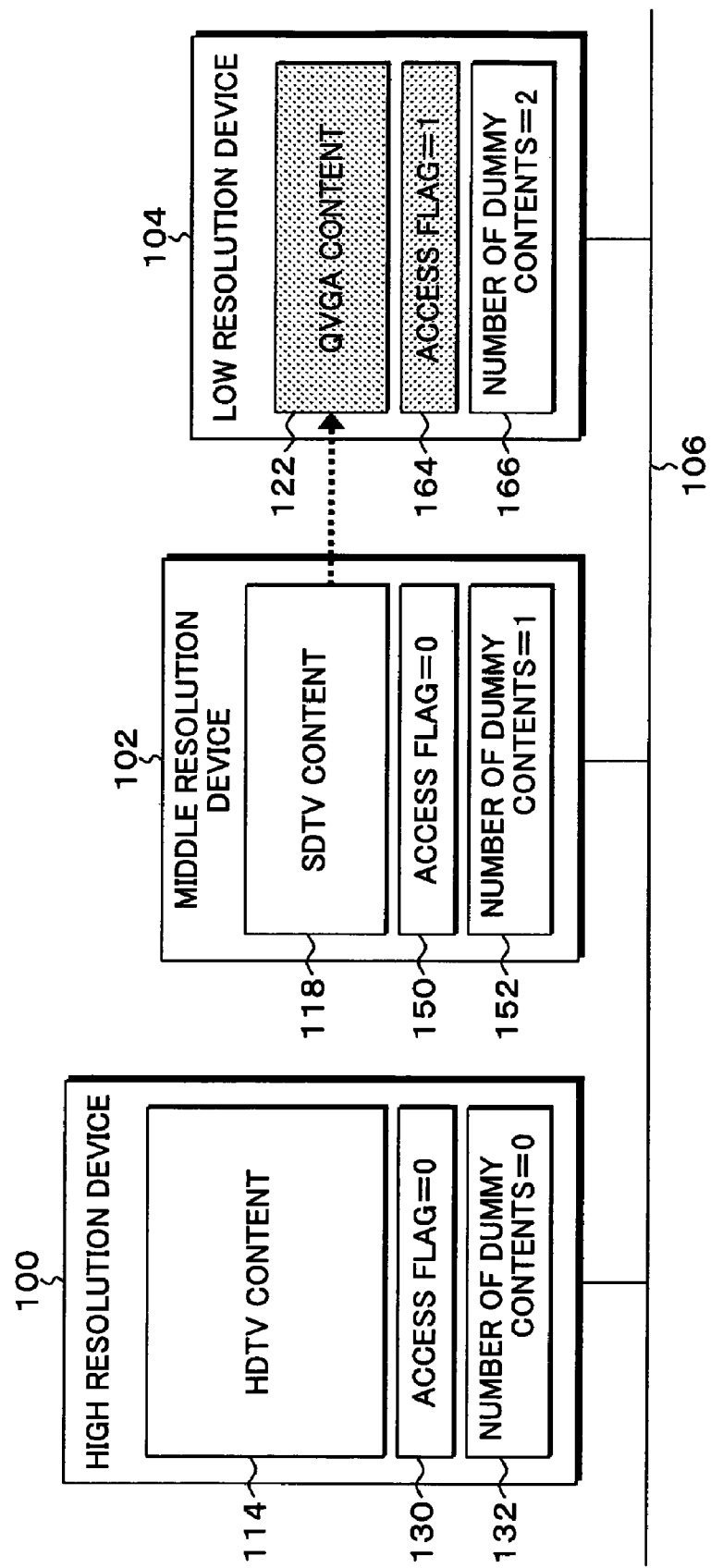

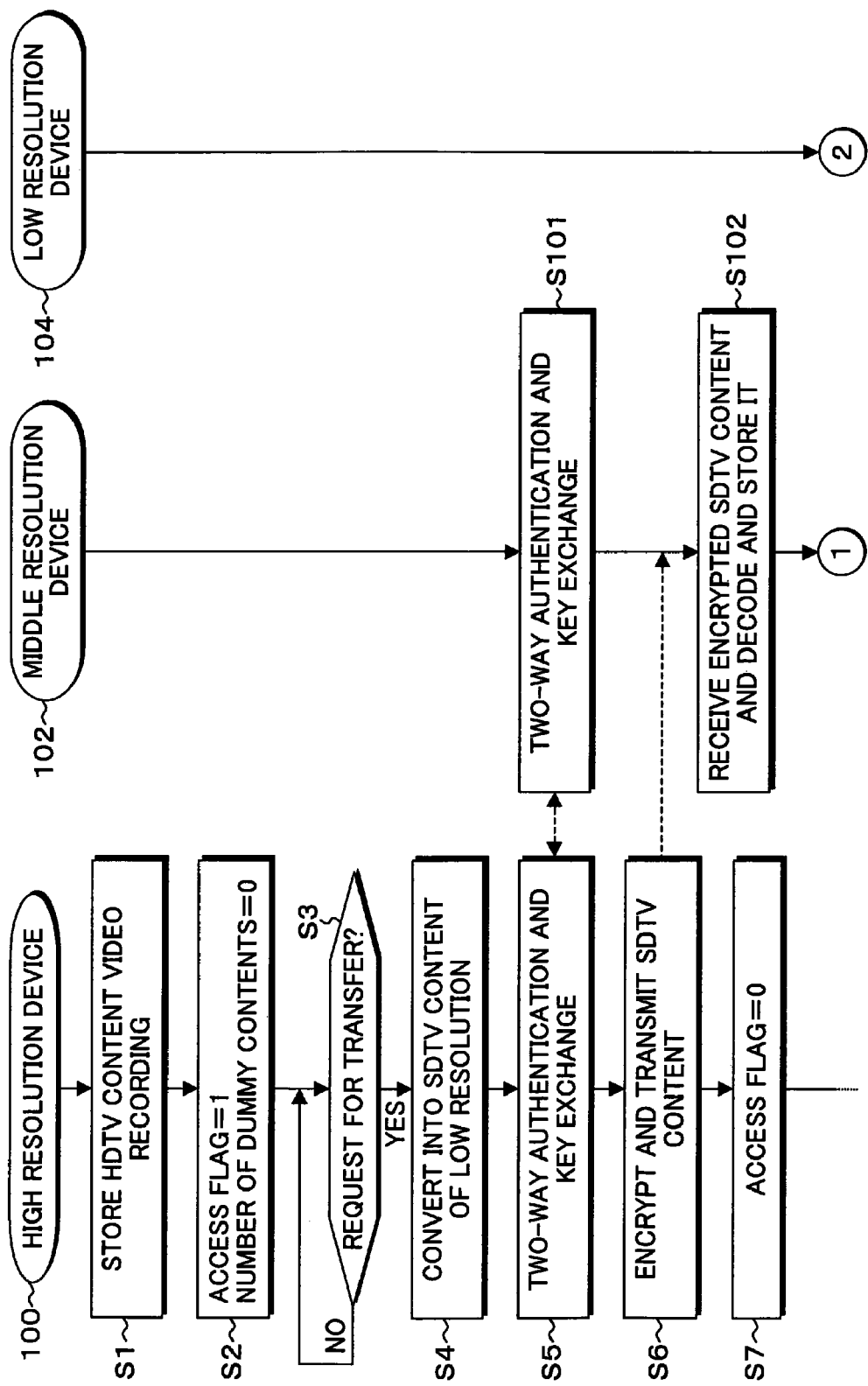

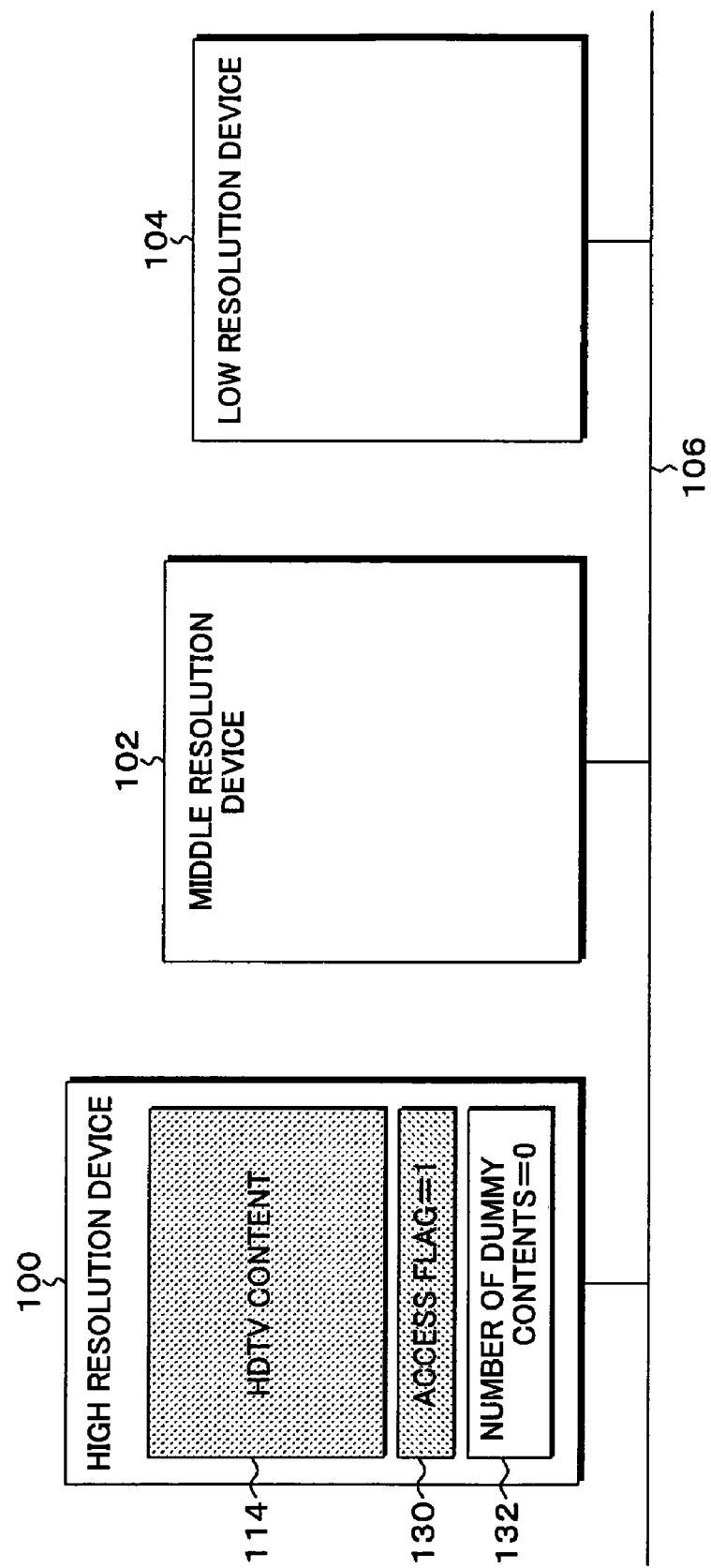

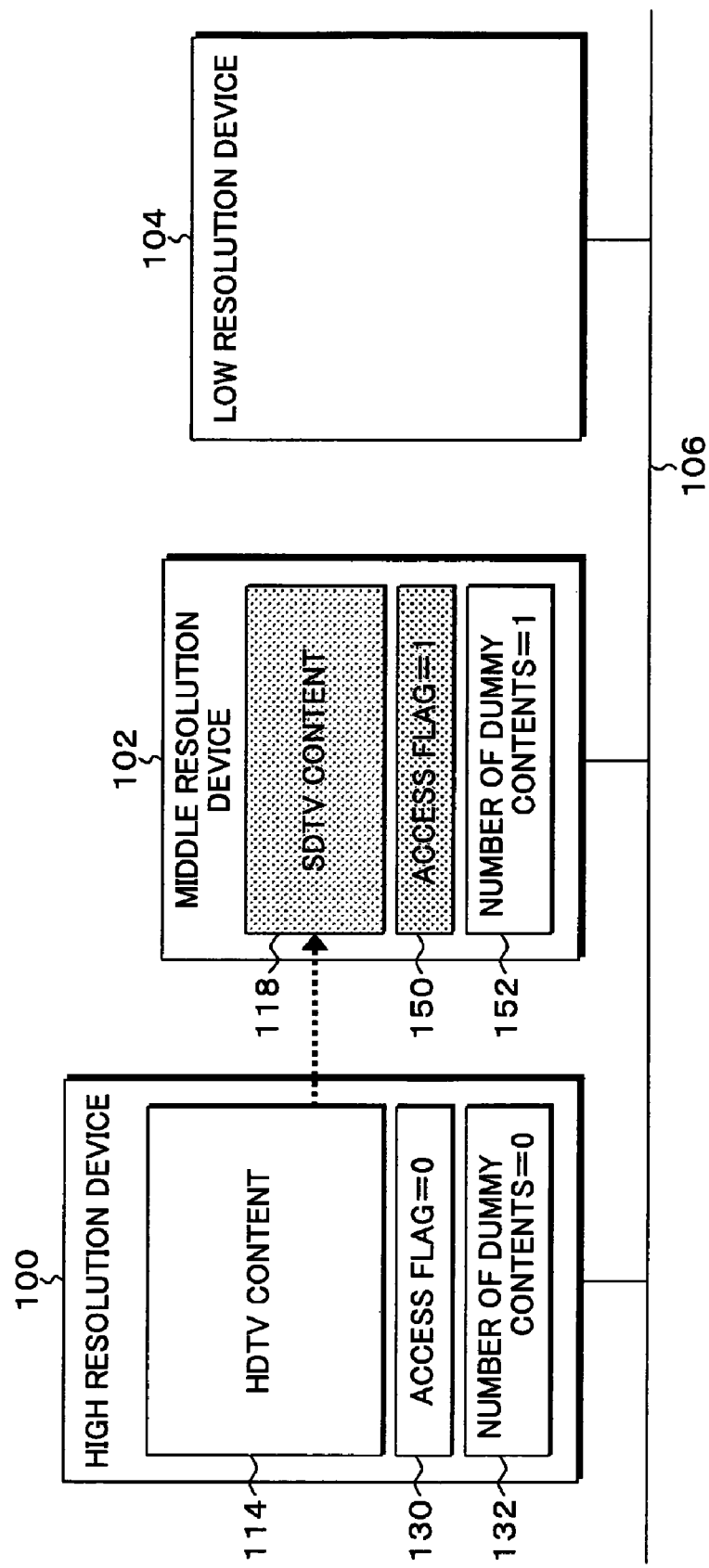

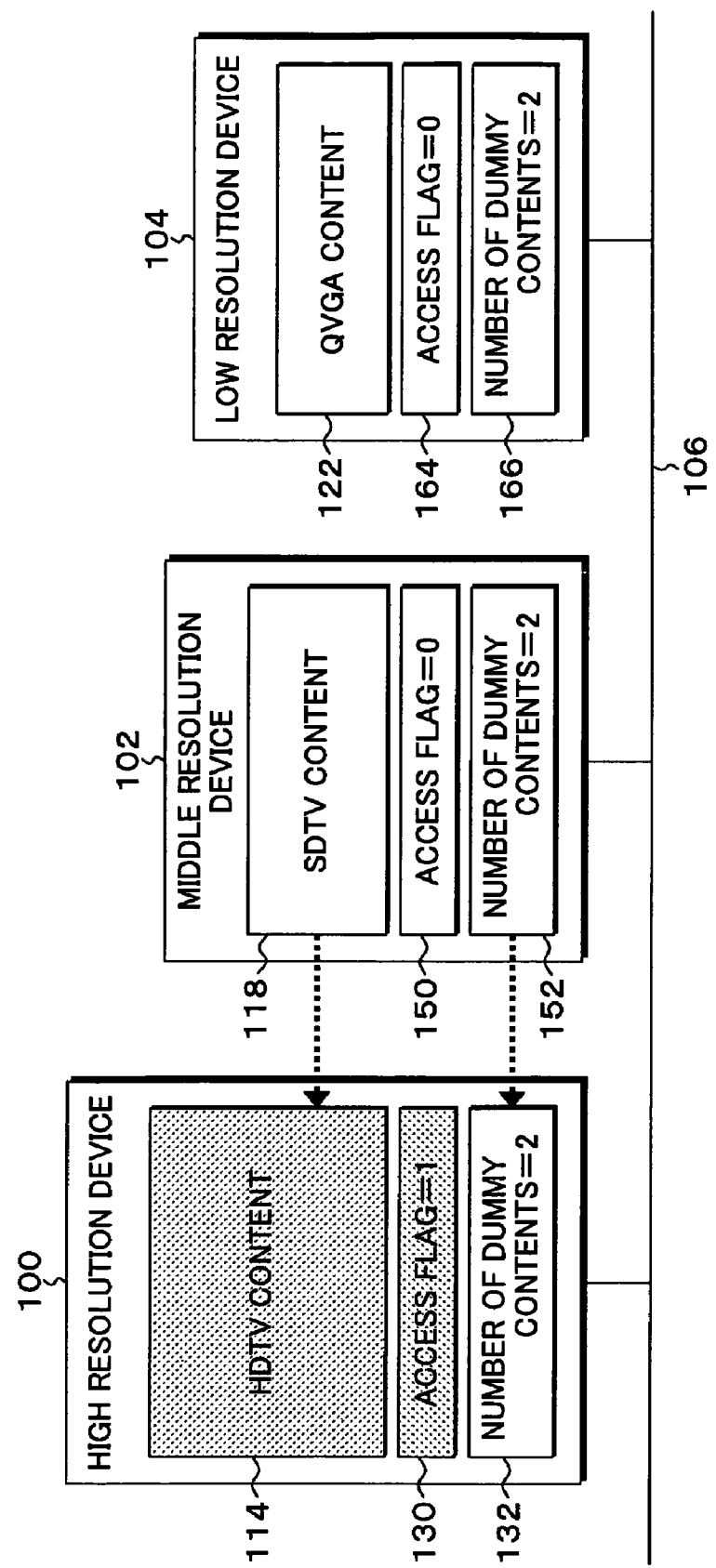

under 35 U.S.C. §111(a)

CONTENT MANAGEMENT PROGRAM, METHOD AND DEVICE

CROSS REFERENCE TO RELATED APPLICATIONS

This application is a continuing application, filed under 35 U.S.C. §111(a), of International Application PCT/JP2004/012266, filed Aug. 26, 2004, which is hereby incorporated by reference in its entirety into this application.

TECHNICAL FIELD

The present invention relates to a content management program, method and device in a ubiquitous environment that manage a content given an access right of a user based on copyright, and in particular, it relates to a content management program, method and device in which the content is usable while being transferred among a plurality of devices.

BACKGROUND ART

At present, various types of contents such as music, images, and documents are digitalized, and because of such digitalization, the content can be easily copied, and above all, it is a problem of illegal copy that causes a serious concern.

If an illegal copy equivalent to infringement of the copyright goes into circulation, not only the distributor and the copyright holder suffers from a loss, but also the consumer is unfavorably affected. For this reason, the content of higher value is required to be made use of under the system environment of the digital copyright management mounted with a copy right management function.

Usually, in the digital copyright management system, the content is encrypted, and the encrypted content and its encryption key are distributed to an access right owner who is given a permit to access the encrypted content. The access right owner stores the encrypted content and the encryption key into one device, and when accessing, performs the decryption of the encrypted content by using the encryption key, and then, accesses the content.

Further, when an access is desired to be made to the content by another device, it is necessary to transfer the encrypted content and the encryption key to another device.

However, in order to prevent the content from being copied, a mechanism is adapted to control in such a manner that at least a pair of encryption key and encrypted content is not stored in a plurality of devices at the same time.

Patent Document 1: Japanese Patent Application Laid-Open No. 2000-134193

Patent Document 2: Japanese Patent Application Laid-Open No. 2000-285028

However, in such conventional digital copy right management system, when the access right owner tries to access the content acquired by a different device according to needs, it is necessary to transfer a pair of encryption key and encrypted content to the device in advance, and this hampers the usability of the user.

As a solution to cope with this problem, there is a method of using a server that performs key management, that is, a key management server. The access owner stores an encrypted content in a plurality of devices. At a point of time when the content is accessed, first, the owner accesses the key management server, and transfers the encryption key to the devices from the key management server or copies the encryption key with a time limit, and decodes the encrypted content by using this encryption key.

When the encryption key is transferred, the encryption key is returned to the key management server after the use is discontinued. When a copy is taken with a time limit, the encryption key becomes unusable after the set period of time elapses.

However, in the method of using the key management server, there is a problem that the key management server is absolutely necessary and that the communication with the key management server is absolutely necessary when the access is made to the content.

On the other hand, even in the field of Television Broadcasting, to prevent the problem of outflow into the internet of illegal copies readily made accompanied with the start of the digital broadcasting, the BS digital and terrestrial digital broadcasting programs in Japan have introduced the copy control signal CCI (Copy Control Information) to realize the [copy once] which permits video recording one time only from Apr. 1, 2004.

However, the content received and recorded in a hard disk drive and the like by HDTV (High Definition Television) resolution is put into a state of "copy once" by one time recording, and is applied with a copy protection. Consequently, when such content is once transferred to memory cards such as SD card by being transcoded into low resolution of QVGA (Quarter Video Graphic Array) of 320×240 pixels in order to watch by mobile terminal, the original HDTV content is eliminated when transferred. Hence, even when the QVGA content of the memory card is returned to the hard disk drive later, it cannot be restored to the original HDTV resolution, and the broadcast content of the HDTV resolution applied with protection of the copy once is lost, and cannot be reproduced again, thereby causing a problem.

An object of the present invention is to provide a content management program, method and device capable of taking a copy of one content and making it accessible for a plurality of devices, while maintaining constraint of a copy right use of copy once.

DISCLOSURE OF INVENTION

An object of the present invention is to provide a content management program, method and program capable of converting the content to the low resolution and transferring it to another device, and after that, when it is returned back, restoring it back to the original resolution, while maintaining a use restriction of copy once.

Means for Solving the Problem (Content Copy and Encryption Key Transfer)

The present invention provides a content management program to be executed by a computer of the device connected to another device through a network.

The content management program of the present invention is characterized by allowing a computer to execute:

a content storing step of storing an encrypted content and the encryption key under a copy right use condition to prohibit a copy by the device having received the content;

a decoding step of decoding the encrypted content by the encryption key;

a content copy step of copy-transferring the encrypted content with another device through a network; and an encryption key transfer step of transferring the encryption key with another device through the network.

Here, the encryption key transfer step deletes the encryption key stored after the encryption key of the content storage unit is copy-transferred to another device through the network.

The encryption key transfer step registers a device storing the encryption key for each content in an encryption key management table, and the decoding step, when decoding the encrypted content, obtains the encryption key by a transfer request for the device storing the encryption key recognized from the management table, and decodes the encrypted content.

The encryption key transfer step, when having transferred the encryption key to another device, renews its own encryption key management table, and at the same time, advises another device of the transfer information and allows the device to renew its encryption key management table.

The device connected through the network is a device stored by the same user registered in a device management table.

Further, the device connected through the network may include a device stored by another user registered in the device management table. The encrypted content is any one of the music, screen image, and document under a copy right or a combination thereof.

The present invention provides a content management method of the device connected to another device through the network.

The content management method of the present invention is characterized by comprising:

a content storing step of storing the encrypted content and the encryption key under a use copy right condition to inhibit a copy by a device having received the copy in a content storage unit;

a decoding step of decoding the encrypted content by the encryption key;

a content copy step of copying-transferring the encrypted content with another device through the network; and an encryption key transfer step of transferring the encryption key with another device through the network.

The present invention provides a content management device connected to another device through the network.

The content management device of the present invention is characterized by comprising:

a content that stores the encrypted content and the encryption key under a copy right use condition to inhibit a copy by a device having received the copy;

a decoding unit that decodes the encrypted content by the encryption key;

a content copy unit that copies/transfers the encrypted content with another device through the network; and an encryption key transfer unit that copy-transfers the encryption key with another device through the network.

(Content Management Program)

The present invention provides a content management program of the content which is broadcast and received. The content management program of the present invention is characterized by allowing a computer to execute:

an access information setting step of setting access information that controls whether or not the reproduction of the content should be made for each content stored in the content storage unit;

a content reproducing step of reproducing the content when the accessing information is shown as reproducible, and prohibiting the reproduction of the content when the access information is shown as not reproducible;

a content transfer step of converting the resolution of the content stored in a content storage unit and transferring the content after the conversion to another device; and an access information control step of setting the access information to be reproducible when the content is stored in the content storage unit, and prohibiting the reproduction by setting the access information to be not reproducible when the content after the conversion is transferred to another device, thereby prohibiting the reproduction, and moreover, setting the access information to be reproducible, thereby making it reproducible when the content transferred to another device and converted thereafter is not reproducible.

Here, the resolution is a dot density in the case of image (moving image and still image) data, and is a bit rate in the case of voice data.

Further, the content management program of the present invention is characterized by allowing the computer to execute a dummy content control step in which a dummy content number showing the number of contents stored in another device in a reproduction prohibiting state which sets the access information to be not reproducible is provided, and the transfer processing of the content to another device is prohibited when the value of the dummy content counter reaches a predetermined threshold value.

The content transfer step converts the content stored in the content storage unit into the content of a low resolution corresponding to the device of the transfer destination, and transfers the content after the conversion.

The present invention provides a content management program to be executed by the computer of a copy recording apparatus.

This program allows a computer to execute:

an access information setting step of setting the access information that control the presence or absence of the reproduction of the content for each content stored in the content storage unit;

a content reproducing step of reproducing the content when the access information is shown as reproducible and prohibiting the reproduction of the content when the access information is shown as not reproducible;

a content transfer step of converting the resolution of the content stored in the content storage unit and transferring the content after the conversion to another device; and an access information control step of setting the access information to be reproducible, thereby making it reproducible when the content is stored in the content storage unit, and setting the accessing information to be not reproducible, thereby prohibiting the reproduction when the content is transferred to another separate device.

In this case also, the content management program allows the computer to further execute a dummy content limiting step of providing a dummy content number showing the number of contents stored in another device in a reproduction prohibiting state which sets the access information to be not reproducible and prohibiting the transfer processing to another device when the value of a dummy content counter reaches a predetermined threshold value.

The content transfer step converts the resolution of the content stored in the content storage unit into the content of a low resolution corresponding to the device of the transfer destination and transfers the same, and executes a transfer processing not including the content when the content stored in the content storage unit is returned to the device of the transfer source storing the content of a high resolution.

The content transfer step leaves the stored content alone as it is or deletes it when the content stored in the content storage unit is returned to the device of the transfer source storing the content of a high resolution.

The content transfer step transfers the content to another device through a network connection or a detachably attachable storage medium. Further, when the content after the conversion is not reproducible by another device, the content after conversion is returned.

Another mode of the present invention provides a content management program executed by a computer of the device storing and reproducing a broadcast signal.

The program of the present invention of this case is characterized by allowing the computer to execute:

a content storing step of storing in the content storage unit a plurality of same contents reproduced in parallel by a plurality of CODEC step of receiving a signal and reproducing the same content in parallel and a plurality of CODEC steps;

a flag control step turning on any one of the access information set for each same content stored in the content storage unit and setting the corresponding content to be reproducible, and at the same time, prohibiting the reproduction of the corresponding content by turning off all the remaining access information; and a content reproducing step of selecting the content with the access information turned on from among the plurality of same contents and reproducing the same.

In such content management program of the present invention, the content is a television broadcast signal received with a copy of one time only taken as a copy right use condition.

(Content Management Method)

The content management method of the present invention is characterized by comprising:

an access information setting step of setting access information that controls whether or not the reproduction of the content should be made for each content stored in the content storage unit;

a content reproducing step of reproducing the content when the accessing information is shown as reproducible, and prohibiting the reproduction of the content when the access information is shown as not reproducible;

a content transfer step of converting the resolution of the content stored in a content storage unit and transferring the content after conversion to another device; and an access information control step of setting the access information to be reproducible when the content is stored in the content storage unit, and prohibiting the reproduction by setting the access information to be not reproducible when the content after conversion is transferred to another device, and moreover, setting the access information to be reproducible thereby making the reproduction possible when the content transferred to another device and converted thereafter becomes not reproducible.

Another mode of the content management method according to the present invention is characterized by comprising:

an access information setting step of setting access information that controls the presence or absence of reproduction of the content for each content stored in a content storage unit;

a content reproducing step of reproducing the content when the accessing information is shown as reproducible, and prohibiting the reproduction of the content when the access information is shown as not reproducible;

a content transfer step of converting resolution of the content stored in a content storage unit and transferring the content after conversion to another device; and an access information control step of setting the access information to be reproducible, thereby making the reproduction possible when the content transferred from another device is stored in the content storage unit, and setting the access information to be not reproducible, thereby prohibiting the reproduction when the content is transferred to another device.

Another mode of the content management method according to the present invention is characterized by comprising:

a content storing step of storing a plurality of CODEC steps reproducing the same content in parallel by receiving signals and a plurality of same contents reproduced in parallel by the plurality of CODEC steps in a content storage unit;

a flag control step of turning on any one of the access information set for each same content stored in the content storage unit and setting the corresponding content to be reproducible, and at the same time, turning off all the remaining access information and prohibiting the reproduction of the corresponding content; and a content reproduction step of selecting the content with the access information turned on from among the plurality of same contents and reproducing the same.

(Content Management Device)

The present invention provides a content management device. The content management device of the present invention is characterized by comprising:

an access information setting unit that sets access information that controls whether or not a reproduction of the content should be made for each content stored in a content storage unit;

a content reproduction unit that reproduces the content when the accessing information is shown as reproducible, and prohibiting the reproduction of the content when the access information is shown as not reproducible;

a content transfer unit that converts a resolution of the content stored in the content storage unit and transferring the content after conversion to another device; and an access information control step of setting the access information to be reproducible when the content is stored in the content storage unit, and setting the access information to be not reproducible, thereby prohibiting the reproduction when the content after conversion is transferred to another device, and moreover, setting the access information to be reproducible, thereby making the reproduction possible when the content transferred to another device and converted thereafter is not reproducible.

Another mode of the content management device of the present invention is characterized by comprising:

an access information setting unit setting access information that controls the presence or absence of reproduction of the content for each content stored in a content storage unit;

a content reproduction unit that reproduces the content when the accessing information is shown as reproducible, and prohibiting the reproduction of the content when the access information is shown as not reproducible;

a content transfer unit that converts a resolution of the content stored in the content storage unit and transferring the content after conversion to another device; and an access information control step of setting the access information to be reproducible, thereby making the reproduction possible when the content transferred from another device is stored in the content storage unit, and setting the access information to be not reproducible, thereby prohibiting the reproduction when the content is transferred to another device.

Another mode of the content management device of the present invention is characterized by comprising:

a content that stores a plurality of CODEC steps reproducing the same content in parallel by receiving signals and a plurality of same contents reproduced in parallel by the plurality of CODEC steps in a content storage unit;

a flag control unit that turns on any one of the access information set for each same content stored in the content storage unit and sets the corresponding content to be reproducible, and at the same time, prohibits the reproduction of the corresponding content by turning off all the remaining access information; and a content reproduction unit that selects the content with the access information turned on from among the plurality of same contents and reproduces the same.

Incidentally, the detail of the content management method and the device in the present invention is basically the same as the case of the content management program.

Effect of the Invention

[Content Copy and Key Transfer]

According to the present invention, the access right owner can use the encrypted content applied with the constraint condition of a copy once which permits a copy of just one time by the device only accessing the content by using the encryption key without requiring the key management server.

Further, the encrypted content is copied in a plurality of devices, and at the same time, all the devices recognize which device stores the encryption key, and therefore, even when the access owner changes the device to be used or changes the place in which the device is used, the encryption key stored in another device is automatically obtained, so that the user can access the encrypted content, and unless one content is simultaneously used by the plurality of devices, while maintaining the constraint condition of the copy one, the access can be made freely, and usability when using the content can be improved to a large extent.

(Content Management)

According to the content management of the present invention, for example, the content of a HDTV resolution received and recorded is left alone as it is, and is converted into a low resolution of another device, thereby the content is stored, while the contents different in resolution of the same broadcast are stored in a plurality of devices, but the access information is set to be reproducible just for one set only, thereby the use of the content is made possible, and all the other devices set the access information to be not reproducible, so that the use of the stored contents is prohibited. As a result, even when the contents are stored in the plurality of devices, a video storage state applied with a protection of the copy once that limits the content to be usable to one content only is substantially realized.

When the content converted into the low resolution is restored, the original high resolution content becomes usable. In this case, the transfer of the content from the low resolution to the high resolution is not performed, but by creating the same state as when the access information is transferred, the original high resolution content is put into reusability, and even when the high resolution broadcast content once received and recorded is changed to the low resolution, and is transferred to another device, the content thereof will never be lost.

Further, when the receiving and recording device is provided with a plurality of CODEC functions, the broadcast of the same HDTV resolution is received and recorded in parallel, and the condition of the copy once is satisfied individually, and therefore, if left alone as it is, the content equivalent to several minutes of the CODEC is recorded, and this means that more than two copies are made, and the condition of the copy once is broken. With respect to the receiving and recording by the multiplex CODEC also, only one key from among the access keys set respectively is turned on, and the content usable for one time is only one recorded content, and the recording condition of the copy once can be maintained even for the multiplex CODEC.

BRIEF DESCRIPTION OF DRAWINGS

FIG. 3 is an explanatory drawing of the device information database of FIG. 2;

FIG. 4 is an explanatory drawing of the content database of FIG. 2;

FIG. 14 is a flowchart of a video transfer processing in the low resolution device of FIGS. 10A and 10B;

FIGS. 19A and 19B are explanatory drawings of the transfer processing accompanied with the resolution conversion of the broadcast content of FIGS. 18A and 18B;

FIGS. 20A and 20B are explanatory drawings of a transfer processing subsequent to FIGS. 19A and 19B;

FIGS. 22A, 22B and 22C are time charts of the transfer processing of the broadcast content of FIG. 17;

FIGS. 27A and 27B are explanatory drawings of the transfer processing accompanied with the resolution conversion of the broadcast content in FIGS. 18A and 18B which leaves alone the content of the low resolution side at the time of returning to the high resolution side;

FIG. 29 is an explanatory drawing of the transfer processing subsequent to FIGS. 28A and 28B;

BEST MODE FOR CARRYING OUT THE INVENTION (Content Copy and Key Transfer)

Figure 1:
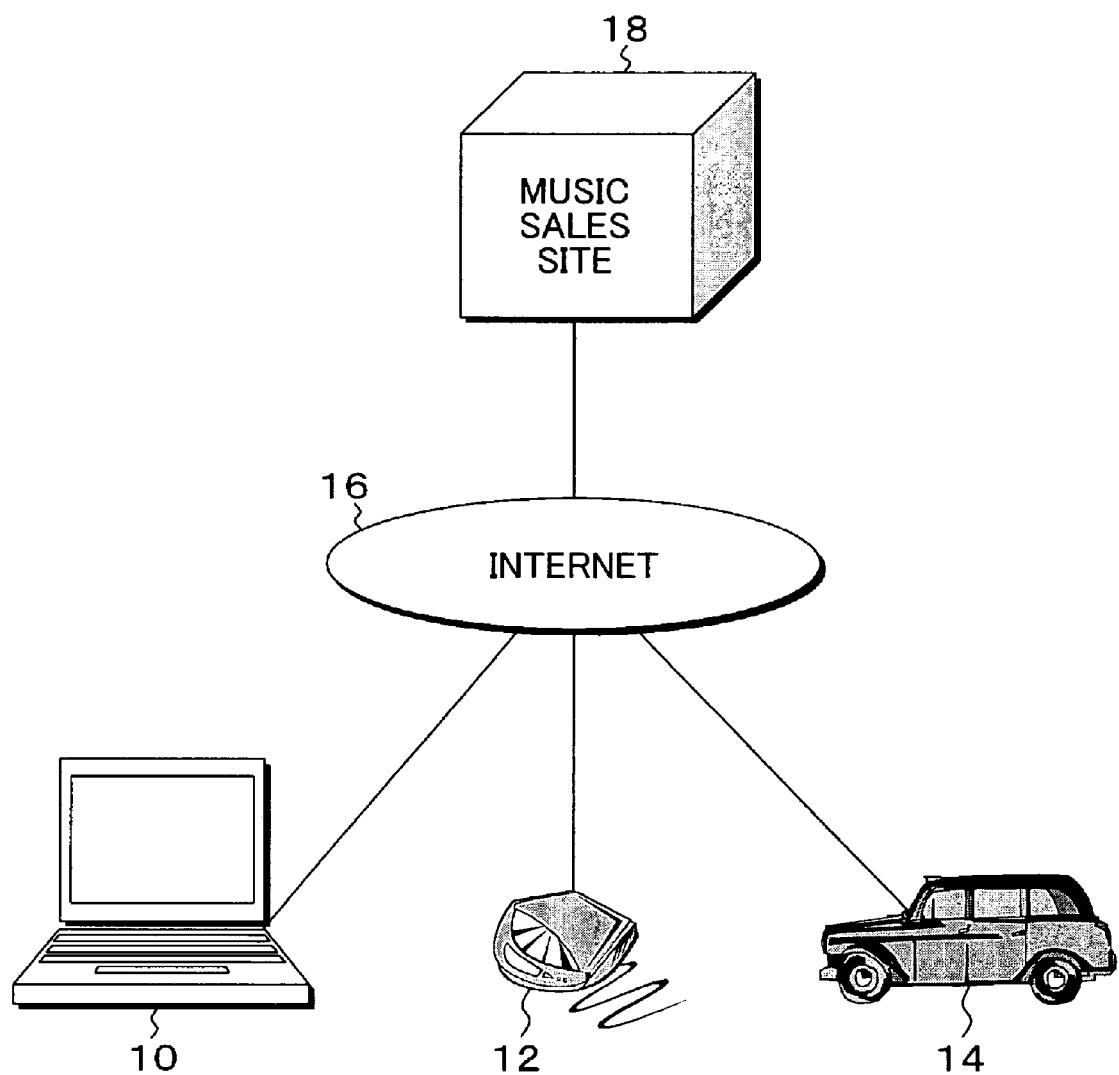
FIG. 1 is an explanatory drawing of device network environment adapted to the present invention.

FIG. 1 is an explanatory drawing of network environment adapted to the content management processing according to the present invention. In FIG. 1, as a device adapted to the content management processing of the present invention, a personal computer 10, a portable music player 12, and a car music player 14 owned by a certain user are cited as an example, and these devices are capable of communicating with one another through an internet 16, and moreover, a music content can be purchased and downloaded from a music sales site 18.

Figure 2:
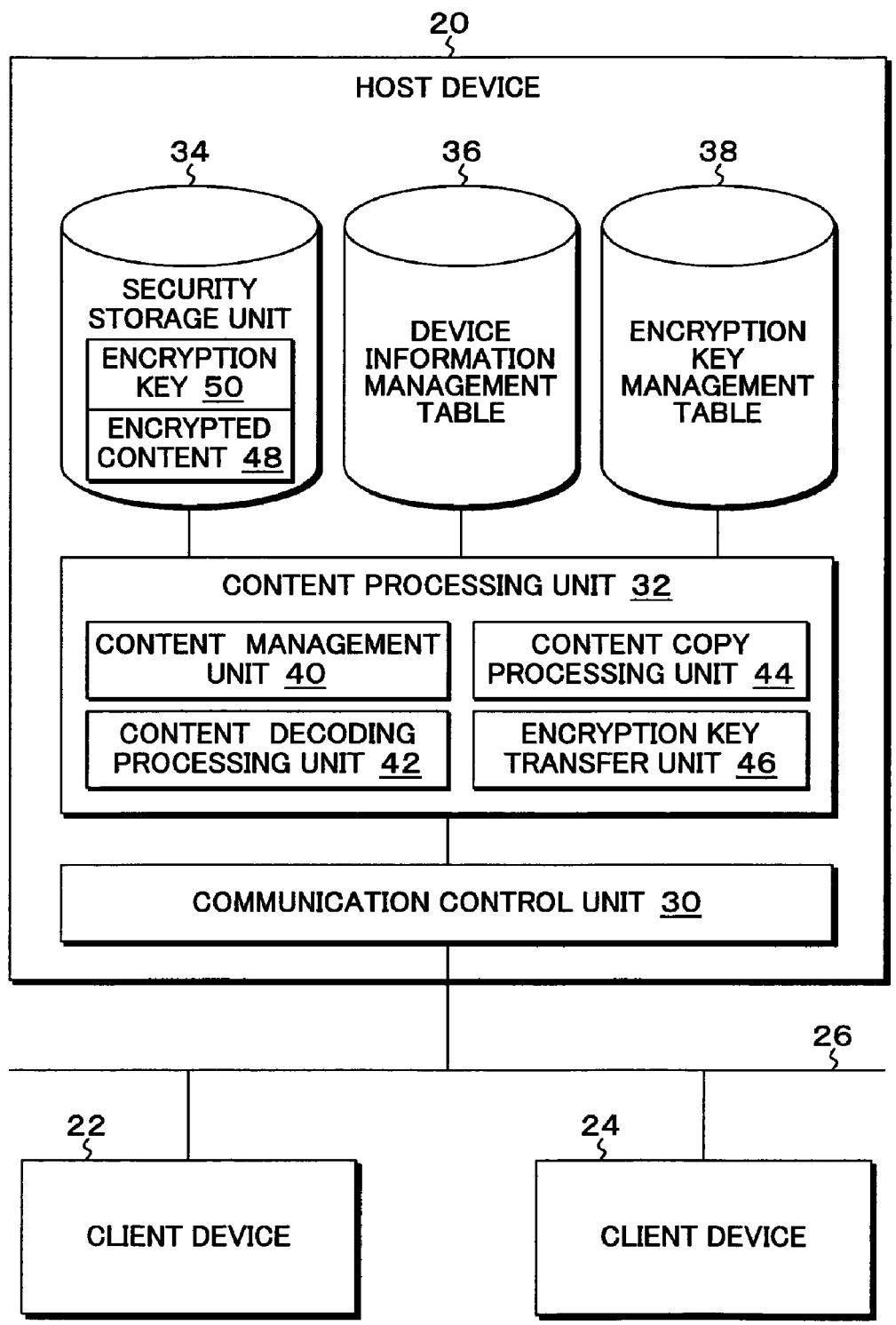
FIG. 2 is a block diagram of a device comprising content management functions of the present invention.

FIG. 2 is a block diagram of a device comprising content management functions. In FIG. 2, in this example, client devices 22 and 24 are connected to a host device 20 through a network 26. The host device 20, for example, is the personal computer 10 of FIG. 1, and is a device that obtains an encrypted content and an encryption key by purchasing the music from the music sales site 18, for example, through the internet 16 by the user.

In contrast to this, the client devices 22 and 24, for example, are the portable music player 12 and the car music player 14 of FIG. 1, and are devices that obtain and use copies of such as the encrypted content and music from the personal computer 10 as the host device 20.

Incidentally, names of the host device and the client devices are relative, and the device that takes possession of the content first is simply referred to as a host device, and is not limited to such name.

The host device 20 is provided with a communication control unit 30, a content processing unit 32, a security storage unit 34, a device information management table 36, and an encryption key management table 38. The content processing unit 32 is an application realized by executing a content processing program, and comprises a content management unit 40, a content decoding processing unit 42, a content copy processing unit 44, and an encryption key transfer unit 46.

The content management unit 40 through the internet 16, as shown in FIG. 1, purchases a music of copy-once, for example, from the music sales site 18, thereby obtaining an encrypted content and an encryption key of the music, and stores it in a security storage unit 34 as an encrypted content 48 and an encryption key 50.

The content decoding processing unit 42, under the condition that the encryption key 50 is stored in the security storage unit 34, decodes the encrypted content 48 by the encryption key 50, and performs utilization of an output display and the like.

The content copy processing unit 44 copies/transfers the encrypted content 48 stored in the security storage unit 34 between the client devices 22 and 24 through the network 26 and stores the same. The encryption key transfer unit 46 transfers the encryption key 50 stored in the security storage unit 34 between the client devices 22 and 24 through the network 26.

Here, the copy processing of the encrypted content 48 by the content copy processing unit 44 is performed such that the encrypted content 48 is read from the security storage unit 34 and is transferred to the client devices 22 and 24, and after that, the encrypted content 48 is left alone.

In contrast to this, in the encryption key transfer unit 46, the encryption key 50 is read from the security storage unit 34, and for example, is copied/transferred to the client device 22, and after that, the encryption key 50 in the security storage unit 34 is deleted. By such processing of the encryption key transfer unit 46, the encryption key 50 is put into a state of being stored in either one only of the host device 20, the client devices 22 and 24, and by this state, an access to the content is made possible under a copy right use condition of copy-once that permits a copy of one time only.

FIG. 3 is an explanatory drawing of a device information management table 36 provided in the host device 20 of FIG. 2. In the device information management table 36, device names adapted to the content management processing of the present invention and positions on the network are registered. In the example of FIG. 2, as device names, a device 20, a device 22 and a device 24 are registered, and as positions on the network, an address a, an address b, and an address c are registered.

The device adapted to the content management processing of the present invention, which is registered in this device information management table 36, is a device owned basically by the same user. However, if permitted by the user, a device owned by another party is registered in the device information management table 36, and can be included in the target devices of the content managing processing of the present invention. In this manner, when the device of another party is registered in the device information management table 36, it is possible to make use in such a manner that the content obtained by a certain user is lent out to a third party under the constrain condition of copy-once and the content is allowed to be used.

FIG. 4 is an explanatory drawing of an encryption key management table 38 provided in the host device 20 of FIG. 2. The encryption key management table 38 is table information that registers in which position of the plurality of devices adapted to the content management processing of the present invention the encryption key exists. The encryption key management table 38 registers the content names, names of the storage devices of the key, and encryption systems.

Here, in the content name, a content A, a content B, and a content C are registered, and as the name of the storage device, a device 20, a device 22, and a device 24 are registered, and moreover, as the encryption system, a system α and a system β are registered. As the system α and system β as the encryption system, specifically, publicly known appropriate encryption systems are adapted, which are currently used for the contents of the copy right target.

Referring to FIG. 2 again, the client devices 22 and 24 basically comprise the same functional configuration as the host device 20, but the disadvantages of the client devices 22 and 24 are that they do not obtain new contents by themselves through the network, but take possession of the contents by the copy processing from the host device 20. Of course, when the client devices 22 and 24 directly obtain the content through the internet, they are allowed to have the functions as the host device 20 with respect to that content.

The segment of the communication control unit 30, the content processing unit 32, the security storage unit 34, the device information management table 36, and the encryption key management table 38 in the host device 20 performs the transfer and decode processing of the encrypted content and the encryption key, and therefore, is configured by a tamper resistant module or software in order to protect the segment from un illegal access by the third party.

Further, the transfer of the encrypted content and the encryption key between the host device 20 and the client devices 22 and 24 is encrypted and exchanged by using a DTCP (Digital Transmission Content Protection) when the client devices 22 and 24 are connected to the personal compute configuring the host device 20 through, for example, an IEEE1394 port, and moreover, when a LAN is used through the network 26, the transfer is encrypted by using a SSL (Secure Socket Layer) or an IPSEC (IP security protocol).

Further, at the time of data transfer between the host device 20 and the client devices 22 and 24, first, two-way authentication and key exchange are performed between two devices, and after that, they are encrypted, for example, by hybrid system, and then, the encrypted content and the data of the encryption key are transferred.

The encryption by the hybrid system is such that a pseudo random number is generated at a transmission side so as to fabricate a session key, and on the other hand, messages to be transmitted are encrypted by the session key so as to be combined, and after that, they are transmitted. At the reception side, based an encrypted secret key (private key), the received encryption key is decoded, and by the decoded session key, the received encrypted message is decoded.

Figure 5:
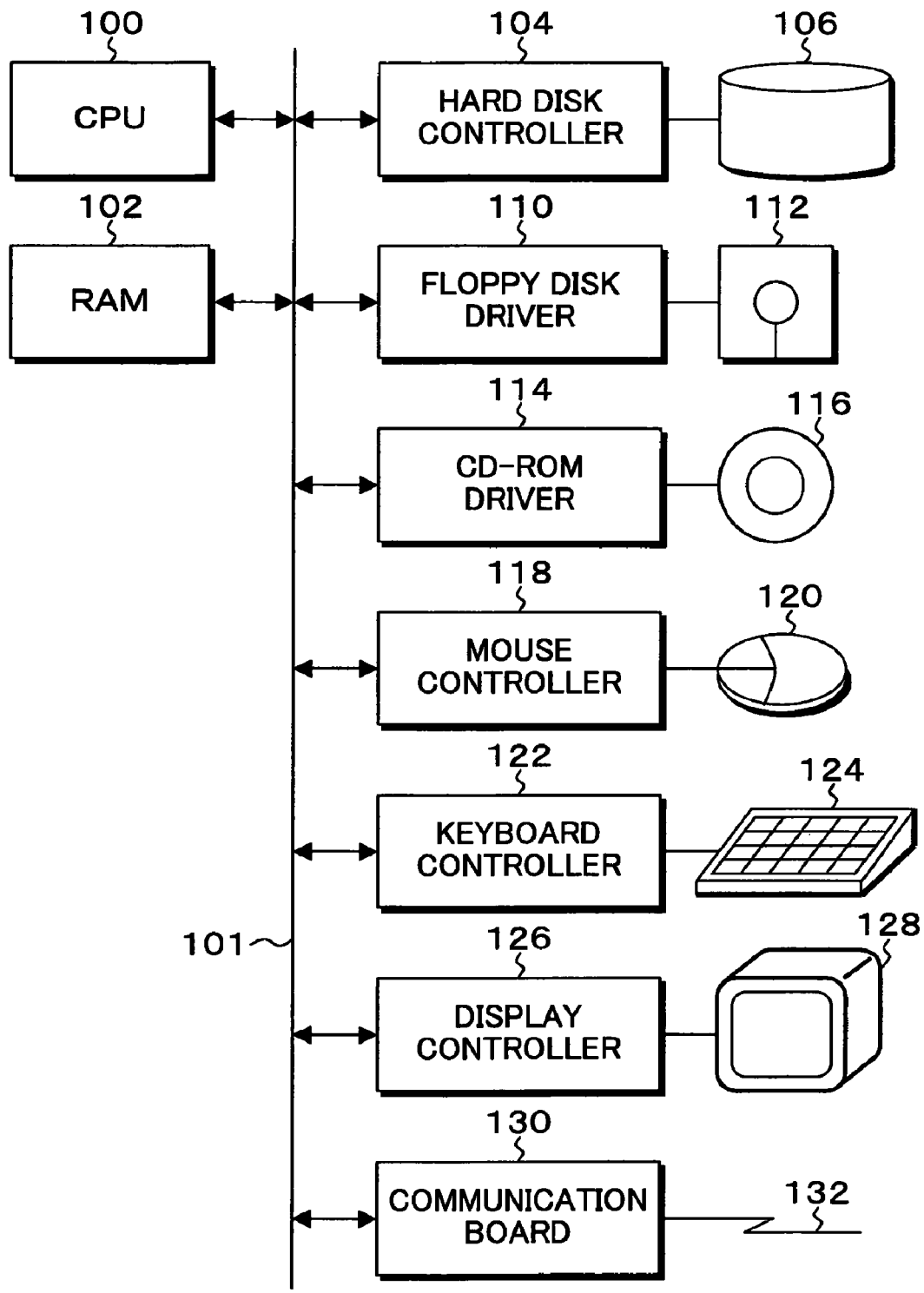
FIG. 5 is a block diagram of hardware environment of a computer adapted to the present invention.

The host device 20 in FIG. 2 is realized, for example, by hardware resources of the computer as shown in FIG. 5. In the computer of FIG. 5, a bus 201 of a CPU 200 is connected with a RAM 202, a hard disk controller (soft) 204, a floppy disk driver (soft) 210, a CD-ROM driver (soft) 214, a mouse controller 218, a keyboard controller 222, a display controller 226, and a communication board 230.

The hard disk controller 204 connects a hard disk drive 206, and is loaded with a program to execute the content management processing of the present invention, and calls out a necessary program from the hard disk drive 206 at the computer activating time so as to be developed on the RAM 202 and executed by the CPU 200.

The floppy disk driver 210 is connected with a floppy disk drive (hard) 212, so that read/write can be made on a floppy disk (R). The CD-ROM driver 214 is connected with a CD drive (hard) 216, so that data and program stored in CD can be read.

The mouse controller 218 transmits an input operation of the mouse 220 to the CPU 200. The keyboard controller 222 transmits an input operation of the keyboard 224 to the CPU 200.

The display controller 226 performs a display for a display unit 228. The communication board 230 uses a communication line 232 including radio transmission, and performs communications with the devices within the network and the devices on the out of network through LAN.

Figure 6A:
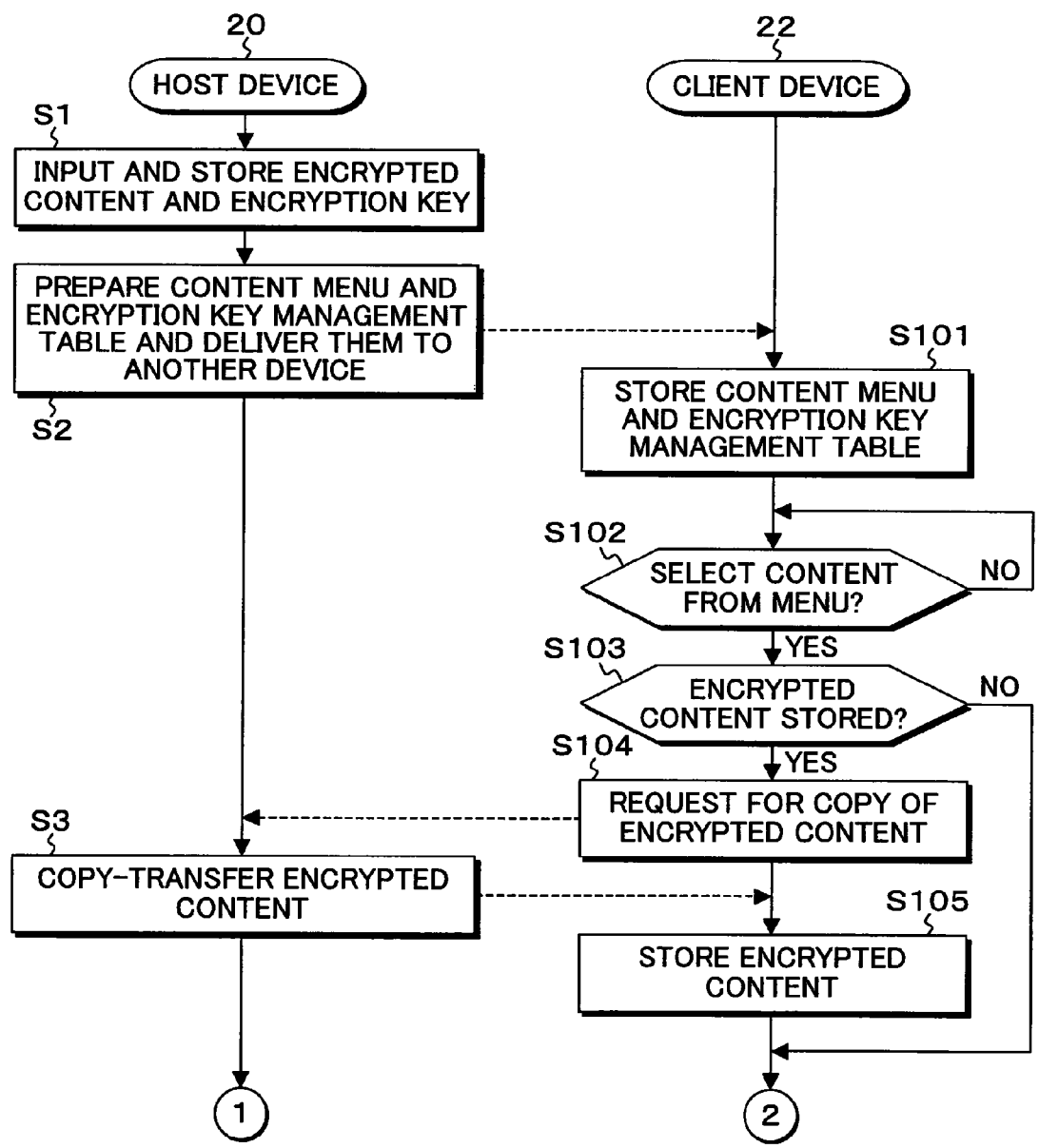
FIGS. 6A and 6B are time charts of the processing to access an encrypted content by using an encryption key under a use condition of copy once between the devices according to the present invention.
Figure 6B:
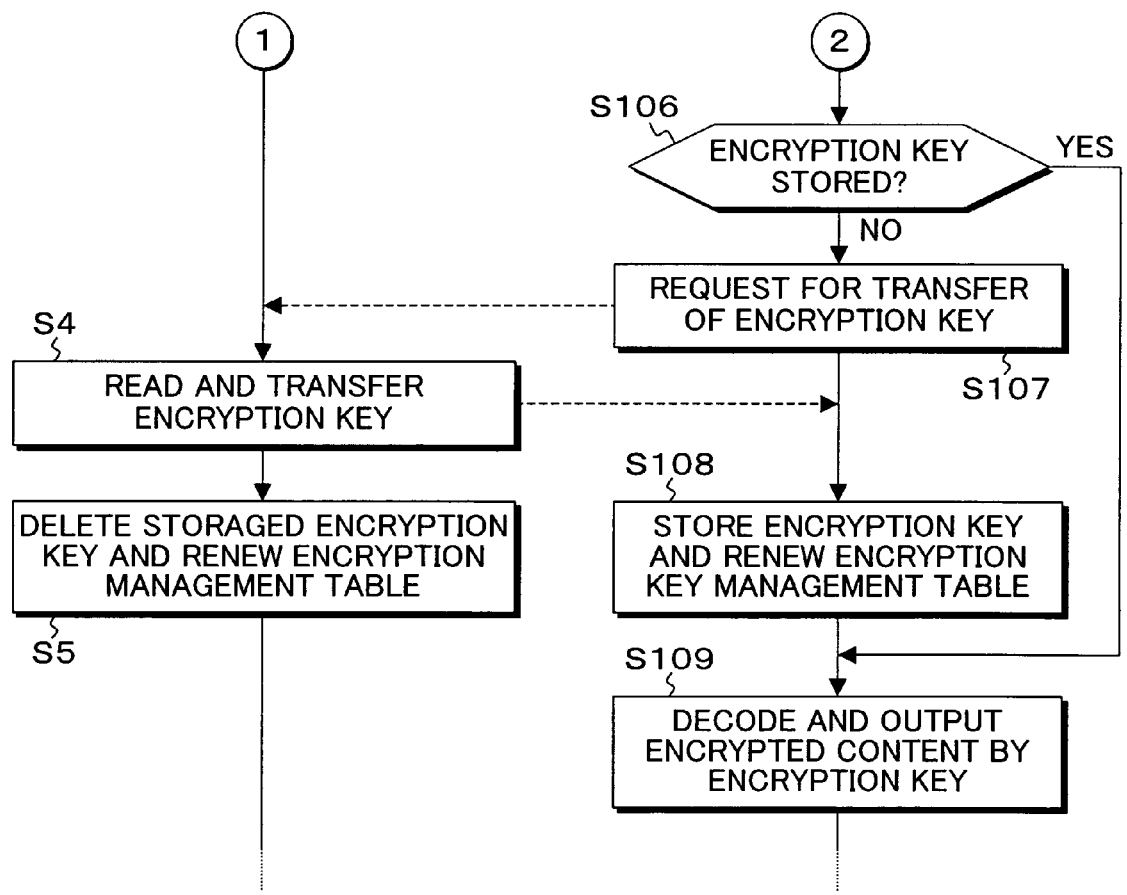

FIGS. 6A and 6B are time charts of the processing to access the encrypted content by using the encryption key under a use condition of one copy between the devices of the present invention. In FIGS. 6A and 6B, first at step S1, the host device 20 purchases and inputs the encrypted content and the encryption key, for example, from a music distribution site through the internet and stores them.

Subsequently, at step S2, the host device 20 prepares a content menu and an encryption key management table, and distributes this table to another device. Then, at step S101, the client device 22 stores the content menu and the encryption key management table received from the host device 20. Subsequently, at step S102, when the content from the menu is selected in the client device 22, at step S103, the presence or absence of the storage of the encrypted content is checked.

If the encrypted content is not stored, the procedure proceeds to step S104, and a copy of the encrypted content is requested from the host device 20. Upon receipt of this request, at step S3, the host device 20 copies/transfers the stored encrypted content to the client device 22 of a request origin.

At step S105, the client device 22 stores the transferred encrypted content. Of course, if the encrypted content selected by the menu at step S103 is stored, the procedure skips steps S104 and S105.

Next, at step S106, the presence or absence of the storage of the encryption key is checked. If the encryption key is not stored, by referring to the encryption key management table, it is confirmed that the key is currently stored in the host device 20, and at step S107, a request for the transfer of the encryption key is made to the host device 20.

Upon receipt of this request, the host device 20 reads the encryption key at step S4, and transfers it to the client device 22 of the request origin. After transferring the encryption key, at step S5, the host device 20 deletes the stored encryption key, and renews the encryption key management table.

Upon receipt of the transfer of the encryption key from the host device 20, the client device 22 stores the encryption key at step S108, and after that, renews its encryption key management table. At the renewing time of this encryption key management table, a renewal result of the encryption key management table is informed to another device from either the transfer source or the transfer destination of the encryption key, thereby allowing its encryption key management table to be renewed. Subsequently, at step S109, the encrypted content is decoded and outputted by the encryption key obtained and stored by the transfer.

Figure 7A:
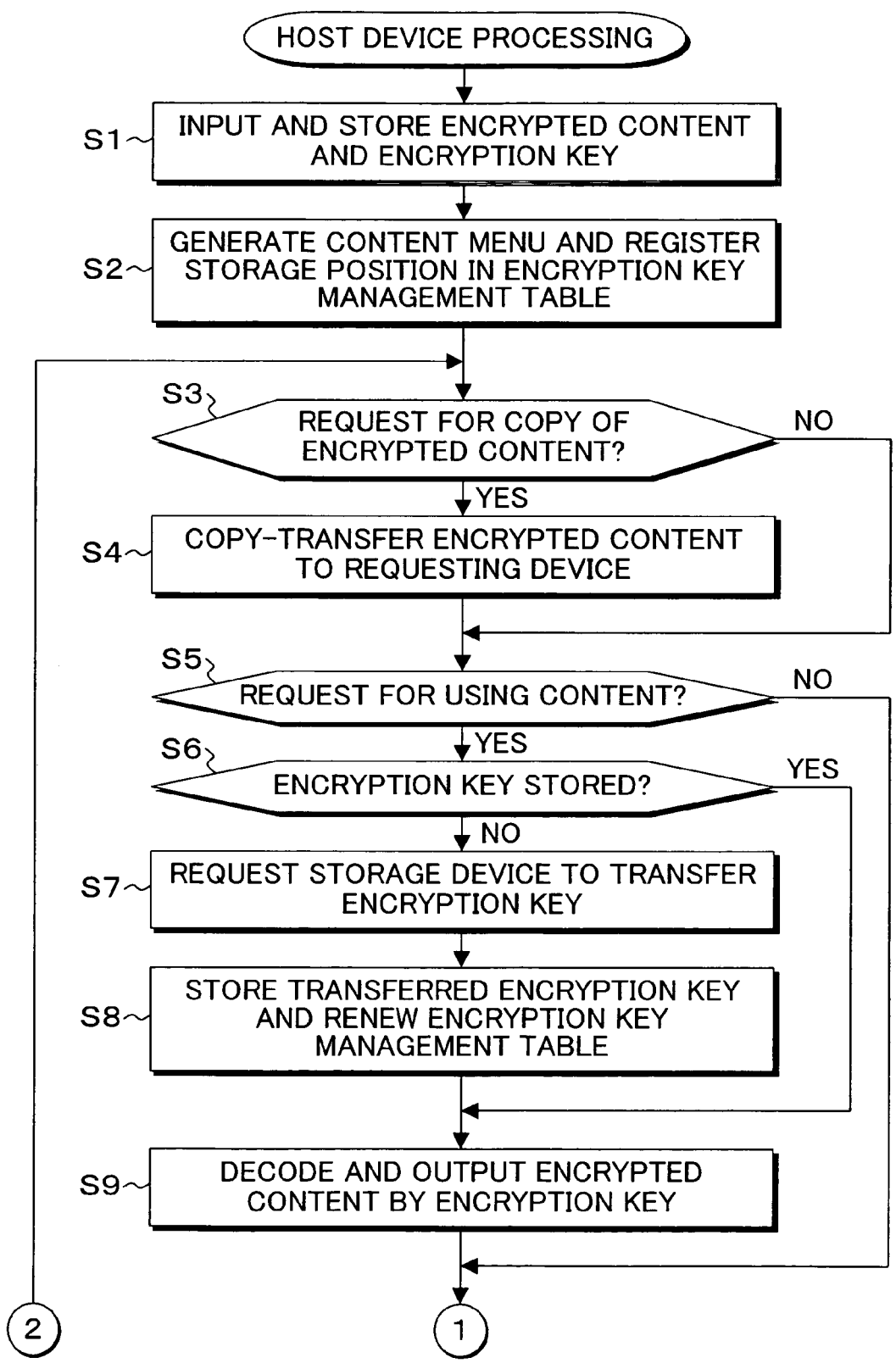
FIGS. 7A and 7B are flowcharts of the host device processing of FIG. 2.
Figure 7B:
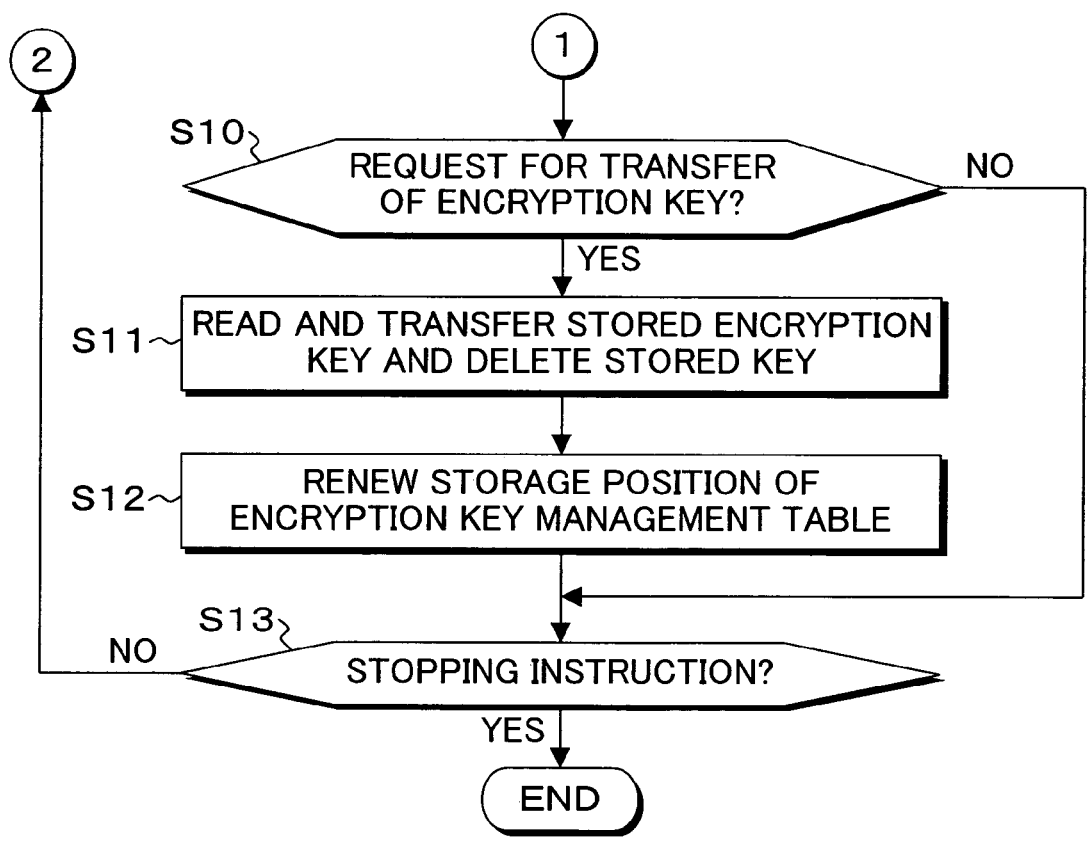

FIGS. 7A and 7B are flowcharts of a host device processing in the host device 20 of FIG. 2. In FIGS. 7A and 7B, at step S1, the encrypted content and the encryption key are inputted and stored, and at step S2, the generation of the content menu and the registration of the storing position for the encryption key management table are performed.

Next, at step S3, the presence or absence of the request for the copy of the encrypted content is checked, and upon receipt of the request for the copy, the procedure proceeds to step S4, and copies/transfers the encrypted content to the requesting device.

Subsequently, at step S5, the presence or absence of a use request for the content in the host device itself is determined, and if the use request does not exist, the procedure proceeds to step S7, and by referring to the encryption management table, a request for the transfer of the encryption key is made to the device currently storing the encryption key, and at step S8, the obtained encryption key is stored, and the encryption key management table is renewed.

At step S9, the encrypted content is decoded by the encryption key, and is outputted. At step S6, if the encryption key exists, the procedure skips steps S7 to S8, and proceeds to step S9.

Next, at step S10, the presence or absence of the transfer request for the encryption key from another device is checked, and if the transfer request exists, at step S11, the stored encryption key is read and transferred, and the stored encryption key is deleted. Subsequently, at step S12, the storing position of the encryption key management table is renewed. The processing of these steps S3 to S12 are repeated at step S13 until the stop instruction of the host device is received.

Figure 8A:
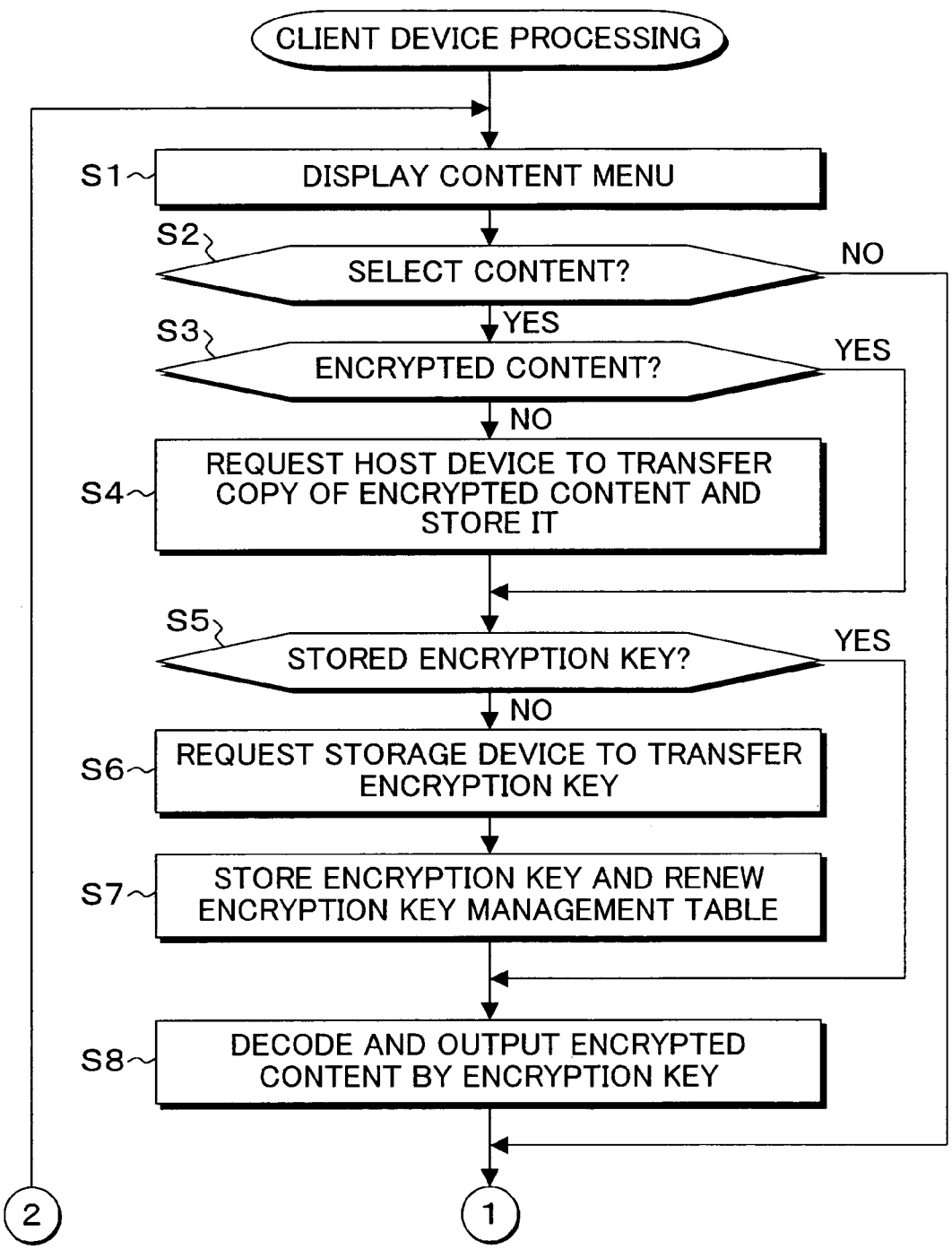
FIGS. 8A and 8B are flowcharts of the client device processing of FIG. 2.
Figure 8B:
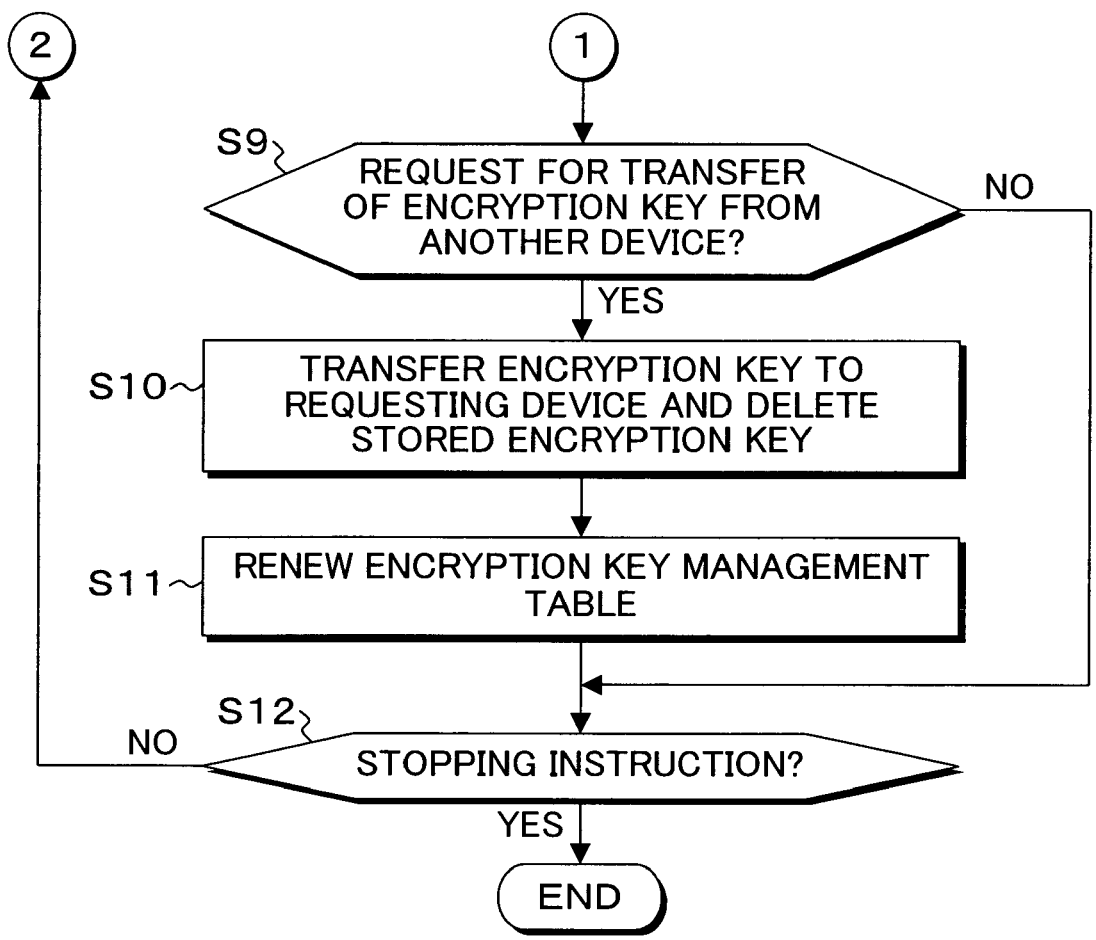

FIGS. 8A and 8B are flowcharts showing the processing in the client devices 22 and 24 of FIG. 2. In FIGS. 8A and 8B, at step S1, the content menu is displayed, and at step S2, by looking through the menu display, whether or not the content selection was made is checked.

If the content selection was made, the procedure proceeds to step S3, and whether or not the encrypted content is stored is checked. If not stored, at step S4, a request for the transfer of the copy of the encrypted content is made to the host device, and the copy is stored.

Subsequently at step S5, whether or not the encryption key is stored is checked, and if not stored, at step S6, a request for the transfer of the encryption key is made to the storage device identified by referring to the encryption key management table. At step S7, when the encryption key is obtained from a transfer request destination, the obtained encryption key is stored, and the encryption key management table is renewed.

At step S8, the encrypted content is decoded by the encryption key, and is outputted. At step S5, when the encryption key is stored, the processing at steps S6 and S7 are skipped.

Subsequently, at step S9, the presence or absence of the transfer request of the encryption key from another device is checked, and if the transfer request exists, at step S10, the encryption key is transferred to the requesting device, and the stored encryption key is deleted, and at step S11, the encryption key management table is renewed. The processing of these steps S1 to S11 are repeated at step S12 until the stop instruction for the client device is received.

Incidentally, in the content management processing of the present invention, it is necessary that all the devices registered in the device information table are always in a connected state. However, in an actual using state, there are often the cases where a specific device is not always connected due to shut down of a power source, and if the encryption key is stored in the device not always connected, the encryption key cannot be transferred to another device always connected with a result that the encrypted content cannot be used by being decoded.

Hence, it is desirable to provide such processing functions that the device with the power source turned off after use is provided with the functions of an auto power up control in which the power source can be automatically inputted by the control from another device, and in a connected state of the devices with the power source separated, the power source is automatically turned on upon receipt of the transfer request of the encryption key, and the encryption key is read for the transfer request, and is transferred, and the power source is turned off by the completion of the transfer.

Further, the segment necessary only for the transfer of the encryption key and the encrypted content enabling the device to be always connected is required to be operated by full-time power supply, and the segment other than this may be turned on and off by power switch and the like.

Further, the device as the target of the present invention can be adapted to a user terminal such as PDA, and mobile phone, in addition to the personal computer and car terminal.

Further, as the content to be accessed by the use condition of copy-once, all sorts of digital contents such as a music content, screen image content, karaoke content, map content, game content, and electronic book, can be made the target (Broadcast Content)

Figure 9:
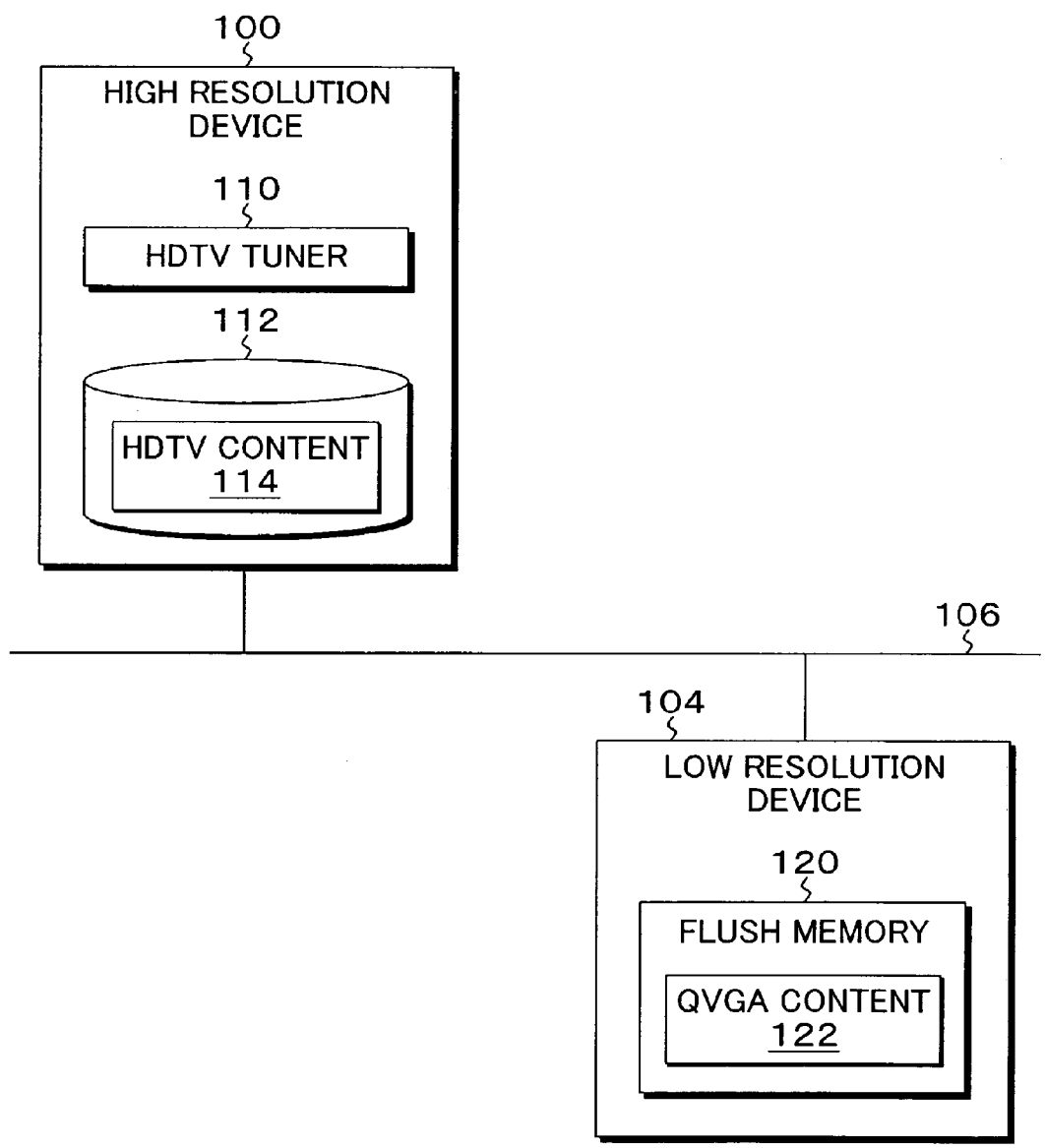
FIG. 9 is a block diagram of equipment environment adapted to a broadcast content according to the present invention.

FIG. 9 is a block diagram of device environment adapted to a broadcast content management processing according to the present invention. Incidentally, in this embodiment, though a resolution shown by a dot density is handled with image data taken as an example, the content taken as the target of the present invention also includes music data, and the resolution in the case of the music data is shown by a bit rate.

In FIG. 9, this embodiment connects a high resolution device 100 with a low resolution device through a network 106.

The high resolution device 100, for example, is a HDTV recording device incorporating a hard disk drive, and comprises a HDTV tuner 110 and a content storage unit 112 using the hard disk drive, and the content storage unit 112 stores a HDTV content 114 which is a HDTV television broadcast program received and reproduced by the HDTV tuner 110.

The low resolution device 104, for example, is a QVGA mobile terminal incorporating a flush memory 120, and stores a content which transcodes HDTV content 114 stored in the high resolution device 100 into low resolution QVGA content 122.

Such high resolution device 100 and the low resolution device 104 adapted to the present invention are the devices abiding by a rule of copy control based on copy control information (CCI) for once copy that permits recording of one time only in the receive recording of the HDTV broadcast, and moreover, comprise a certificate issued by certification organizations in order to perform communications for protection of the digital copy right between the devices. This certificate includes public key information on each device.

As the encrypted communications performed between the high resolution device 100 and the low resolution device 104, for example, a hybrid system is adopted. The hybrid system exchanges public keys after two-way authentication between the devices is performed, and a transmission source sends a transmission message by encrypting it by a session key generated by a pseudo random processing, and this session key is encrypted by the public key received from the other party, and is sent.

At the receiving side, the session key is decoded from the encrypted session key based on the secret key, and by the decoded session key, the encrypted message is decoded, thereby taking out the message.

Figure 10A:
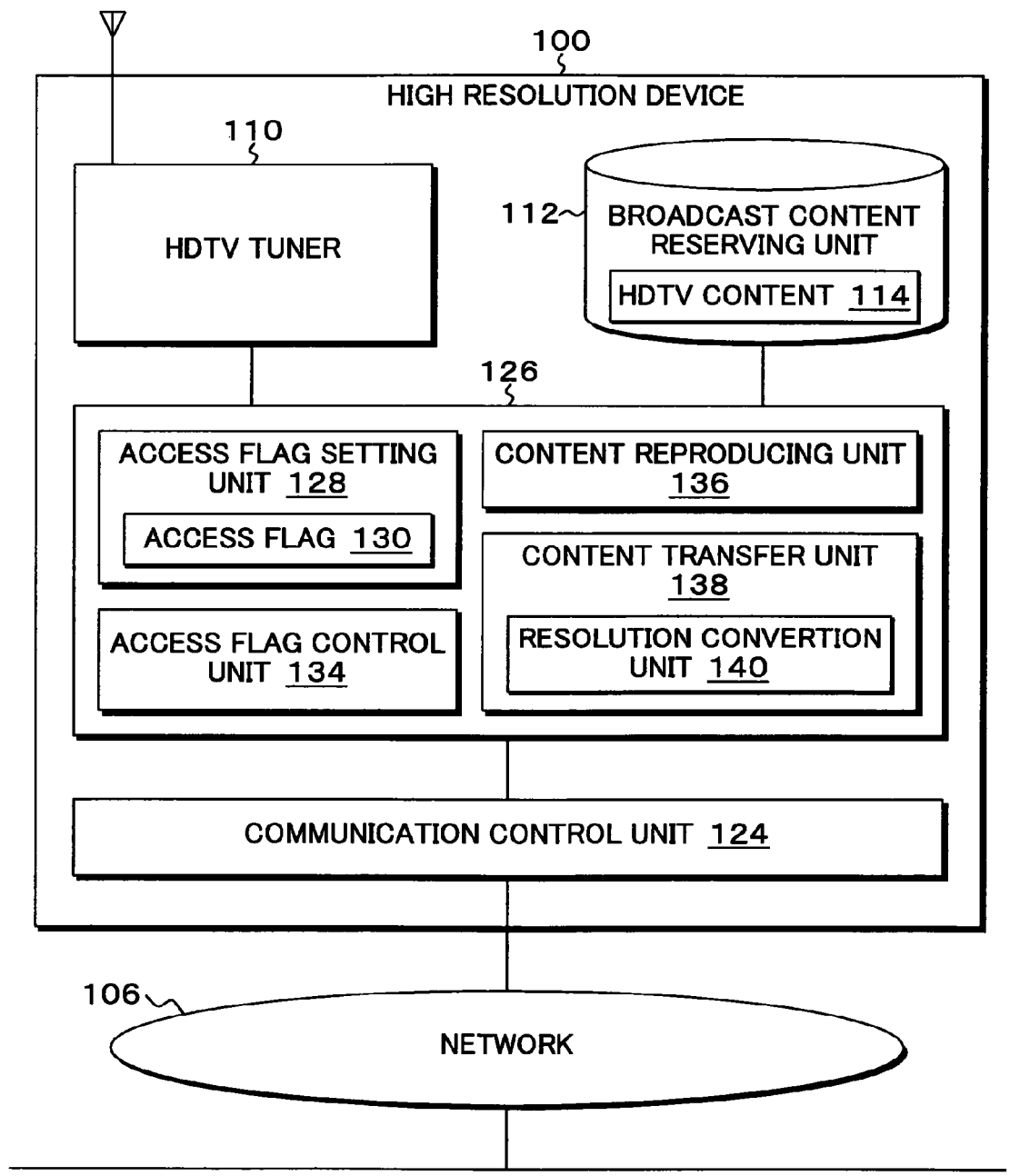
FIGS. 10A and 10B are block diagrams of a functional configuration of a high resolution device and a low resolution device of FIG. 9.
Figure 10B:
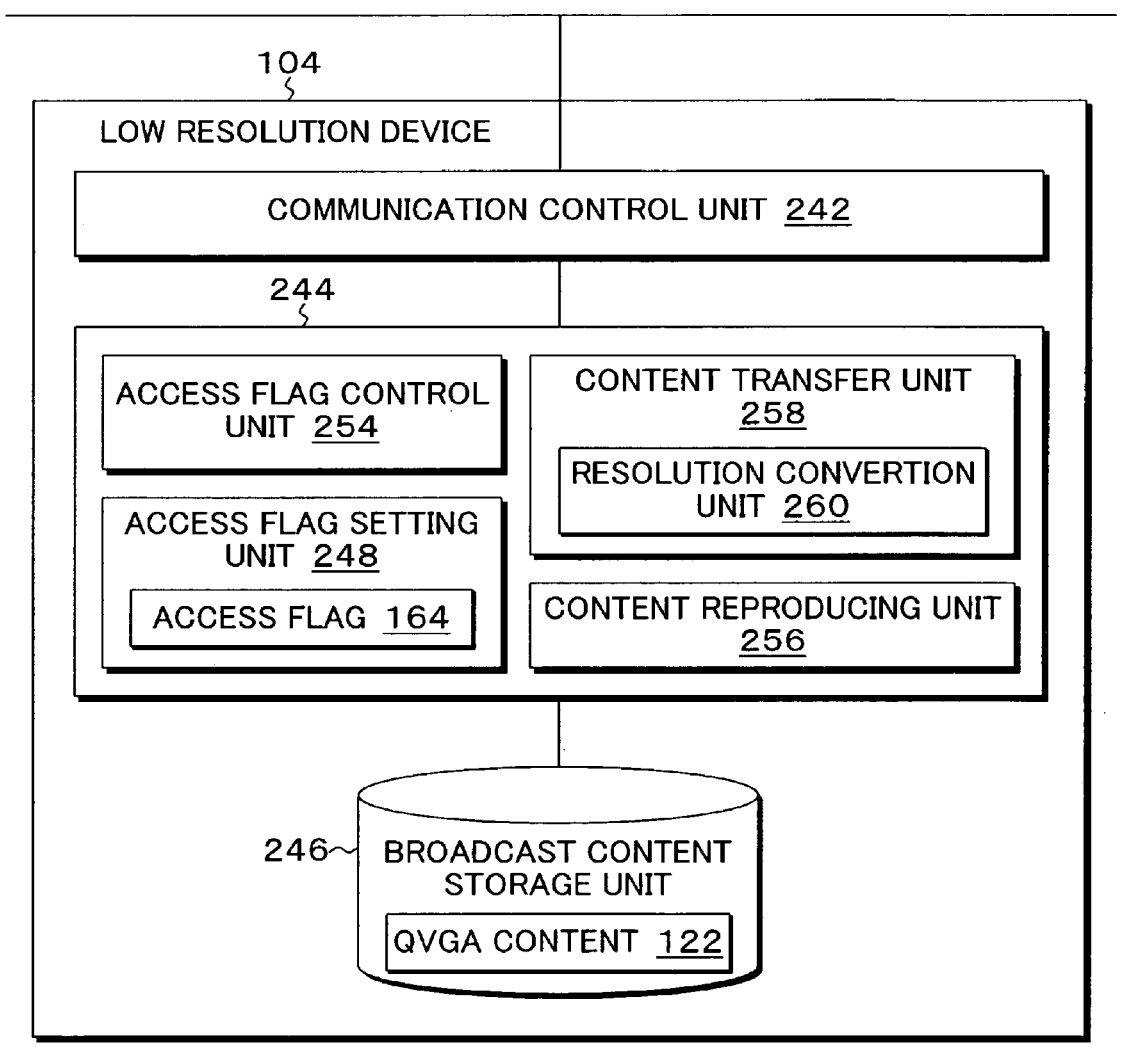

FIGS. 10A and 10B are block diagrams of the functional configurations of the high resolution device and the low resolution device of FIG. 9. In FIGS. 10A and 10B, the high resolution device 100 is provided with a communication control unit 124 and a content management unit 126 in addition to the HDTV tuner 110 and the broadcast content storage unit 112.

The content management unit 126 is an application realized by the execution of the content management program. The content management unit 126 is provided with an access flag (access information setting unit) setting unit 128, an access flat control unit (access information control unit) 134, a content reproduction unit 136, and a content transfer unit 138.

The low resolution device 104 connected to the high resolution device 100 through the network 106 comprises a communication control unit 242, a content management unit 244, and a broadcast content storage unit 246. The content management unit 244 is a function realized by the execution of the content management program.

The content management unit 244 is provided with an access flag setting unit 248, an access flag control unit 254, a content transfer unit 228, and a content reproduction unit 256.

The access flag setting unit 128 functioning as the access information setting unit provided in the content management unit 126 of the high resolution device 100 sets an access flag 130 for controlling the presence or absence of the reproduction of the broadcast content when the high definition television broadcast signal taking a copy-once received by the HDTV tuner 110 as a use condition of the copyright is stored in the broadcast content storage unit 112 as a HDTV content 114. The access flag 130 is set to 1 (on) when the HDTV content 114 is initially stored. The control of the setting of this access flag 130 is performed by the access flag control unit 134.

The content reproduction unit 136 refers to the access flag 130 when the HDTV content 114 stored in the broadcast content 112 is reproduced, and performs the reproduction processing when the access flat 130 is set to 1(reproducible), and prohibits the reproduction of the content when the access flag is set to 0 (not reproducible).

The content transfer unit 138 transcodes an original HDTV content 114 stored in the broadcast content storage 112 into the QVGA content in the low resolution device by a resolution conversion unit 140 and transmits it.

When the content is transferred by transcoding by the content transfer unit 138, the access flag control unit 134 resets the access flag 130 of the HDTV content 114, that has become the transfer source, to 0. Further, when the content transferred to the low resolution device 104 is returned, the access flag control unit 134 sets the access flag 130 to 1, and makes the HDTV content 114 reproducible.

The functions of the access flag setting unit 248, the access flag control unit 254, the content reproduction unit 256, and the content transfer unit 258 provided in the content management unit 244 at the low resolution device 104 side are also basically the same as the content management unit 126 of the high resolution device 100.

Meantime, a point of difference lies in that, upon receipt of the transfer of the low resolution QVGA content 122 transcoded from the high resolution device 100, it is stored in the broadcast content storage unit 246, and accompanied with this, the access flag setting unit 248 sets the access flag 164, and when it is stored, the access flag control unit 254 sets the access flag 164 to 1, thereby making the reproduction by the content reproduction unit 256 possible.

Further, when the broadcast content is transferred to the low resolution device lower than the QVGA content 122, the content transfer unit 258 performs transcoding by the resolution conversion unit 260 and transfers the broadcast content, and accompanied with this transfer, the access flag control unit 254 sets the access flag 164 to 0. Incidentally, if there does not exist a device of resolution lower than the QVGA content, there is no need for the function of the content transfer unit 258.

Figure 11A:
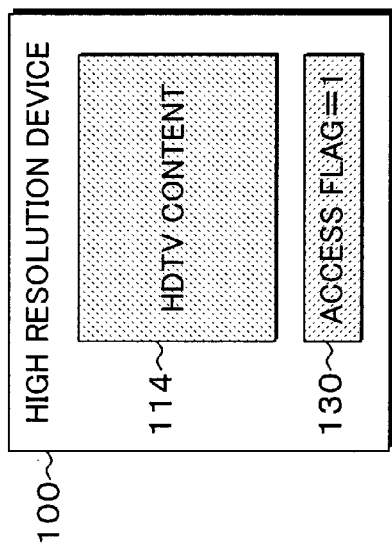
FIGS. 11A to 11C are explanatory drawings of a transfer processing accompanied with a resolution conversion of the broadcast content of FIGS. 10A and 10B.
Figure 11B:
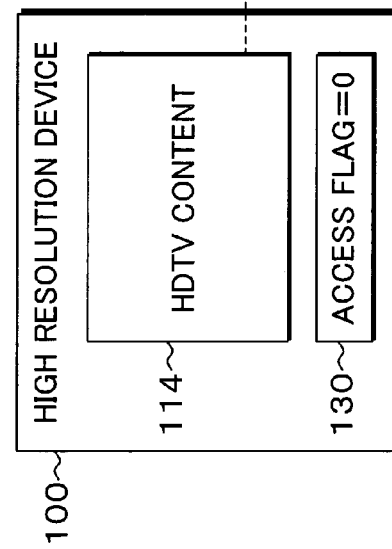
Figure 11C:
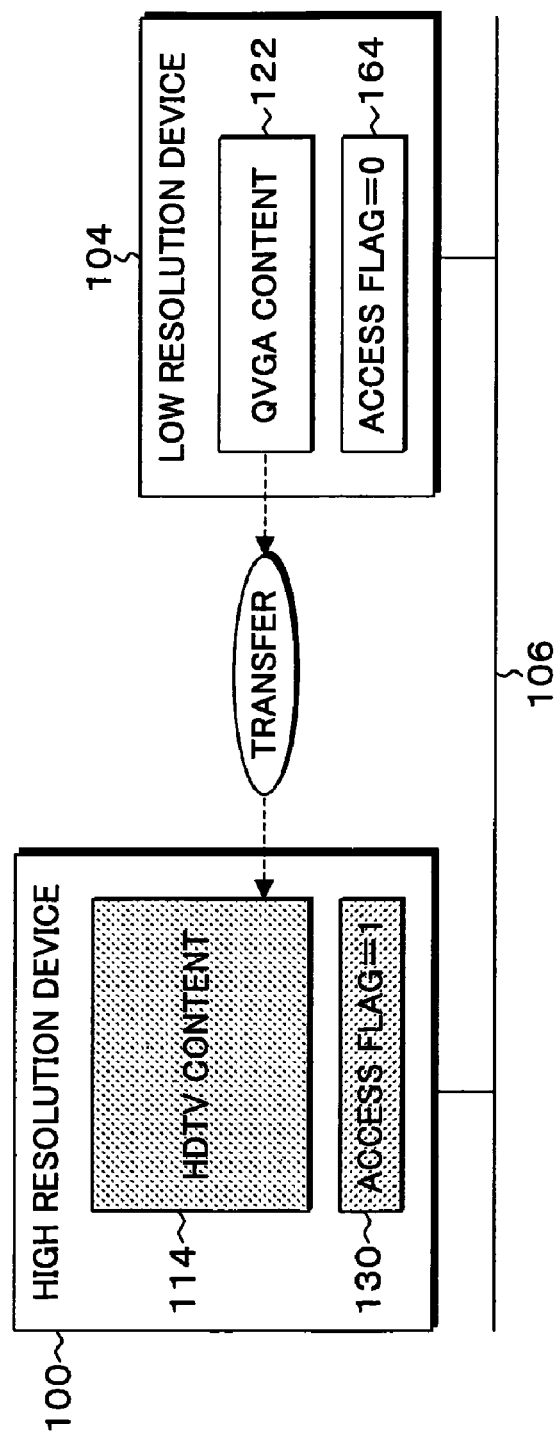

FIGS. 11A to 11C are explanatory drawings of the transfer processing accompanied with the resolution conversion of the broadcast content in FIGS. 10A and 10B. FIG. 11A shows a state in which the broadcast content in the high resolution device 100 is received and recorded, in which the received HDTV content 114 is stored, and at the same time, its access flag 130 is set to 1.

Next, as shown in FIG. 11B, when the content is transferred from the high resolution device 100 to the low resolution device 104, the HDTV content 114 in the high resolution device 100, for example, is transcoded and transferred to the QVGA content 122 so as to be stored in the low resolution device 104, and at this time, the access flag 130 of the high resolution device 100 which becomes a transfer source is set to 0, and the access flag 164 of the low resolution device 104 which becomes a transfer destination is set to 1.

In this state, there exist contents of the same broadcast content which are different in resolution in the high resolution device 100 and the low resolution device 104, respectively. However, the content that can be reproduced is that of the low resolution device 104 only, whose access flag 164 is set to 1, and in the case of the high resolution device 100, the content cannot be reproduced since the access flag 130 is set to 0, thereby the copy control rule of a copy-once required for the recording of the HDTV content can be maintained.

FIG. 11C is an explanatory drawing in the case where the content is returned to the high resolution device 100 from the low resolution device 104. When the QVGA content 122 of the low resolution device 104 is returned to the high resolution device 100, the transfer processing is performed in which the transcoding of the content to the high resolution is not performed, that is, the transfer instruction only is sent to the high resolution device 100 without accompanied with the transfer of the content.

By this transfer to the high resolution side, the access flag 164 in the low resolution device 104 is set to 0, and the access flag 130 of the high resolution device 100 is set to 1, so that the content can be reproduced only in the high resolution device 100 that has become a transfer destination.

Incidentally, in the low resolution device 104 having become a transfer source, the QVGA content 122 stored after the transfer may be left alone or deleted. When the QVGA content 122 is left alone as illustrated, the access flag 164 is reset to 0. Further, when the QVGA content 122 is deleted after the transfer, the access flag 164 also may be deleted.

Figure 12A:
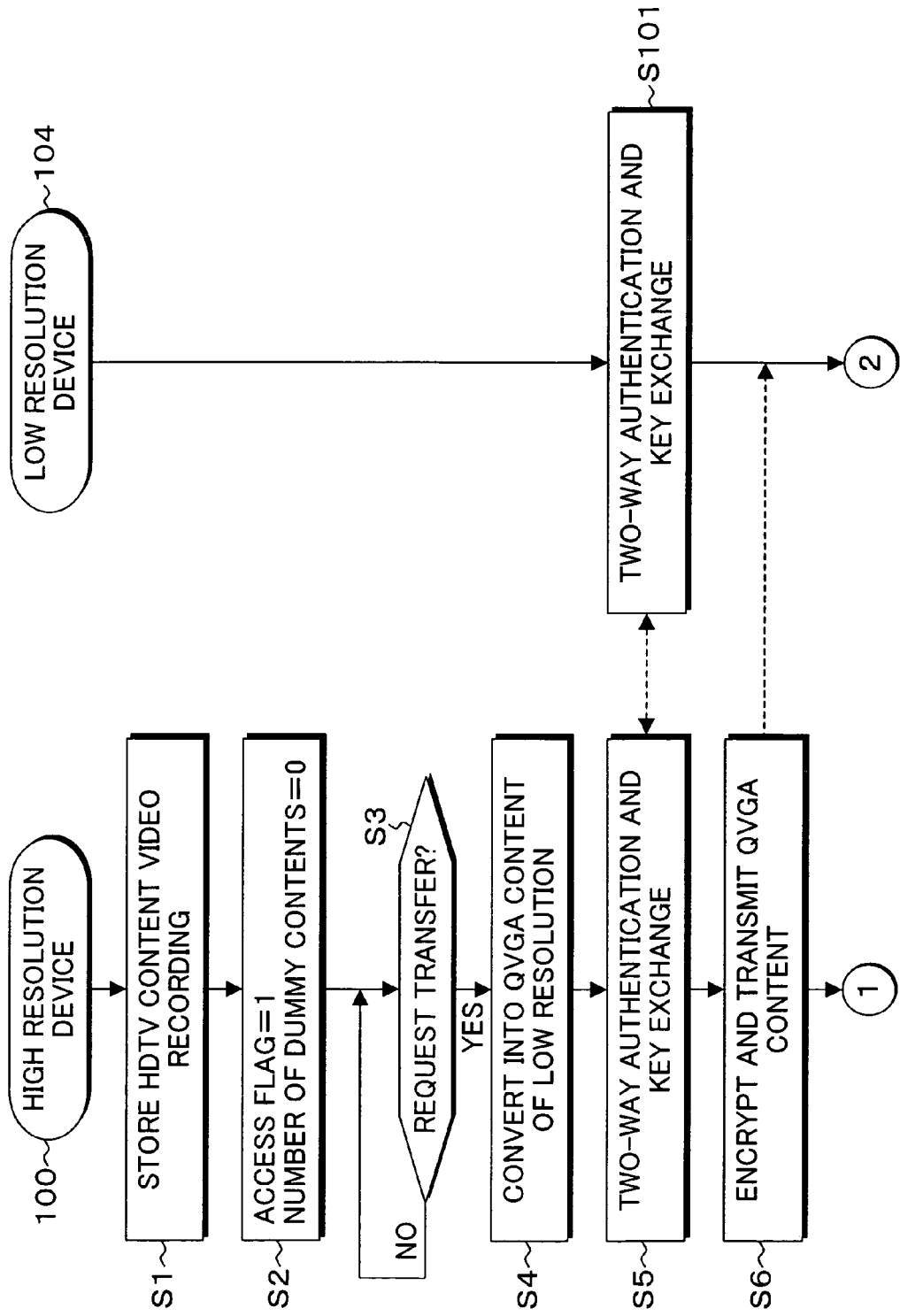
FIGS. 12A and 12B are time charts of the transfer processing of the broadcast content of FIGS. 11A to 11C.
Figure 12B:
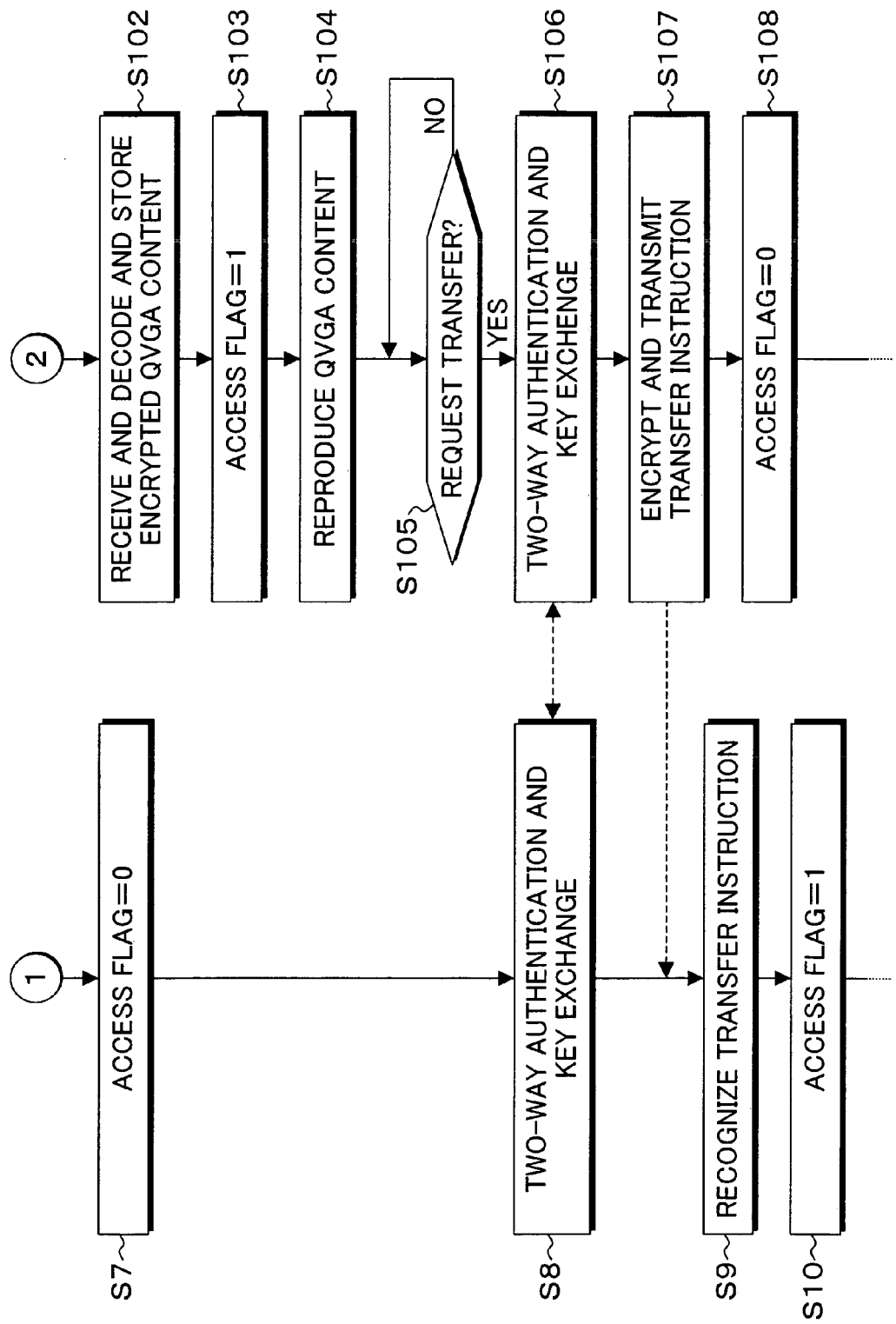

FIGS. 12A and 12B is a time chart of the transfer of the broadcast content of FIGS. 11A to 11C. In FIGS. 12A and 12B, in the high resolution device 100, at step S1, recording and storage are performed based on the receipt of the HDTV content, and when recording and storage are completed, at step S2, the access flag is set to 1.

Subsequently, at step S3, when the transfer request to the low resolution device 104 is discriminated, the procedure proceeds to step 4, and the QVGA content of the low resolution is applied with transcoding, and after that, at step S5, the two-way authentication and the key exchange are performed with the low resolution device 104.

This two-way authentication and the key exchange are performed based on a certificate issued by certification organizations which are, for example, set up in advance in the high resolution device 100 and the low resolution device 104. When the two-way authentication is successful and the key exchange is over, at step S6, the high resolution device 100 encrypts the QVGA content already applied with transcoding, and transmits it to the low resolution device 104.

Since this encryption, for example, adopts a hybrid system, the QVGA content is encrypted by a session key generated as a pseudo random number, and moreover, the session key is encrypted by the public key notified from the low resolution device 104, and both of them are combined and transmitted.

The low resolution device 104 receives/decodes and stores the encrypted QVGA content at step S102. This reception/decoding of the encrypted QVGA content is performed such that the encrypted session key is decoded based on its own secret key (private key), and the encrypted QVGA content is decoded by the decoded session key and is stored.

In the high resolution device 100 that has become the transmission source, at step S6, when the encryption transmission is completed, the access flag is reset to 0 at step S7, and the reproduction of the content in the high resolution device 100 is prohibited. On the other hand, in the low resolution device 104 that has become the transfer destination, at step S102, the encrypted QVGA content is received/decoded, and is stored, and after that, at step S103, the access flag is set to 1. Then, at step S104, the QVGA content can be reproduced under a condition that the access flag is set to 1.

Subsequently, at step S105, when the transfer request to the high resolution device 100 is discriminated, at step S106, the two-way authentication and the key exchange are performed, and after that, at step S107, the transfer instruction only is encrypted, and is transmitted. Then, at step S108, since the QVGA content is left alone, the access flag is set to 0.

In the high resolution device 100, at step S8, the two-way authentication and the key exchange are performed with the low resolution device 104, and after that, at step S9, the encrypted transfer instruction is decoded and recognized, and at step S10, the access flag is set to 1, thereby making the reproduction of the HDTV content possible.

Figure 13A:
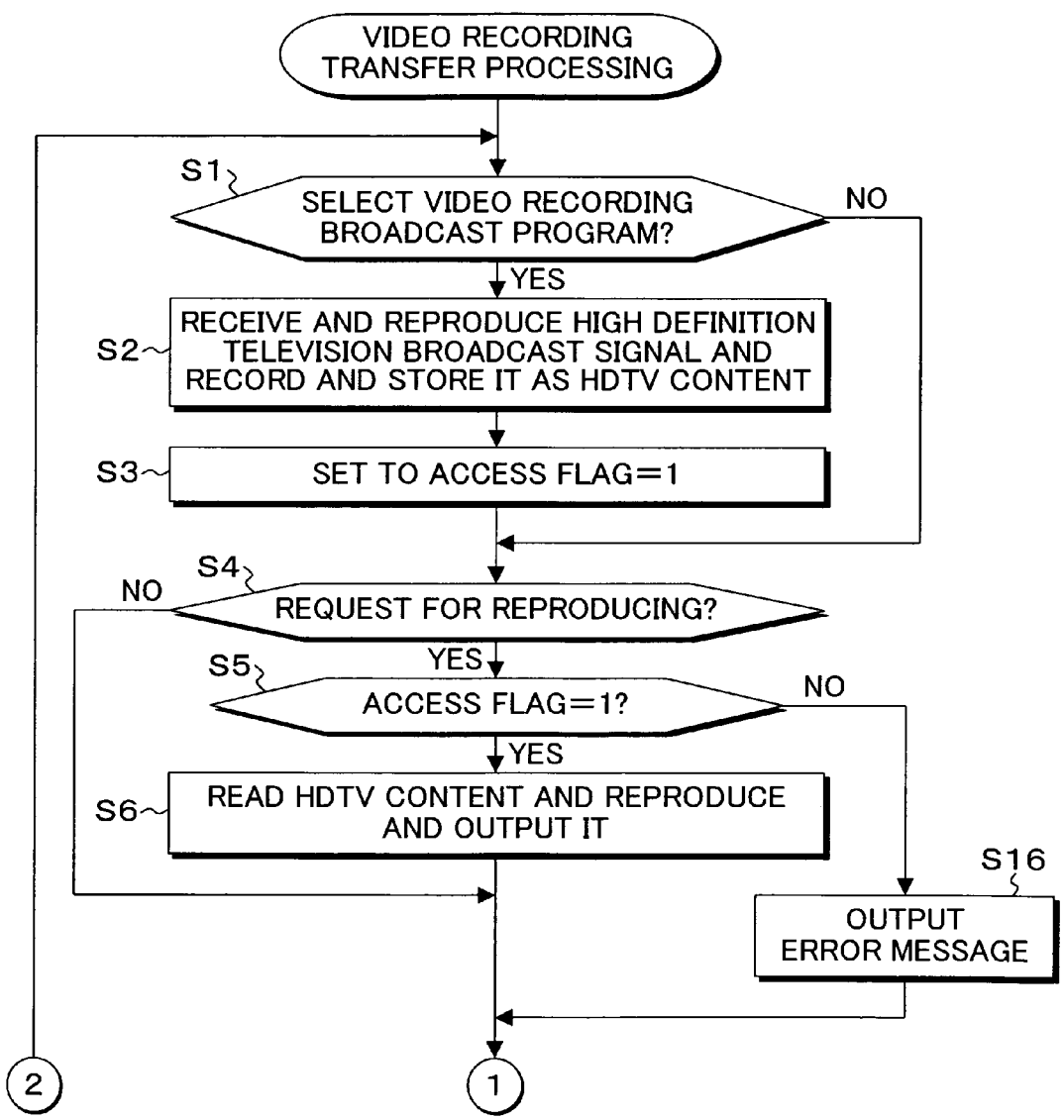
FIGS. 13A and 13B are flowcharts of a video transfer processing in the high resolution device of FIGS. 10A and 10B.
Figure 13B:
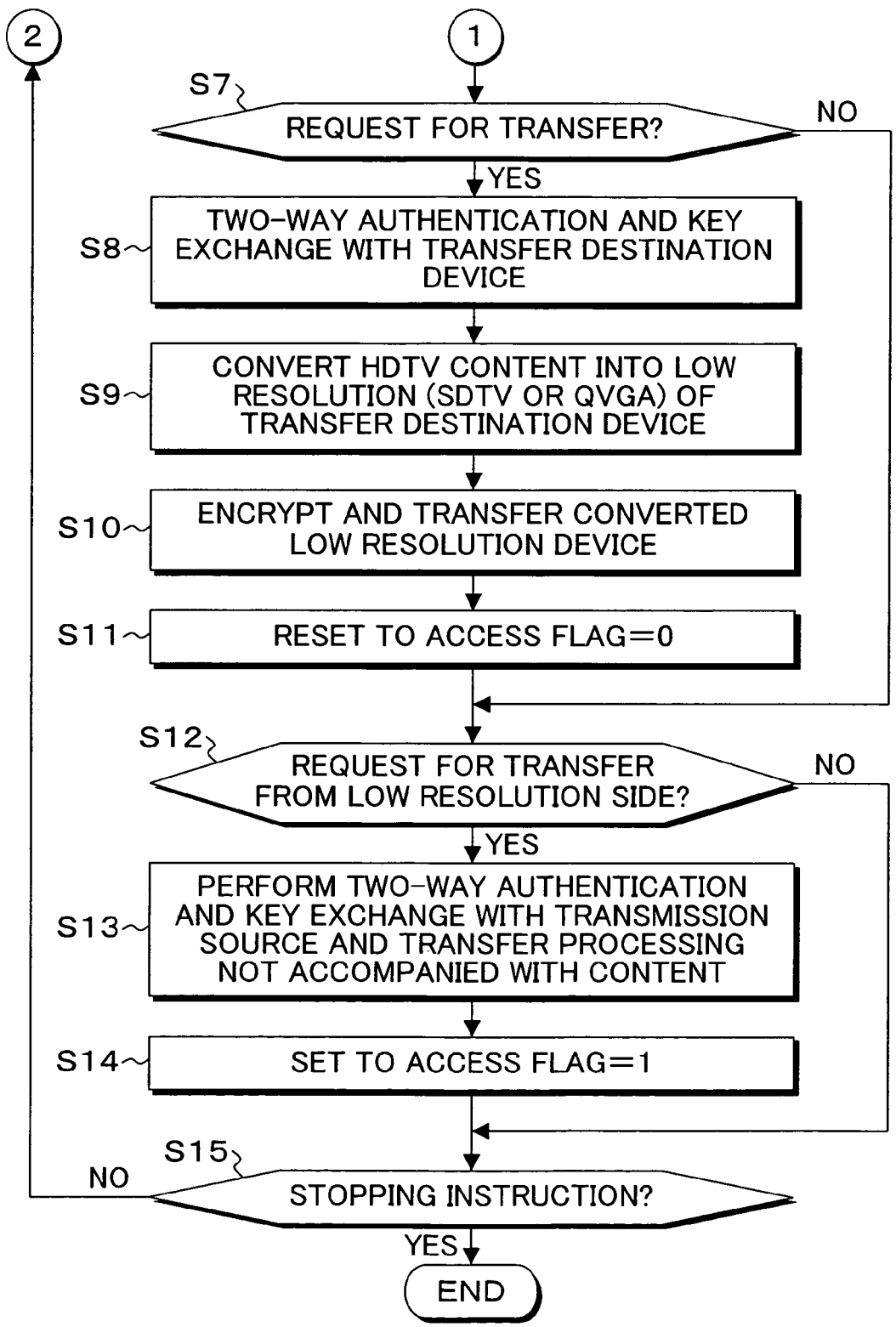

FIGS. 13A and 13B are flowcharts of the video transfer processing in the high resolution device of FIGS. 10A and 10B. In FIGS. 13A and 13B, at step S1, when the selection of the video broadcast program is performed, at step S2, a high definition television broadcast signal is received and reproduced, and is recorded and stored as the HDTV content. Then, at step S3, the access flag is set to 1.

Subsequently, at step S4, when the reproduction request is discriminated, at step S5, if the access flag is set to 1, the procedure proceeds to step S6, and the stored HDTV content is read, and is reproduced and outputted. If the access flag is set to 0, at step S16, an error message is outputted, and no reproduction output is performed.

Subsequently, at step S7, when the transfer request is discriminated, at step S8, the two-way authentication and the key exchange are performed with the device of the transfer destination, and after that, at step S9, the HDTV content is transcoded into the low resolution, for example, the SDTV (standard television) or the QVGA. Then, at step S10, the transcoded low resolution content is encrypted and transferred, and after that, at step S11, the access flag is set to 0. At step S7, if the transfer request does not exist, the procedure skips the steps S8 to S11.

Subsequently, at step S12, when the transfer request from the low resolution side is discriminated, the procedure proceeds to step S13, and after performing the two-way authentication and the key exchange with the transfer source, performs the transfer processing without accompanied with the content. Then, at step S14, the access flag is set to 1, thereby making the reproduction of the HDTV content possible. These processing of steps S1 to 14 are repeated until the stop instruction is received at step S15.

Figure 15:
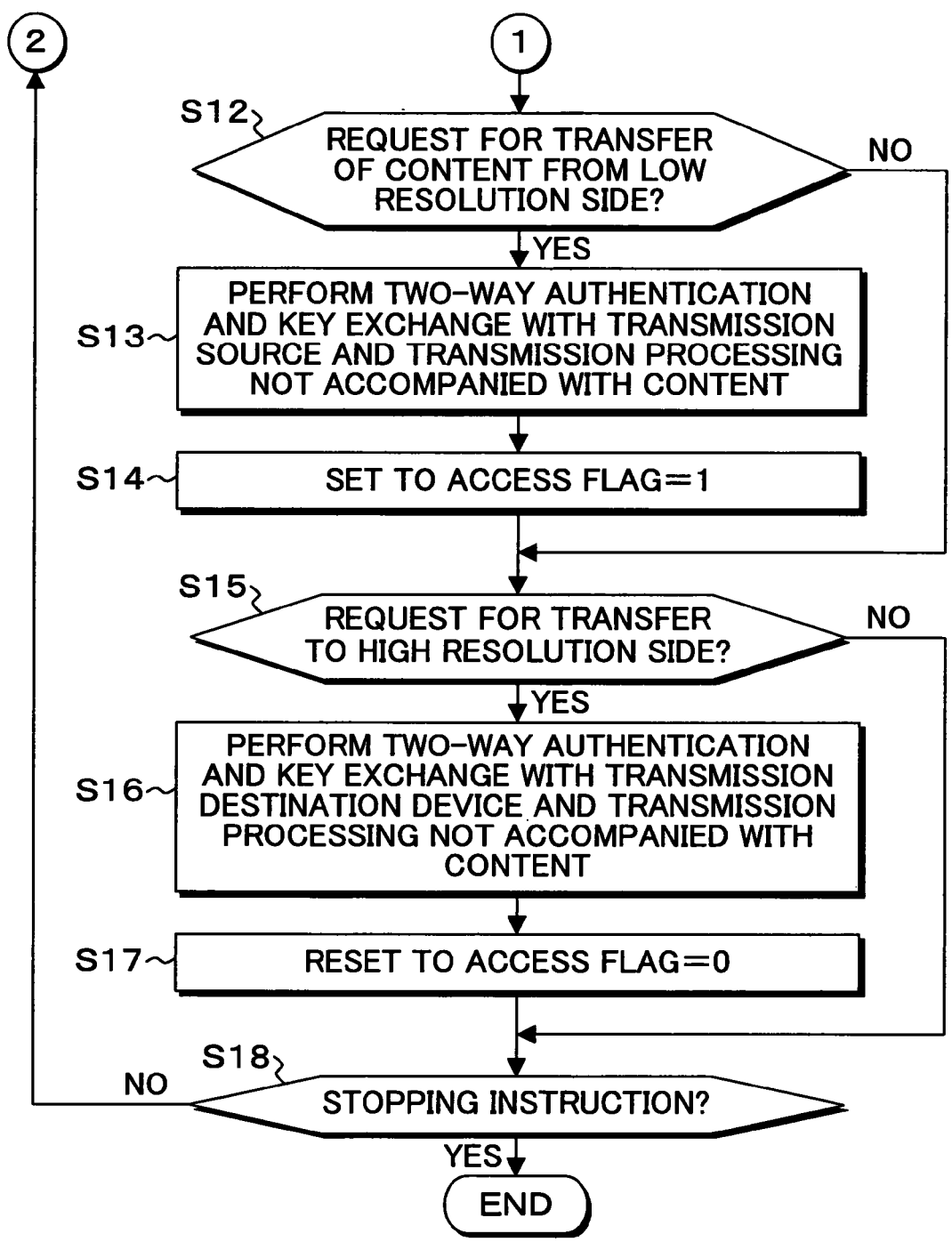
FIG. 15 is a flow chart of the video transfer processing subsequent to FIG. 14.

FIGS. 14 and 15 are flowcharts of the video transfer processing in the low resolution device of FIGS. 10A and 10B. In FIG. 14, at step S1, when the transfer request from the high resolution side is discriminated, at step S2, the encrypted content, for example, the SDTV content is received and decoded, and is stored, and at step S3, the access flag is set to 1.

At step S4, when the reproduction request is discriminated, at step S6, the SDTV content is read, and is reproduced and outputted under a condition that the access flag is set to 1 at step S5. When the access flag is set to 0, the procedure proceeds to step S19, and performs an error message output, and does not perform the reproduction.

At step S7, when the transfer request to the low resolution side is discriminated, at step S8, the two-way authentication and the key exchange with the device of the transfer destination are performed, and after that, at step S9, the stored content (SDTV) is converted into the low resolution QVGA of the transfer destination, and at step S10, the converted content is encrypted and transferred, and at S11, the access flag is reset to 0

Subsequently at step 12 of FIG. 15, when the transfer request of the content from the low resolution side is made, the procedure proceeds to step S13, and the two-way authentication and the key exchange are performed with the transfer destination device, and the transfer processing without accompanied with the content is performed, and after that, at step S14, the access flag is set to 1.

Incidentally, the processing of steps S7 to S14 are not performed when the stored broadcast content is at the lowest resolution because no transcoding lower than the lowest resolution is possible.

Next, at step 15 of FIG. 15, when the transfer request toward the high resolution side is discriminated, at step S16, the two-way authentication and the key exchange with the transfer destination device are performed, and the transfer processing with no content accompanied is performed, and at step S17, the access flag is reset to 0. The processing of these steps S1 to S17 are repeated at step S18 until the stop instruction is received.

Figure 16:
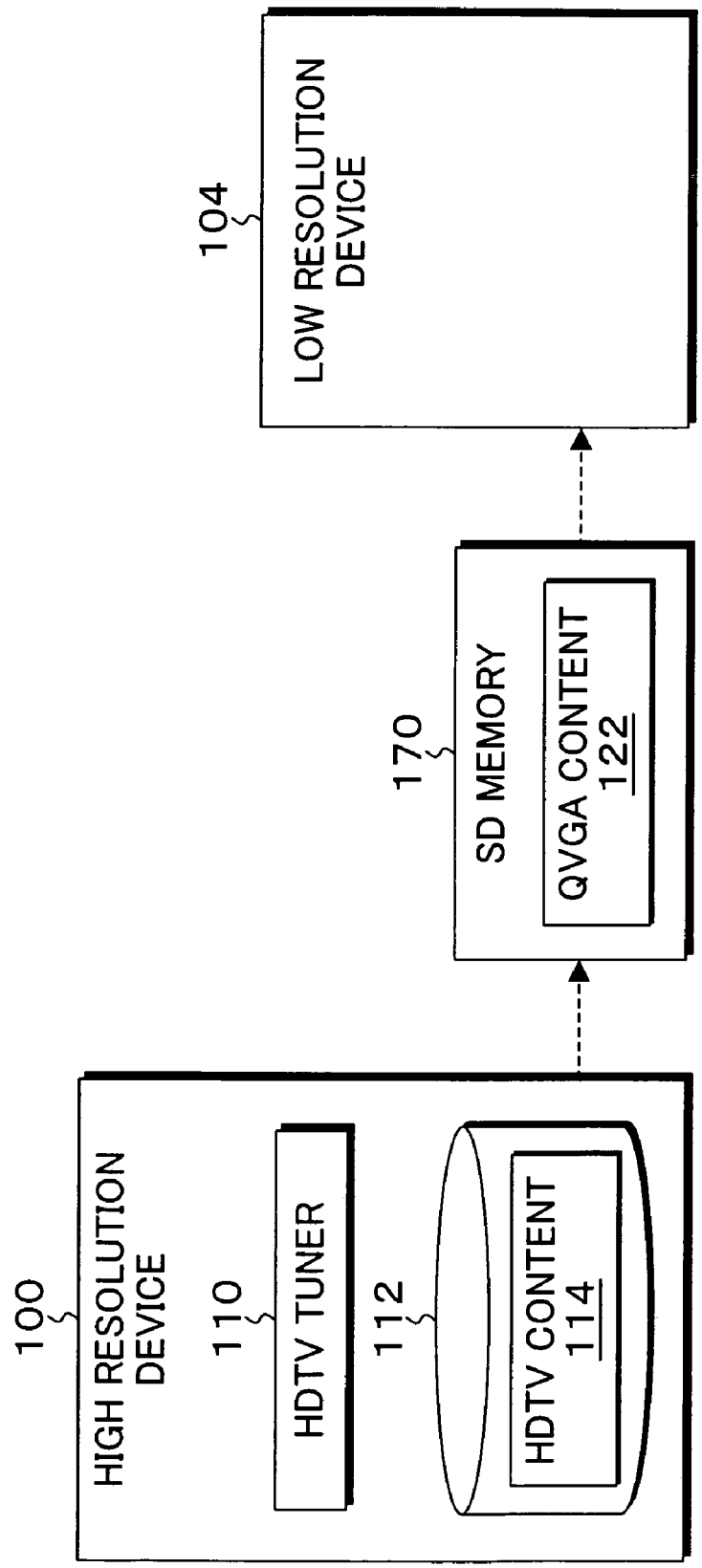
FIG. 16 is an explanatory drawing of the device environment that transfers the broadcast content by using a SD memory.

FIG. 16 is an explanatory drawing of another embodiment of the device environment that transfers the broadcast content of the present invention, and in this embodiment, the broadcast content is transferred between the devices by using a SD memory.

In FIG. 16, the high resolution device 100, similarly to the case of FIG. 9, comprises the HDTV tuner 110 and the broadcast content 112, and stores the HDTV content 114 received by the HDTV tuner 110.

On the other hand, the low resolution device 104 is a device capable of connecting to the card slot of the SD memory 170, and transcodes the HDTV content 114 stored in the high resolution device 110 into the QVGA content 122 so as to be stored in the SD memory 170, and after that, inserts this SD memory 170 into the card slot of the low resolution device 104, so that the content can be transferred and stored.

The functional configuration of the high resolution device 100 in the embodiment of FIG. 16 is the same as that of FIGS. 10A and 10B except that an adaptor is provided for the SD memory 170. Further, the low resolution device 104 is also the same as that of FIGS. 10A and 10B in functional configuration, and is, different only in that an adaptor for the SD memory is provided.

Figure 17:
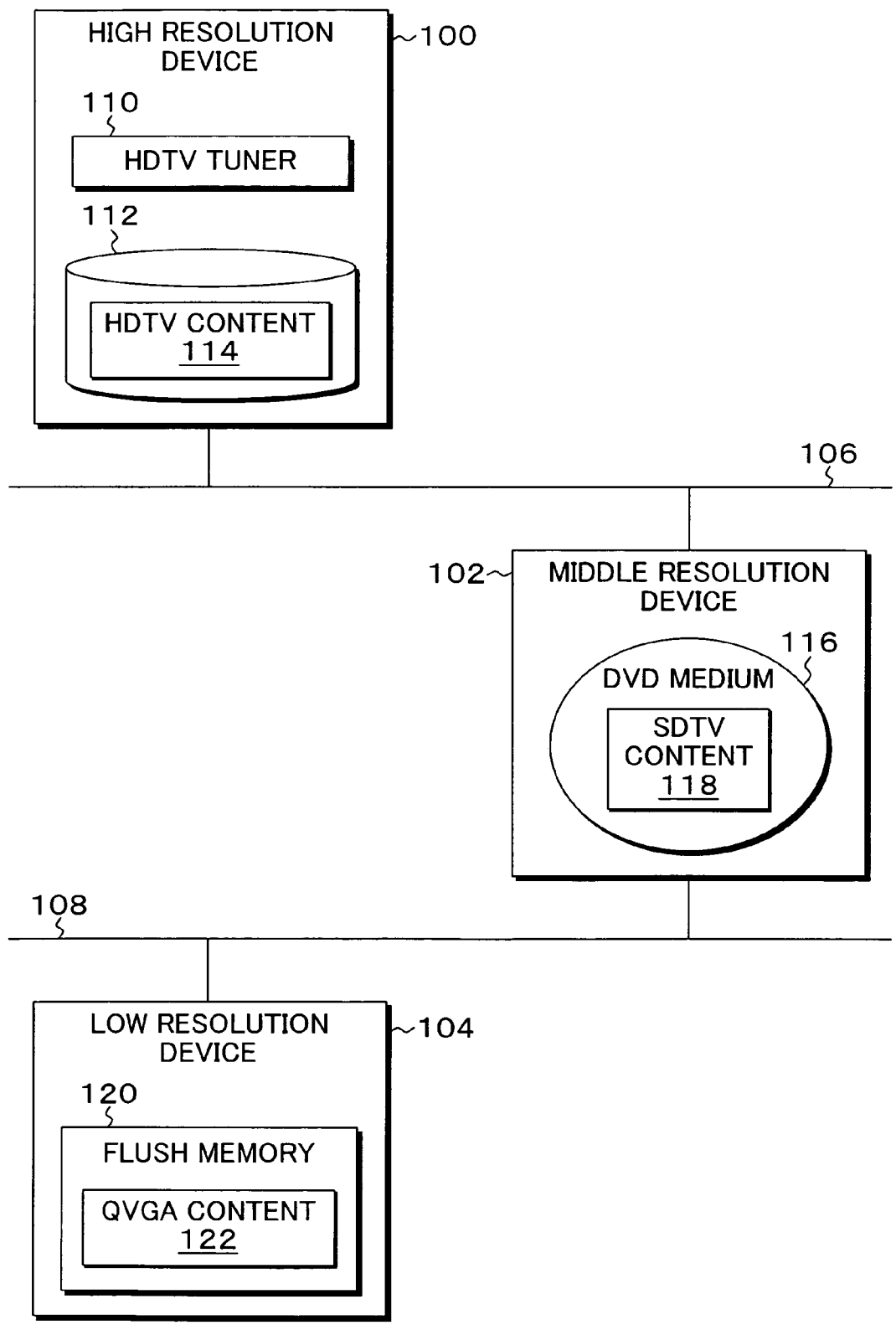
FIG. 17 is a block diagram of another device environment adapted to the broadcast content management processing of the present invention.

FIG. 17 is a block diagram of another device environment adapted to the broadcast content management processing of the present invention, and in this embodiment, an example is cited of the case where the broadcast content is transferred among three devices such as the high resolution device 100, the middle resolution device 102, and the low resolution device 104.

In FIG. 17, the high resolution device 100 and the low resolution device 104 are the same as that of FIGS. 8A and 8B. Further, between both of them, there is provided a middle resolution device 102, and as the middle resolution device 102, for example, there is provided a device such as a DVD recorder, and as a middle resolution content that is transferred from the high resolution device 100 into a DVD medium 116 by transcoding, there is stored the SDTV content 118.

The SDTV content is a standard television broadcast content, and corresponds to resolutions of a NTSE television broadcast signal and a PAL television broadcast signal. In this example, the high resolution device 100 is connected to the middle resolution device 102 through the network 106, and the middle resolution device 102 is connected to the low resolution device 104 through the network 108.

Further, in the embodiment of FIG. 17, in addition to the access flag that makes the reproduction of the broadcast content possible, the number of dummy contents that limits the maximum number of the number of copies of the broadcast content is set and controlled.

Figure 18A:
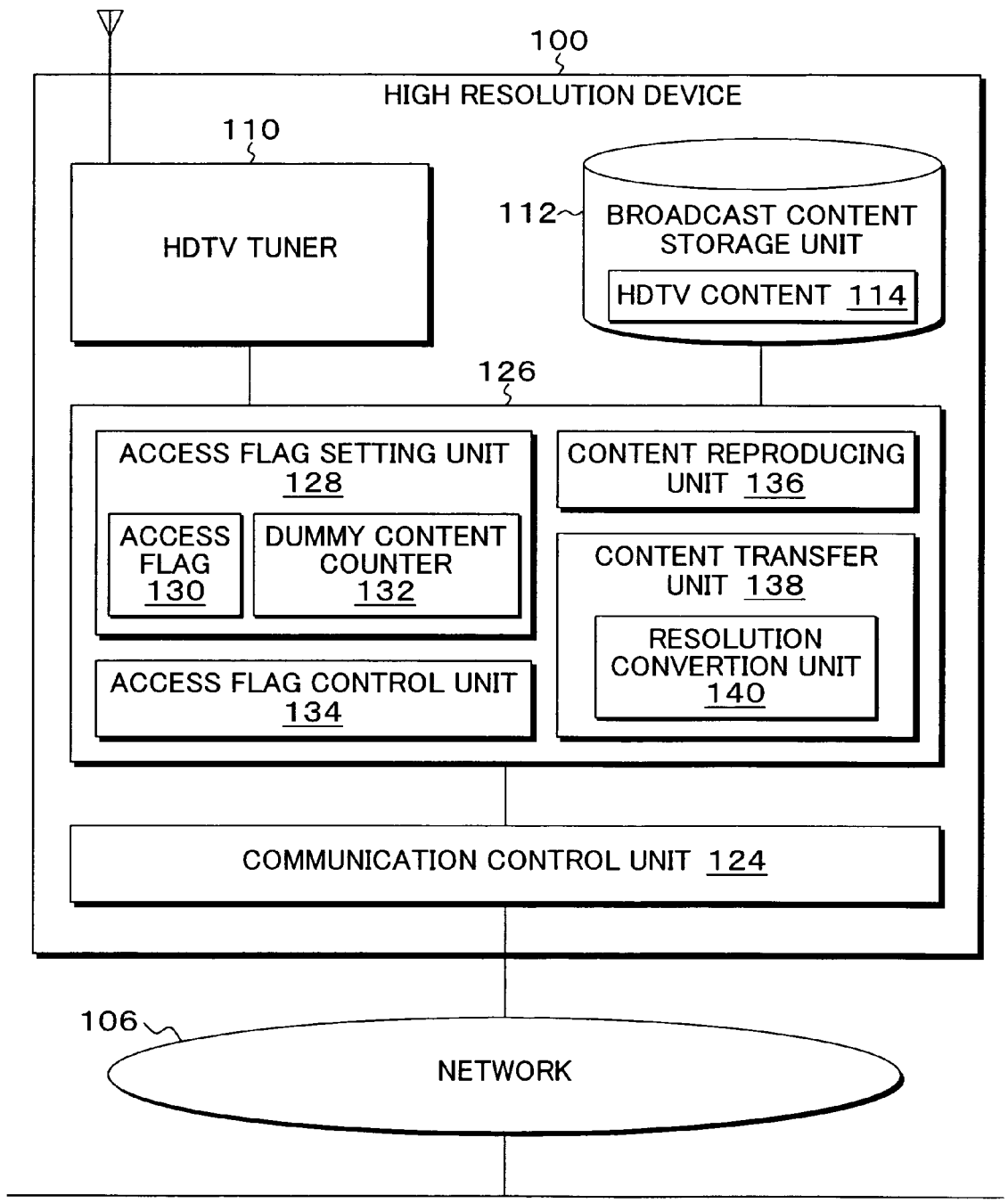
FIGS. 18A and 18B are block diagrams of the device configuration of the high resolution device and a middle resolution device of FIG. 17 managing the number of dummy contents.
Figure 18B:
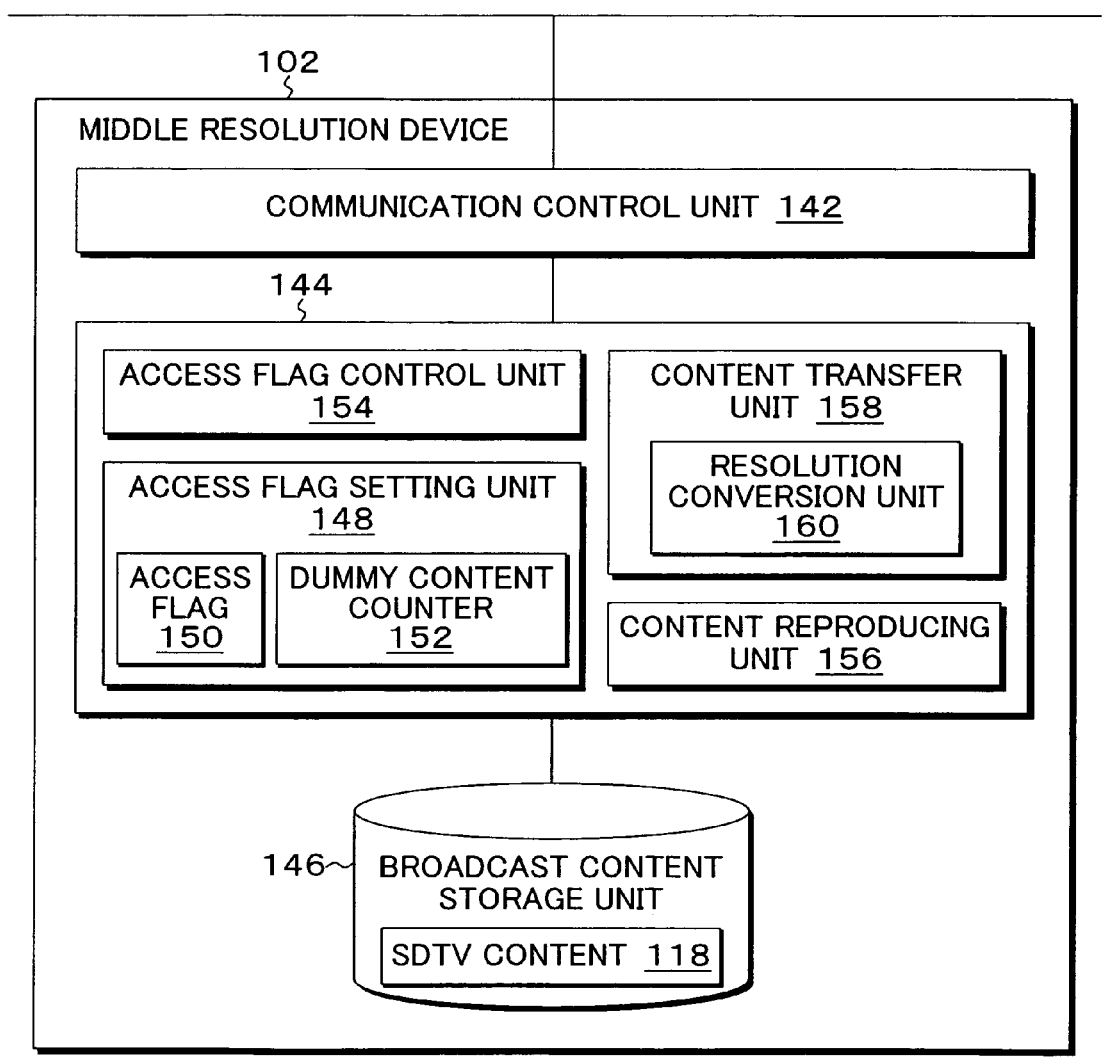

FIGS. 18A and 18B is a block diagram of the functional configuration of the high resolution device 100 and the middle resolution device 102 in FIG. 17 that manages the dummy content to limit the number of copies of the broadcast content. In FIGS. 18A and 18B, the high resolution device 100 comprises a communication control unit 124, the content management unit 126, the HDTV tuner 110, and the broadcast content storage unit 112.

The content management unit 126 is provided with the access flag setting unit 128, the access flag control unit 134, the content reproduction unit 136, and the content transfer unit 138, and is basically the same as the embodiment of FIGS. 10A and 10B.

In addition, in the embodiment of the FIGS. 18A and 18B, the access flag setting unit 128 is provided with the dummy content counter 132.

The control of the dummy content counter 132 is realized by the counting of the number of dummy contents. In FIG. 17, when the original HDTV content 114 is transcoded, and is stored in the middle resolution device 102 as the SDTV content 118, and moreover, the SDTV content 118 of the middle resolution device 102 is transcoded, and is stored in the low resolution device 104 as the QVGA content 122, from among threes three devices, by any one of the devices, the access flag is set to 1, thereby making the reproduction possible, and in the remaining two devices, the access flags are set to 1, thereby prohibiting the reproduction, and the number of contents prohibited for reproduction is shown by the dummy content counter 132.

The middle resolution device 102 of FIGS. 18A and 18B comprises a communication control unit 142, a content management unit 144, and a broadcast content 146. The content management unit 144 is provided with a content transfer unit 158 comprising an access flag setting unit 148, an access flag control unit 154, a content reproduction unit 156, and a resolution conversion unit 160.

Although the configuration of this middle resolution device 102 is basically the same as the case of the low resolution device 104 as shown in FIGS. 10A and 10B, a dummy content counter 152 is newly provided in the access flag setting unit 148. Further, as a resolution conversion unit 160 of the content transfer unit 158, for example, as shown in FIGS. 18A and 18B, since the SDTV content 118 is stored in the broadcast content storage unit 146, when the content is transferred to the low resolution device 104, the SDTV content 118 is transcoded into the QVGA content 122.

FIGS. 19A, 19B, 20A, 20B and 21 are explanatory drawings of the transfer processing accompanied with the resolution conversion of the broadcast content in FIG. 17. FIG. 19A shows a state in which the HDTV content 114 is received and recorded in the high resolution device 100, and at this time, the access flag 130 is set to 1, and the dummy content counter 132 shows 0.

The dummy content counter 132 shows the number of contents stored in the device other than the device whose access flag is set to 1, and in this case, neither the middle resolution device 102 nor the low resolution device 104 stores the transcoded broadcast content, and therefore, the dummy content number counter 132 shows 0.

Next, as shown in FIG. 19B, the content is transferred from the high resolution device 100 to the middle resolution device 102. This transfer stores the HDTV content 114 by transcoding and transferring it into the SDTV content 118, and the access flag 130 of the transfer source is reset to 0, and the access flag 150 of the transfer destination is set to 1. Further, the dummy content counter 152 is counted up by 1, and is set to 1.

Thus, the number of dummy contents relative to the transfer of the contents from the high resolution side is determined by the following formula.

(The number of dummy contents)=(The number of dummy contents of the transfer source)+1=0+1=1

Next, as shown in FIG. 20C, the content is transferred from the middle resolution device 102 to the low resolution device 104. This transfer of the content stores the SDTV content 118 of the middle resolution device 102 in the low resolution device 104 by transcending and transferring it into the QVGA content 122. By transfer of this content, the access flag 150 of the transfer source is reset to 0, and the access flag 164 of the transfer destination is set to 1. Further, the number of dummy contents in the low resolution device 104 of the transfer destination becomes as follows.

(The number of dummy contents)=(The number of dummy contents of the transfer source)+1=1+1=2

Figure 20B:
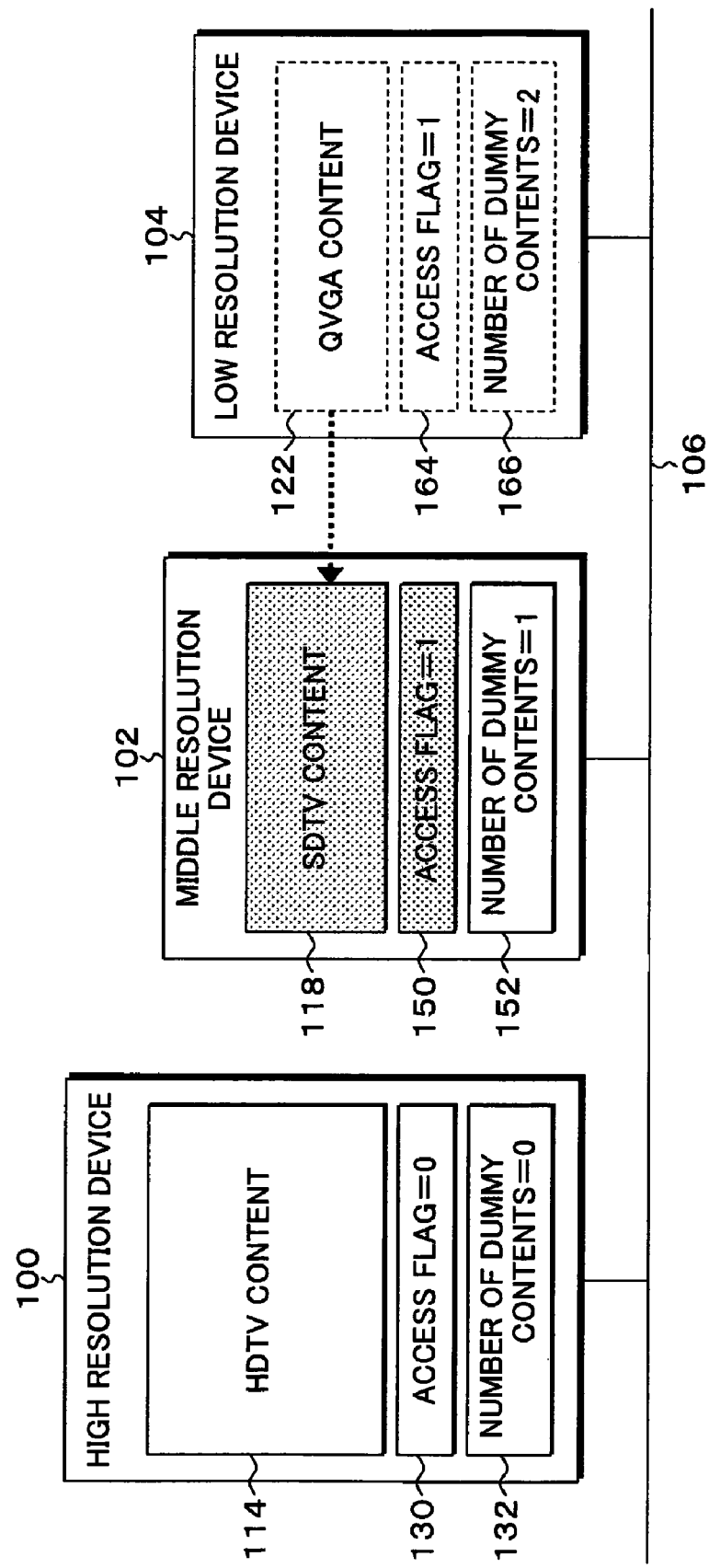

Next, as shown in FIG. 20B, a transfer that returns the content from the low resolution device 104 to the middle resolution device 102 will be described. Since the transcoding to the SDTV content 118 which becomes the high resolution of the QVGA content 122 of the low resolution device 104 is impossible, the transfer of the content is not performed, but the transfer processing of encrypting the message only of the transfer instruction and transferring the same to the middle resolution device 102.

In this embodiment, after transferring, the QVGA content 122, the access flag 164, and the number of dummy contents 166 of the low resolution device 104 which becomes the transfer source are deleted. By the transfer to the high resolution side, the low resolution device 102 which becomes a transfer destination sets the access flag 150 to 1, and makes the reproduction of the SDTV content 118 possible. Further, the number of dummy contents 152 is determined by the following formula.

(the number of dummy contents)=(the number of dummy contents of the transfer source)−1

In the case of FIG. 20B, the formula becomes as follows.

(the number of dummy contents)=(the number of the dummy contents of the transfer source)−1=2−1=1

Figure 21:
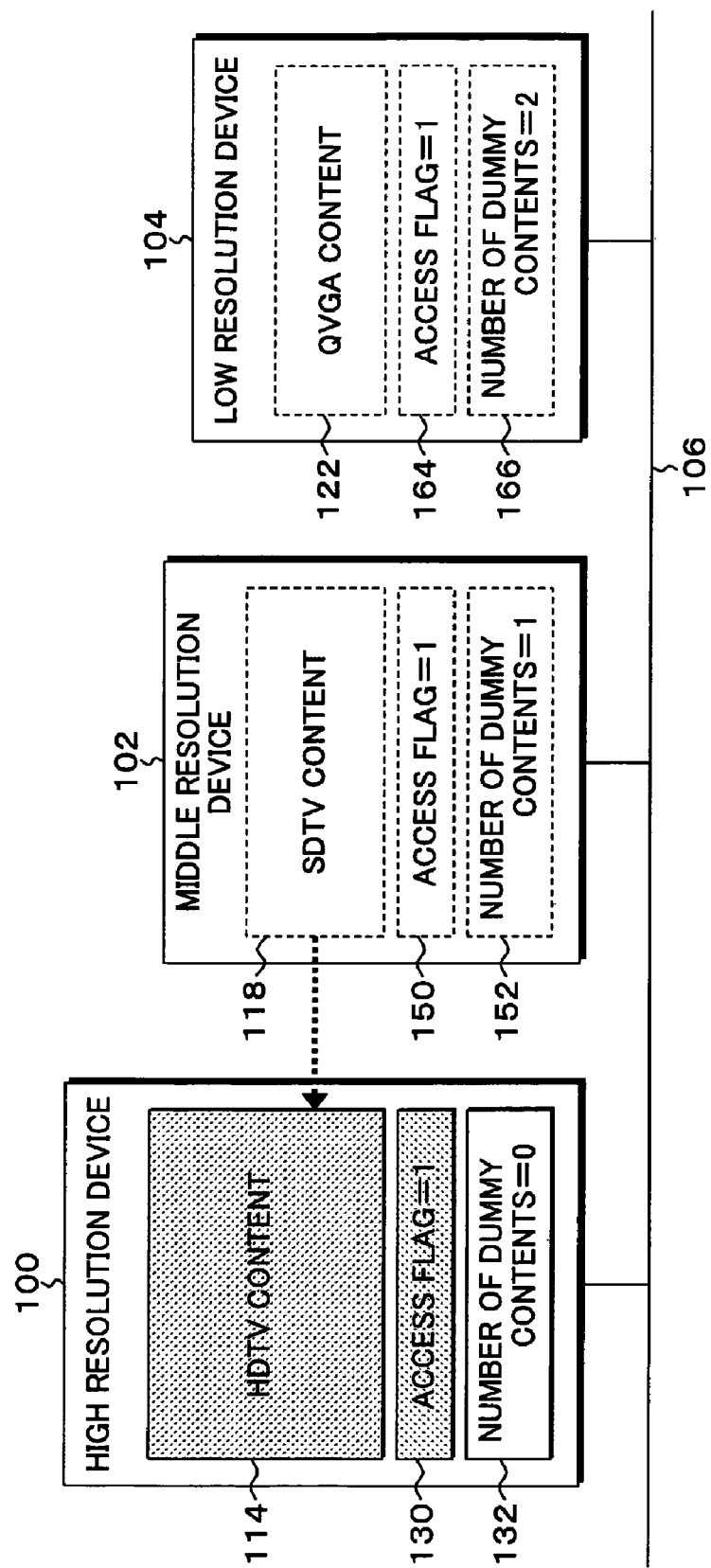
FIG. 21 is an explanatory drawing of the transfer processing subsequent to FIGS. 20A and 20B.

FIG. 21 is an explanatory drawing in the case where the content is returned to the high resolution device 100 from the middle resolution device 102. This transfer also does not perform a substantial transfer of the content, but transfers the transfer instruction only. Further, the SDTV content 118, an access flag 150, and the number of dummy contents 152 of the middle resolution device 102 which becomes a transfer source are deleted. In the high resolution device 100 that has become a transfer destination, the access flag 130 is set to 1, thereby making the HDTV content 114 reproducible. Further, the number of dummy contents 132 becomes as follows:

(the number of dummy contents)=(the number of s of the transfer source)−1=1−1=0

With respect to the number of dummy contents that is controlled by the transfer between the devices of the contents of these FIGS. 19 and 21, a threshold value for controlling the copy is set, so that the transfer and storage of the contents exceeding the threshold value are prohibited. For example, if the threshold value of the dummy content is set to a threshold value=2, then, as shown in FIG. 20C, the number of the dummy contents 166 becomes 2, and further, when transferred to another device, the number of dummy contents becomes 3 so that it exceeds the threshold value, thereby the transfer and storage of the content can be prohibited.

As a result, the content of the same broadcast content of the low resolution transcoded from the original HDTV content 114 is prevented from being substantially stored as copy content in another device without any restriction.

Figure 22B:
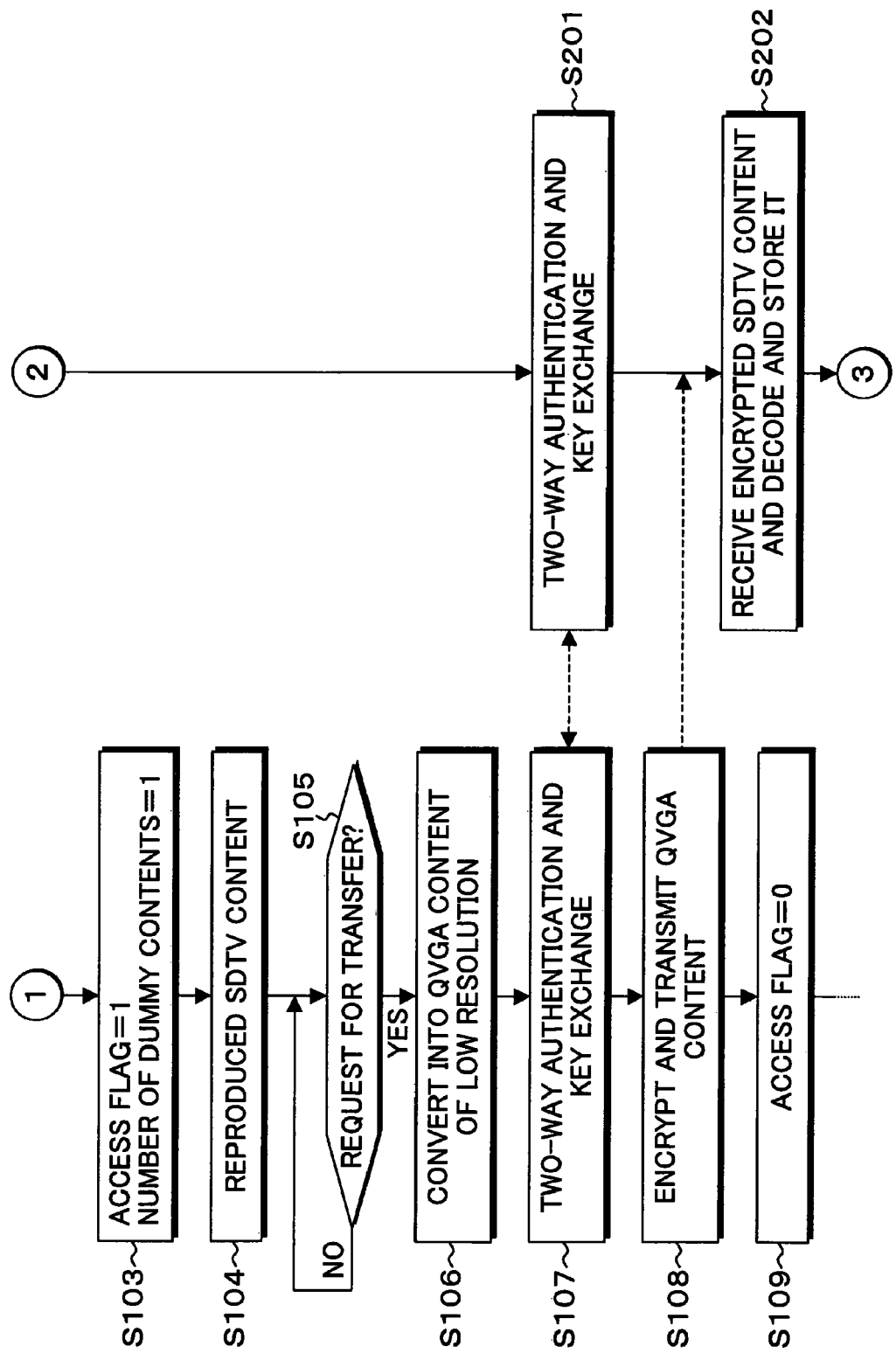
Figure 22C:
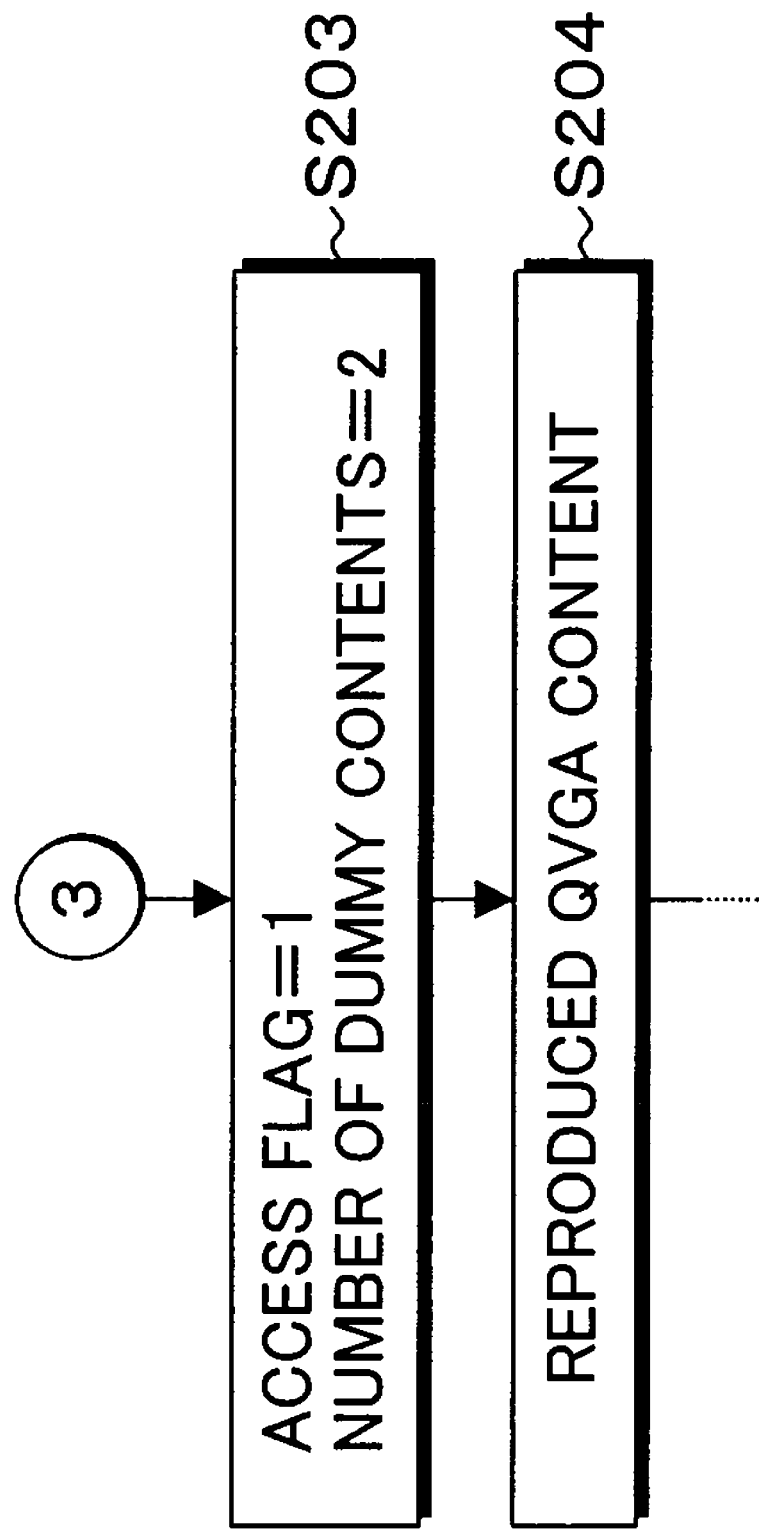

FIGS. 12A, 12B and 22C are time charts of the transfer processing of the broadcast content in FIG. 17. In FIGS. 12A, 12B and 22C, the high resolution device 100 receives and records the HDTV content at step S1, and the access flag is set to 1 at step 2, and the dummy content is set to 0.

At step S3, when the transfer request is discriminated, at step 4, it is transcoded into the SDTV content of the low resolution, and after that, at step S5, the two-way authentication and the key exchange are performed with the low resolution device 102, and at step S6, the transcoded SDTV content is encrypted, and transmitted. Then, at step S7, the access flag is reset to 0.

In the middle resolution device 102, at step S101, the two-way authentication and the key exchange are performed, and at step S102, the encrypted SDTV content is received and decoded, and then, it is stored. At step S103, the access flag is set to 1, and the number of dummy contents is set to 1. At step S104, under a condition that the access flag is set to 1, the stored SDTV content can be reproduced.

Next, at step S105, when the transfer request for the low resolution device 104 is discriminated, at step S106, the content is transcoded into the QVGA content of the low resolution, and after that, at step S103, the access flag is set to 1, and then, at step S107, the two-way authentication and the key exchange are performed, and at step S108, the QVGA content is encrypted and transmitted, and at step S109, the access flag is set to 0

In the low resolution device 104, the two-way authentication and the key exchange are performed, and at step S202, the encrypted SDTV content is received and decoded, and then, it is stored. At step S203, the access flag is set to 1, and the number of dummy contents is set to 2. At step S204, under a condition that the access flag is set to 1, the reproduction of the stored QVGA content is performed. After that, the content is returned to the middle resolution device 102 from the low resolution device 104, and the returning of the content to the high resolution device 100 from the middle resolution device 102 is also performed according to needs.

Figure 23A:
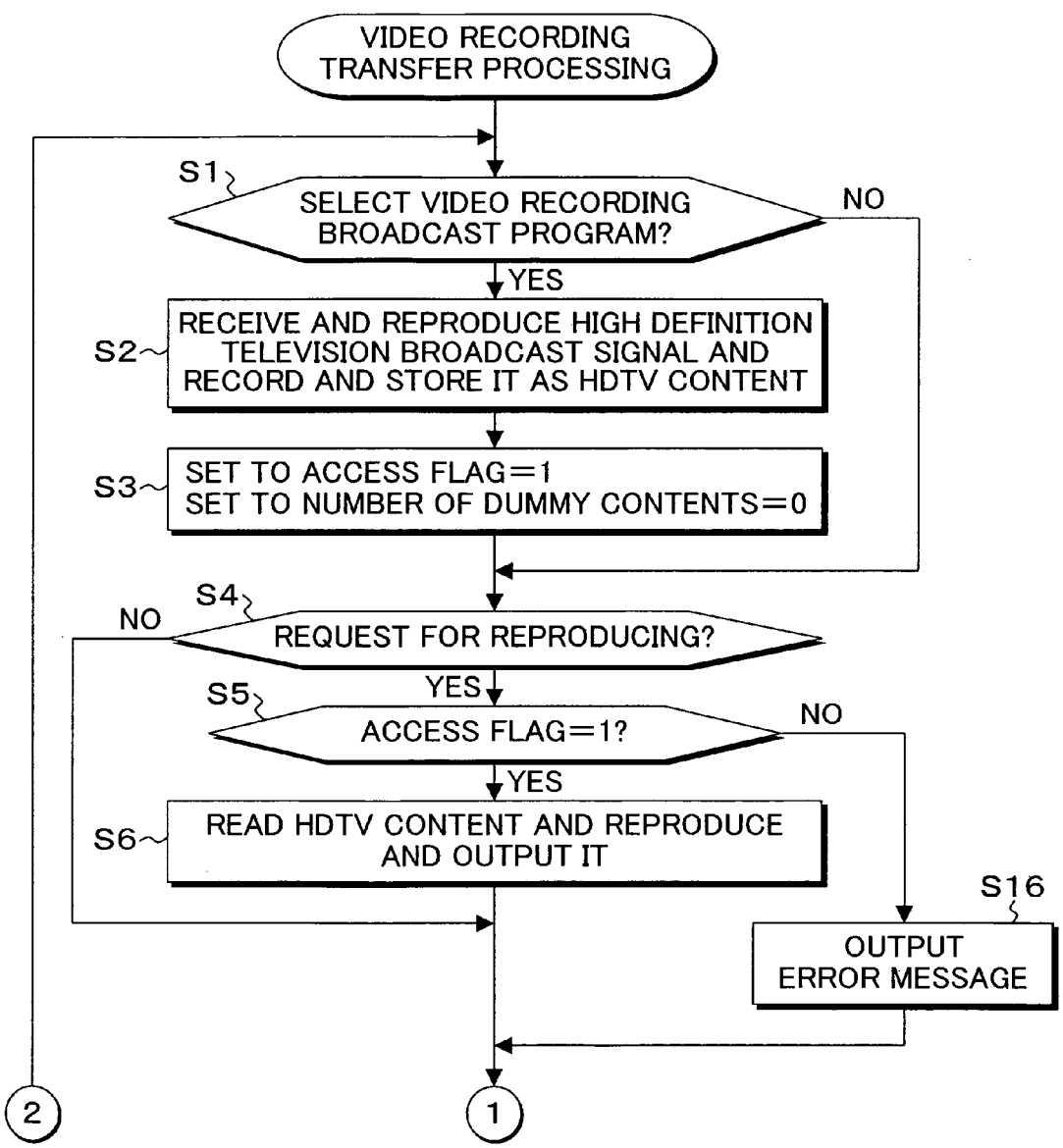
FIGS. 23A and 23B are flowcharts of the video transfer processing in the high resolution device of FIGS. 18A and 18B.
Figure 23B:
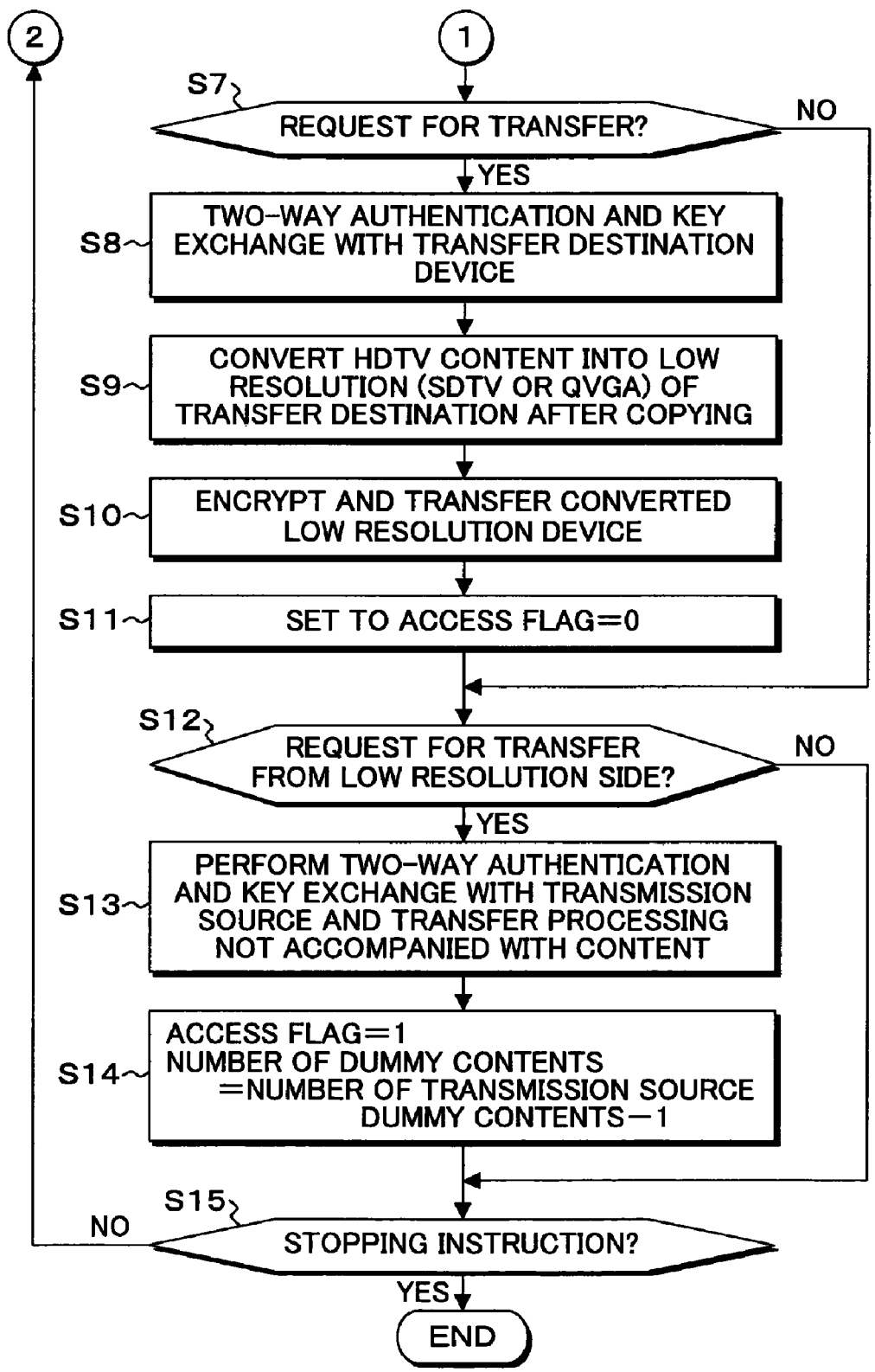

FIGS. 23A and 23B are flowcharts of the video transfer processing in the high resolution device 100 of FIGS. 18A and 18B. The processing of steps S1 to S16 of FIGS. 23A and 23B are the same as the image transfer processing of FIGS. 13A and 13B except that the number of dummy contents is processed. In FIGS. 23A and 23B, at step S3, after the video recording is stored, the number of dummy contents is set to 0. Further, at step S14, when the transfer request is made from the low resolution side, the only different point is that the number of dummy contents is set as:

(the number of dummy contents)=(the number of dummy contents of the transfer destination)−1.

Figure 24A:
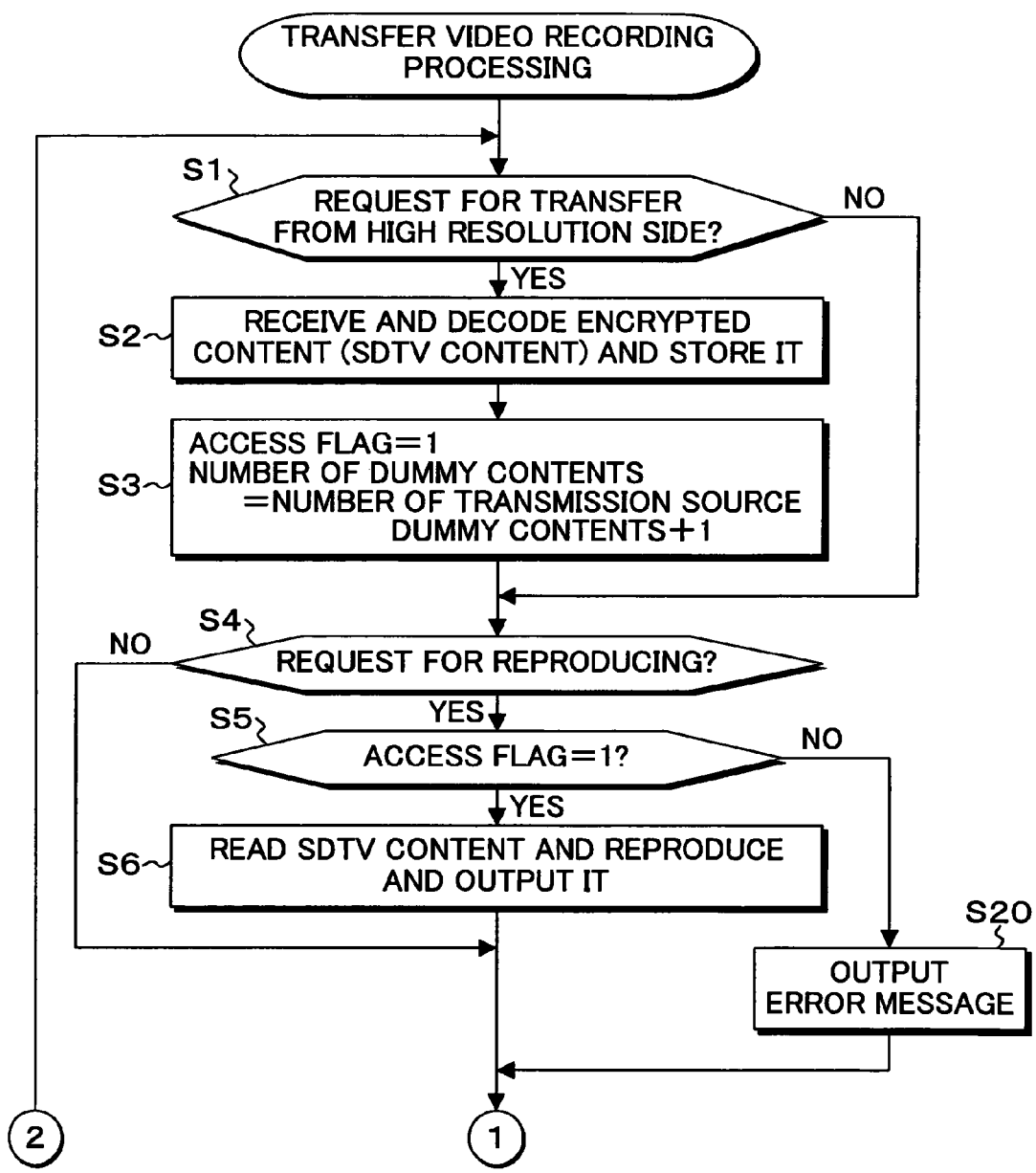
FIGS. 24A and 24B are flowcharts of the video transfer processing in the middle resolution device of FIGS. 18A and 18B.
Figure 24B:
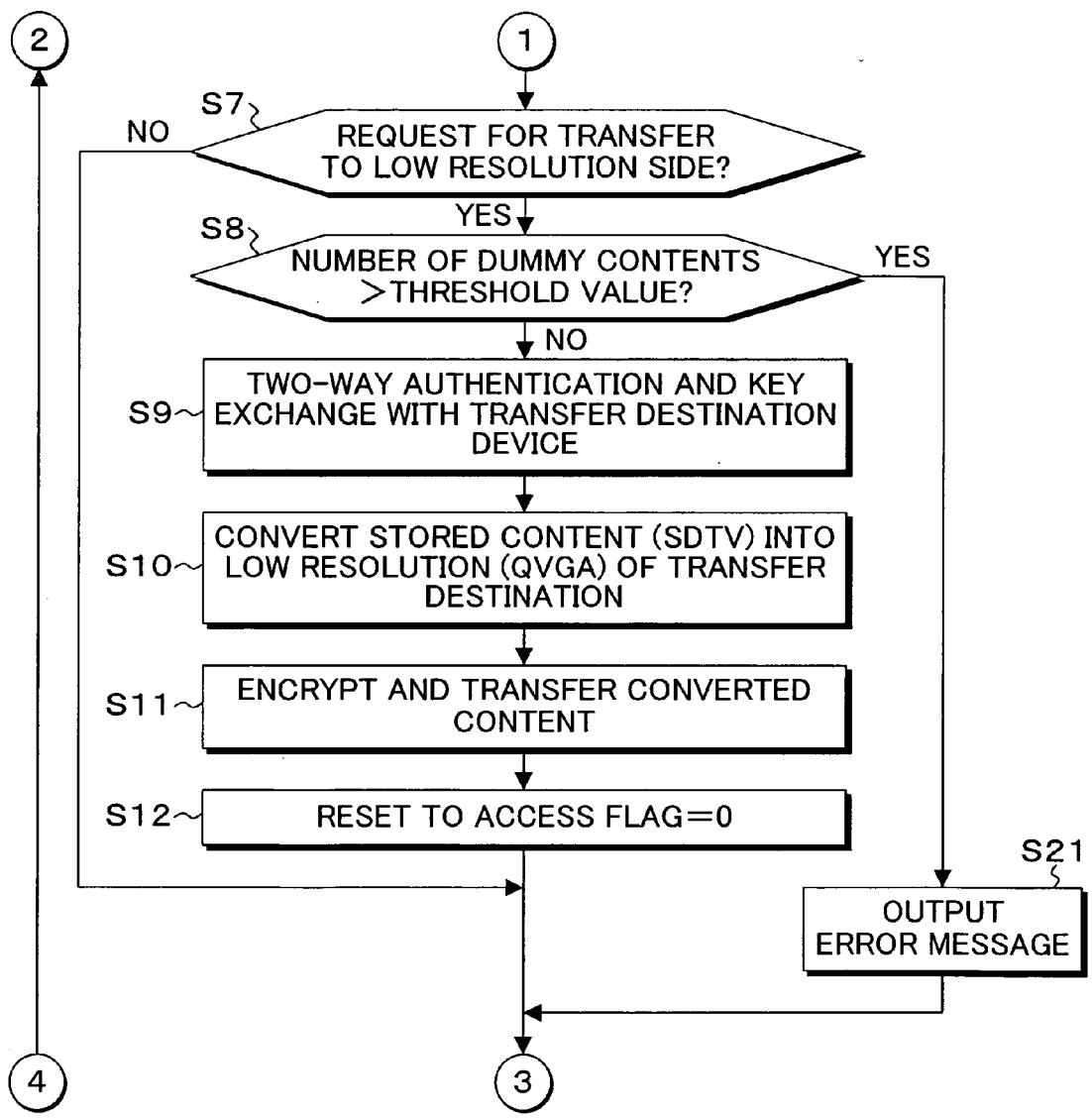
Figure 25:
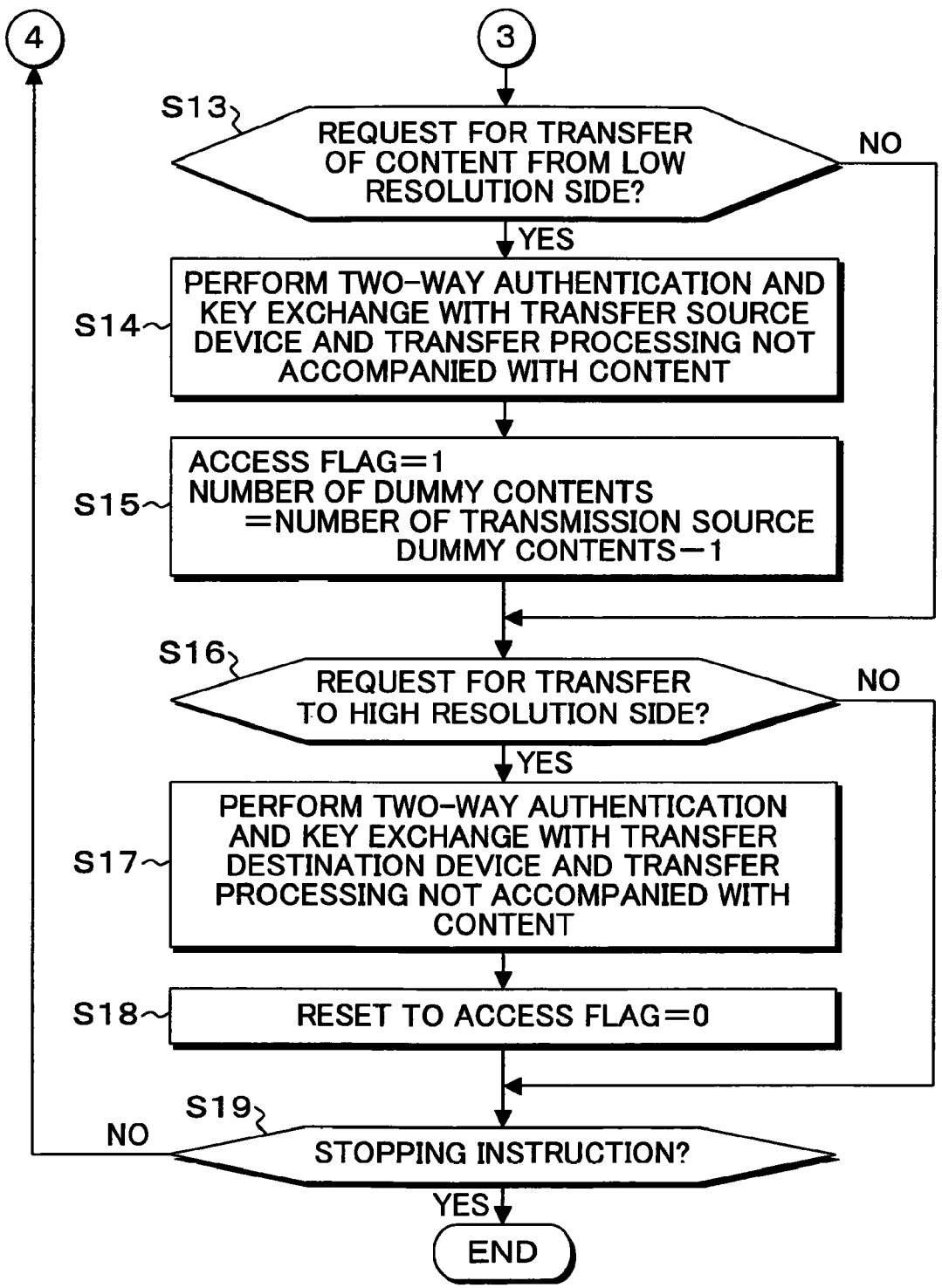
FIG. 25 is a flowchart of the video transfer processing subsequent to FIGS. 24A and 24B.

FIGS. 24 and 25 are flowcharts of the video transfer processing in the middle resolution device 102 of FIGS. 18A and 18B. Although this video transfer processing is also basically the same as the flowchart of the video transfer processing in the low resolution device 104 shown in FIG. 14, it is different in that the dummy contents are determined and the dummy contents are compared with the threshold value, and if they exceed the threshold value, the transfer is prohibited.

Further, the middle resolution device 102 receives and stores the SDTV content transcoded from the high resolution device, and moreover, transfers the QVGA contented transcoding the SDTV content to the low resolution device 104.

In FIGS. 24A and 24B, at step S1, if transfer request is made from the high resolution side, at step S2, the encrypted content, that is, the SDTV content is received and decoded, and the, is stored, and at step S3, the access flag is set to 1, and the number of dummy contents is set to the value adding 1 to the number of the dummy contents of the transfer source.

At step S4, when reproduction request is made, at step S5, if the access flag is set to 1, at step S6, the stored SDTV content is read and reproduced. If the access flag is set to 0, at step S20, an error message is outputted, and no reproduction is made.

At step S7, when the transfer request toward the low resolution side is made, at step S8, whether or not the number of dummy contents reaches the threshold value is checked. If it is below the threshold value, at step S9, the two-way authentication and the key exchange with the device of the transfer destination are performed, and after that, the stored SDTV content is transcoded into the QVGA content being the low resolution of the transfer destination at step S10, and then, at step S11, it is encrypted and transferred, and at step S12, the access flag is reset to 0 At step S8, if the number of the dummy contents reaches the threshold value, the transfer processing of the content is prohibited, and at steps S21, an error message is outputted, and no transfer processing is performed.

At step S13, when the transfer request of the content is made from the low resolution side, at step S14, the two-way authentication and the key exchange with the transfer destination de ice are performed, and the transfer processing without accompanied with the content is performed. For this return of the content, at step S15, the access flag is set to 1, and after that, the number of dummy contents is made into a value subtracting 1 from the content of the transfer destination.

Next, in FIG. 25, at step S16, when the transfer request toward the high resolution side is discriminated, at step S17, the two-way authentication and the key exchange with the device of the transfer destination are performed, and the transfer processing without accompanied with the content is performed. At step S18, the access flag is reset to 0. The processing up to this step S18 are repeated at step S19 until the stop instruction of the device is received.

Incidentally, the video transfer processing in the low resolution device 104 of FIGS. 18A and 18B is basically the same as the video transfer processing in the middle resolution device 102 of FIGS. 24 and 25, but differs in that the encrypted content received and decoded at step S2 is the QVGA content. Further, with respect to the transfer toward the low resolution side, if the stored QVGA content is at the lowest resolution degree, the processing of steps S7 to S15 and S21 are omitted.

Figure 26:
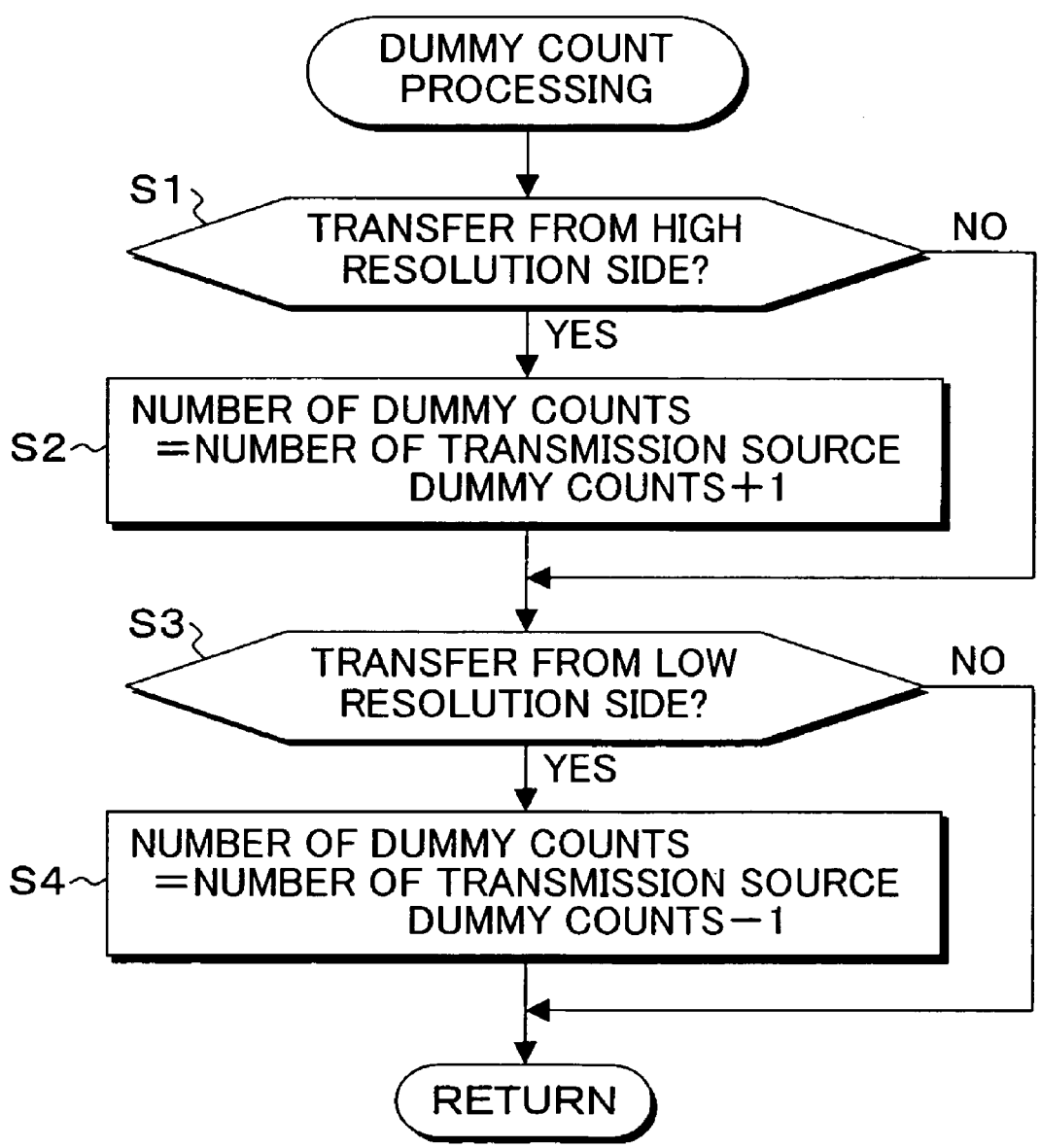
FIG. 26 is a flowchart of a dummy content count processing in FIGS. 18A and 18B.

FIG. 26 is a flowchart showing a dummy content count processing executed by respective processing of the high resolution device 100, the middle resolution device 102, and the low resolution device 104 as a sub-routine in FIGS. 18A and 18B. In FIG. 26, the dummy content count processing, when the transfer from the high resolution side is discriminated at step S1, takes a value adding 1 to the number of dummy contents of the transfer destination as the number of dummy contents at step S2. Further, when the transfer from the low resolution side is discriminated at step S3, the processing takes a value subtracting 1 from the number of dummy contents of the transfer source as the number of dummy contents.

FIGS. 27, 28, and 29 are explanatory drawings of the transfer processing accompanied with the resolution conversion of the broadcast content in FIGS. 18A and 18B that leaves the content from the low resolution side when the transfer is made to the high resolution side. FIG. 27A shows a state in which the HDTV content 114 is recorded and stored in the high resolution device 100, and the access flag 130 is set to 1, and the number of dummy contents 132 is set to 0

FIG. 27B shows a case where the transfer is made from the high resolution device 100 to the middle resolution device 102, in which the HDTV content 114 is transcoded, and is stored in the middle resolution device 102 as the SDTV content 118. In this case, the access flag 130 of the transfer source is reset to 0, and the access flag 150 of the transfer destination is set to 1. Further, the number of dummy contents of the transfer destination becomes a value adding 1 to the number of transfer source contents.

That is, the number of dummy contents at the transferring time from the high resolution side to the low resolution side is (the number of dummy contents)=(the number of dummy contents of the transfer source)+1, and this is the same as the case where the content of the low resolution side is deleted at the transferring time toward the high resolution side shown in FIGS. 19 to 21.

Figure 28A:
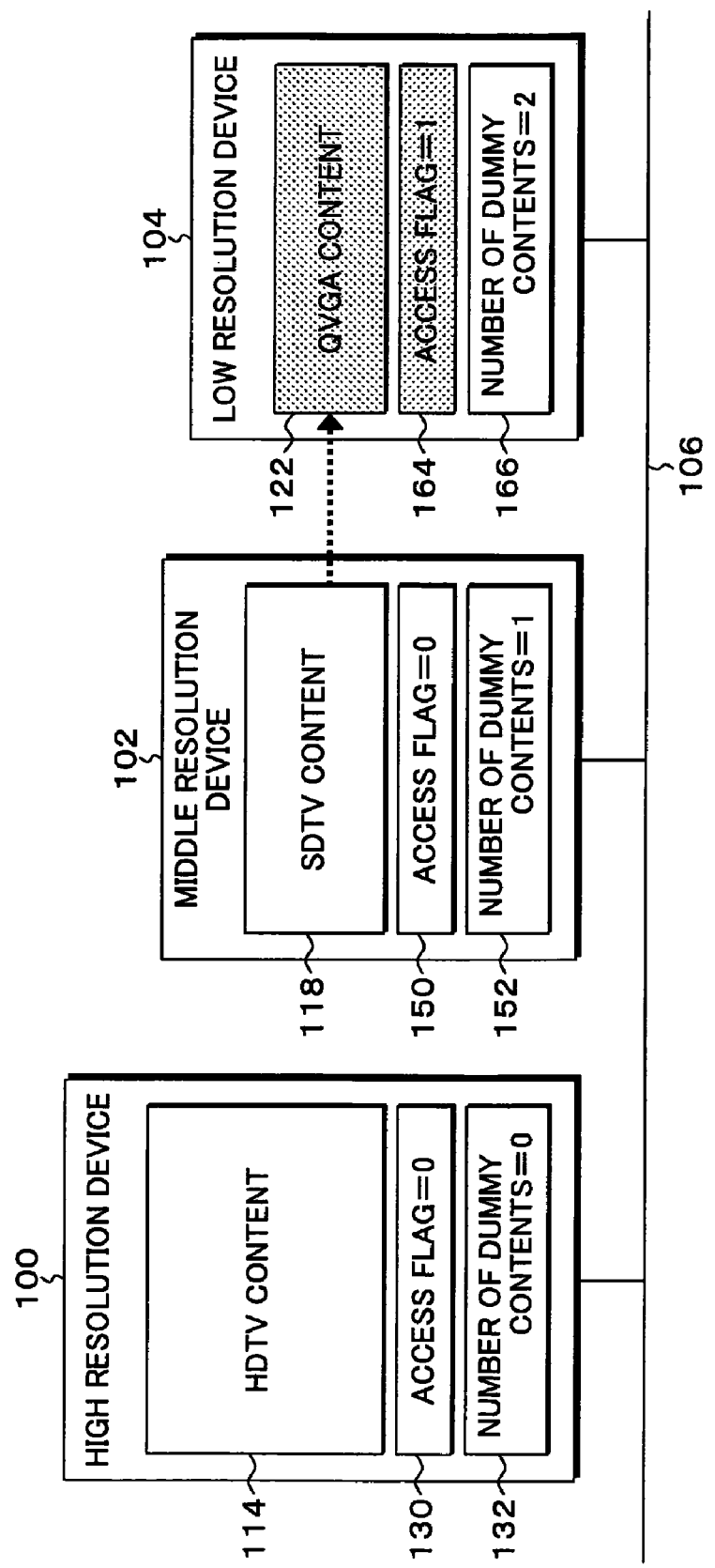
FIGS. 28A and 28B are explanatory drawings of the transfer processing subsequent to FIGS. 27A and 27B.

FIG. 28A shows the transfer from the middle resolution device 102 to the low resolution device 104, in which the SDTV content 118 is transcoded to the QVGA content 122, and is stored in the low resolution device 104. In this case, the access flag 150 of the transfer source is reset to 0, and the access flag 164 of the transfer destination is set to 1. Further, the number of dummy contents of the transfer destination is set to 2.

Figure 28B:
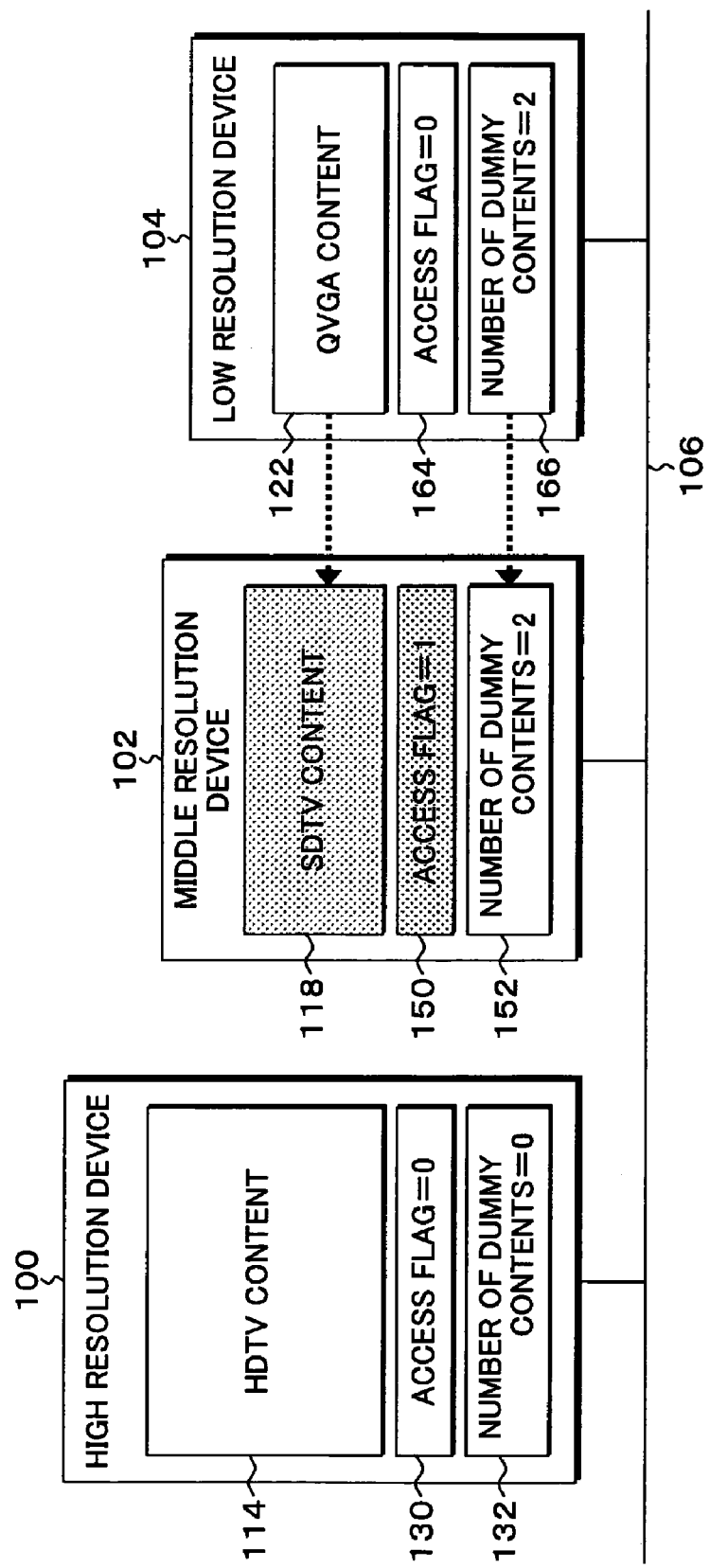

FIG. 28B is an explanatory drawing in the case where the content is returned from the low resolution device 104 to the middle resolution device 102. When the content is returned to the high resolution side, since the transcoding is not possible from the low resolution side to the high resolution side, the transfer of the content is not performed, but the transfer instruction only is transferred.

In this case, the QVAG content 122 is left alone in the low resolution device 104 which becomes the transfer source.

Further, the access flag 164 of the transfer source is reset to 0, and the access flag 150 of the transfer destination is set to 1. Further, the number of dummy contents 166 is 2, and the number of dummy contents of the transfer destination is also 2.

That is, the number of dummy contents when the content is left alone in the low resolution side of the transfer source is taken as (the number of dummy contents)=(the number of dummy contents of the transfer source)=2

FIG. 29 shows a case where the content is returned from the middle resolution device 102 to the high resolution device 100, and in this case also, the transfer of the content is not performed, but the transfer instruction only is transferred.

In this case, the access flag 150 of the transfer source is reset to 0, and the access flag 130 of the transfer destination is set to 1. Further, the number of dummy contents of the transfer destination is set to: (the number of dummy contents of the transfer destination)=(the number of dummy contents of the transfer source)=2.

As shown in FIGS. 27A to 29, when the transfer of the content is made from the high resolution device 100 to the middle resolution device 102 and the low resolution device 104, and then, is returned back again, as shown in FIG. 28C, the values of the number of dummy contents of the dummy content counter 132, 152, and 166 become 2.

Here, when the threshold value of the number of dummy contents is set to [2], if the content is transferred to other than the device of FIG. 29D, the number of dummy contents becomes 3 in the device of the transfer destination, and since this exceeds the threshold value, the transfer of the content is prohibited, and the storing of more contents transcoded in another device can be prevented.

Figure 30:
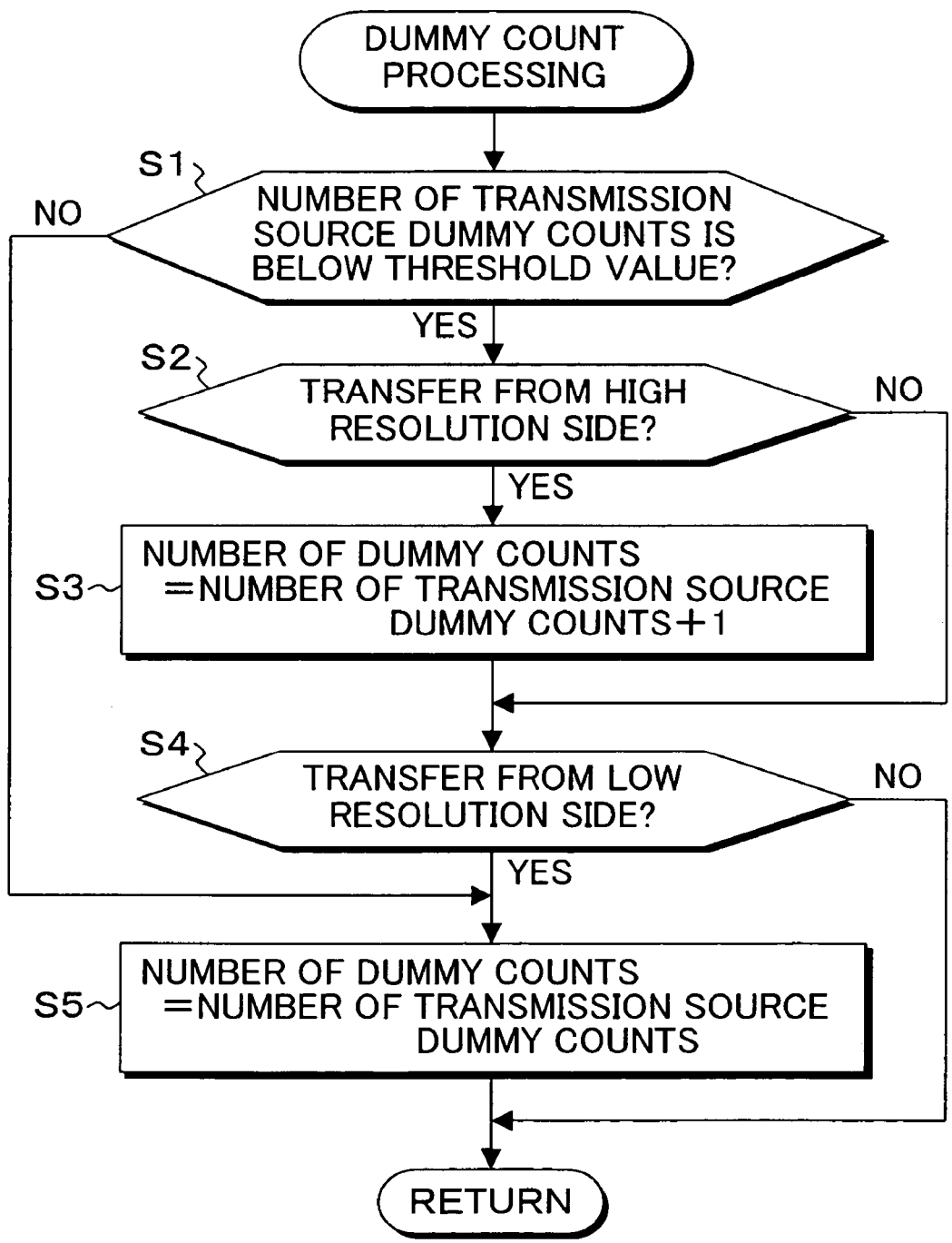
FIG. 30 is a flowchart of the dummy content count processing in FIGS. 27 to 29.

FIG. 30 shows a flowchart of a dummy content count processing in FIGS. 27 to 29 as a sub routine. In FIG. 30, at step S1, if the number of the dummy contents of the transfer destination is below the threshold value, at step S2, when the transfer from the high resolution side is discriminated, at step S3, the value adding 1 to the number of dummy contents of the transfer source is taken as the number of dummy contents. Further, at step S4, when the transfer from the low resolution side is discriminated, the number of dummy contents is left alone as it is, and is taken as the number of dummy contents.

On the other hand, at step S1, when the number of dummy contents of the transfer source exceeds the threshold value, the processing of steps S2 to S4 are skipped, and at step S5, the number of dummy contents of the transfer source is taken as it is as the number of dummy contents.

Incidentally, in the above described embodiment, though the transcoding is performed so as to change the resolution between the devices and transfer the content, the copy transferring the content as it is without changing the resolution can be also adapted to the content management processing of the present invention by similarly setting the access flag and the number of dummy contents.

In this case also, even if the original copy is stored in the plurality of devices, since the device capable of reproducing the copy is only one device in which the access flag is set to 1, a copy control by once-copy can be maintained.

(Multiplex CODEC Recording)

Figure 31:
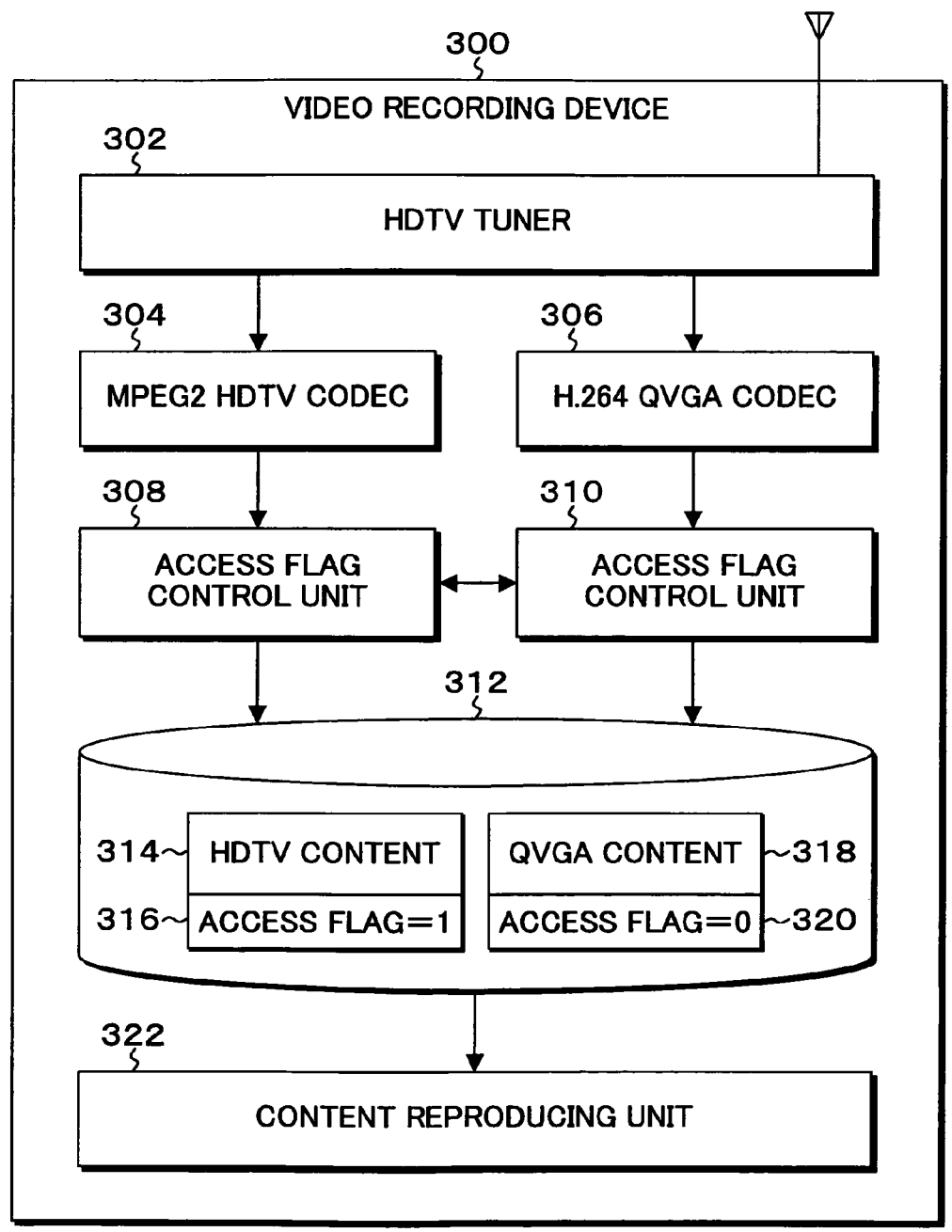
FIG. 31 is a block diagram of the functional configuration of the device performing recording by a multiplex CODEC according to the present invention.

FIG. 31 is a block diagram of the functional structure of a device which receives and records the HDTV content by multiplex CODEC. In FIG. 31, a recording device 300 comprises a HDTV tuner 302, a HDTV CODEC 304 of a MPEG2, a QVGA CODEC 306 of H.264, an access flag control units 308 and 310, a broadcast content storage unit 312, and a content reproduction unit 322.

The HDTV CODEC 304 and the QVGA CODEC 306 decode a HDTV broadcast signal received by the HDTV tuner 202 under a copy control condition of once-copy in parallel by CODEC systems of the MPEG2 and the H.264, respectively, and stores it in the broadcast content storage unit 312 as a HDTV content 314 and a QVGA CONTENT 318.

The access control units 308 and 310 sets the access flags 316 and 320 for the HDTV content 314 and the QVGA content 318, respectively, and for example, the access flag 316 of the HDTV content 314 set by default is set to 1 so that the reproduction is made possible, and the QVGA content 318 is prohibited to be reproduced by resetting the access flag 320 to 0.

The setting state of the access flags 316 and 320 by the default is changed according to the selection of the content desired to be reproduced by the user according to needs. For example, with respect to the storage state of the default, when the user instructs the reproduction of the QVGA content 318, its access flag 315 is set to 1, and the access flag 316 of the HDTV content 315 is reset to 0, and the content reproduction unit 322 reproduces and outputs the content at the side in which the access flag is set to 1.

As a result, the recording device 300 comprises two CODECs of a HDTV CODEC 304 and a QVGA CODEC 306, and even when two contents are stored by doubly decoding the same HDTV receiving broadcast, either one of the access flag is set to 1, and the remaining access flag is set to 0, and only one broadcast content whose access flag is set to 1 can be reproduced, and therefore, even if it is the storage of plural contents by the multiplex CODEC, a restrict condition of a copy control by the copy-once can be maintained.

Figure 32:
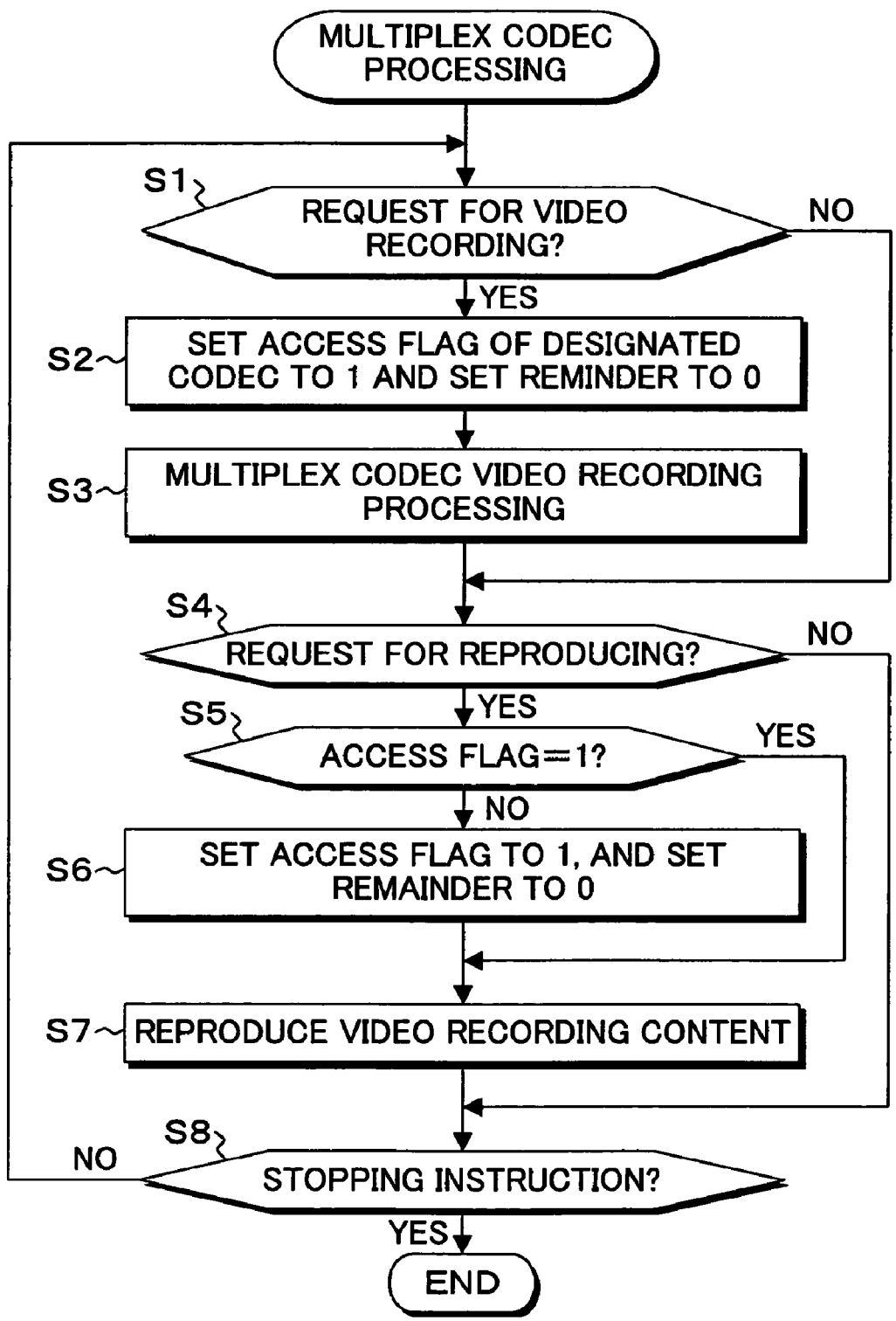
FIG. 32 is a flowchart of the multiplex CODEC processing of FIG. 31.

FIG. 32 is a flowchart of the multiplex CODEC processing of FIG. 31. At step S1, when a request for recording is made, at step S2, the access flag of the designated CODEC is set to 1, and the remaining flag is set to 0. Subsequently, at step S3, a recording storage processing of the multiplex CODEC is performed. At step S4, when a request for reproduction is made,
at step S5, the access flag is checked, and when the access flag is set to 1, at step S7, the reproduction of recorded content is performed.

When the access flag is not set to 1, at step S6, the corresponding access flag is set to 1, and the remaining flag is reset to 0, and after that, at step S7, a recorded connect whose access flag is set to 1 is reproduced. These processing of steps S1 to S7 are repeated at step S8 until the stop instruction is received.

Incidentally, in FIG. 31, though an example has been cited on the case where the multiplex CODEC recording is performed by providing two sets of CODEC in the recording device 300, the same can be also similarly adapted to the case where more than three CODECs are provided.

Further, the processing portion of the device that performs the processing including the encryption decoding of the broadcast content of the present invention is given a protection against an illegal access by using a hardware module or software having an anti-tamper processing function.

Further, the communications between the devices use encryption communications such as the IEEE1394 or the DTCP when a DVD device is connected to the personal computer by a DTCP port, and further, the encryption communications are performed by a protocol such as SSL or IPSec when the devices are mutually connected by LAN.

Incidentally, the present invention is not limited to the above described embodiment, and includes appropriate modifications not harming the object and advantages of the invention, and moreover, the invention is not subject to the limitation by the numerical values shown in the above described embodiment.

The invention claimed is:

1. A non-transitory machine-readable recording medium, storing a content management program, causing a computer to execute:
a content storing in a content storage unit step of storing encrypted content and an encryption key which is under a copy right use condition to prohibit a copy by a client machine having received the encrypted content;
a decoding step of decoding encrypted content by the encryption key;
a content copy step of copy-transferring the encrypted content, which encrypted content cannot be accessed without the proper encryption key, to the client machine through the network; and
an encryption key transfer step of transferring the encryption key to the client machine through the network;
wherein the encryption key transfer step transfers the encryption key of the content storage unit through the network, and after that, deletes a stored encryption key;
the encryption key transfer step registers the client machine storing the encryption key for each content in an encryption key management table,
the decoding step, when decoding the encrypted content, obtains the encryption key by a transfer request to the client machine storing the encryption key recognized from the management table and decodes the encrypted content,
the encryption key transfer step, when having transferred the encryption key to another client machine, renews a transferred machine information in own encryption key management table, and at the same time, informs the transferred machine information to the client machine and allows it to renew its encryption key management table,
the client machine connected through the network is a client machine owned by the same user registered in a client machine management table; and
the encrypted content is any one of the music, screen image, and document under a copy right or a combined thereof.

2. The medium according to claim 1,
wherein the client machine connected through the network includes a client machine owned by another user registered in the client machine management table.

3. The medium according to claim 1, wherein
a second client machine connected through the network and owned by a second user is registered in the client machine management table, and
content obtained by the second user is lent out to a third-party under a constraint condition of copy-once and the content is allowed to be used by the third-party.

4. A content management method of a host connected to client machines through a network, comprising:
a content storing step in a content storage unit of storing an encrypted content and an encryption key which is under a copy right use condition to prohibit a copy by a client machine having received the encrypted content;
a decoding step of decoding the encrypted content by the encryption key;
a content copy step of copy-transferring the encrypted content, which encrypted content cannot be accessed without the proper encryption key, to the client machine through the network; and
an encryption key transfer step of transferring the encryption key to the client machine through the network;
wherein the encryption key transfer step transfers the encryption key of the content storage unit to the client machine through the network, and after that, deletes a stored encryption key; and
the encryption key transfer step registers the client machine storing the encryption key for each content in an encryption key management table, and
the decoding step, when decoding the encrypted content, obtains the encryption key by a transfer request to the client machine storing the encryption key recognized from the management table and decodes encrypted content;

wherein the encryption key transfer step, when having transferred the encryption key to another client machine, renews a transferred machine information in own encryption key management table, and at the same time, informs the transferred machine information to the client machine and allows it to renew its encryption key management table, the client machine connected through the network is a client machine owned by the same user registered in a client machine management table; and the encrypted content is any one of the music, screen image, and document under a copy right or a combination thereof.

5. The content management method according to claim 4, wherein the client machine connected through the network includes a device client machine owned by another user registered in the client machine management table.

6. A content management apparatus comprising:

a content storing unit in a content storage unit that stores an encrypted content and an encryption key which is under a copy right use condition to prohibit a copy by a client machine having received the encrypted content;

a decoding unit that decodes encrypted content by the encryption key;

a content copy unit that copy-transfers the encrypted content, which encrypted content cannot be accessed without the proper encryption key to the client machine through the network; and an encryption key transfer unit that transfers the encryption key to the client machine through the network;

wherein the encryption key transfer unit transfers the encryption key of the content storage unit to the client machine through the network, and after that, deletes the encryption key of the content storage unit; and the encryption key transfer unit registers the client machine storing the encryption key for each content in an encryption key management table, and the decoding unit, when decoding encrypted content, obtains the encryption key by a transfer request to the client machine storing the encryption key recognized from the management table and decodes the encrypted content;

wherein the encryption key transfer unit, when having transferred the encryption key to another client machine, renews a transferred machine information in own encryption key management table, and at the same time, informs the transferred machine information to the client machine and allows it to renew its encryption key management table;

the client machine connected through the network is a client machine owned by the same user registered in a client machine management table; and the encrypted content is any one of the music, screen image, and document under a copy right or a combination thereof.

7. The content management apparatus according to claim 6, wherein the client machine connected through the network includes a client machine owned by another user registered in the client machine management table.

* * * * *

UNITED STATES PATENT AND TRADEMARK OFFICE
CERTIFICATE OF CORRECTION

| | | |
|---|---|---|
| PATENT NO. | : 8,095,469 B2 | Page 1 of 1 |
| APPLICATION NO. | : 11/657107 | |
| DATED | : January 10, 2012 | |
| INVENTOR(S) | : Masaki Yamashima et al. | |

It is certified that error appears in the above-identified patent and that said Letters Patent is hereby corrected as shown below:

In the Claims

Column 26, Line 31, In Claim 1, delete "combined" and insert -- combination --, therefor.

Signed and Sealed this
Twenty-third Day of June, 2015

Michelle K. Lee
*Director of the United States Patent and Trademark Office*